(12) United States Patent
Kiuchi et al.

(10) Patent No.: US 6,594,237 B1
(45) Date of Patent: Jul. 15, 2003

(54) FIXED LENGTH DATA PROCESSING APPARATUS

(75) Inventors: Hidenori Kiuchi, Osaka (JP); Hiroshi Murakawa, Osaka (JP); Shigehisa Sakahara, Osaka (JP); Kazuhisa Kada, Osaka (JP); Hideaki Mochizuki, Kawasaki (JP); Ritsuko Okura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/280,881

(22) Filed: Mar. 29, 1999

(30) Foreign Application Priority Data

Aug. 7, 1998 (JP) .............................. 10-225030

(51) Int. Cl.⁷ .............................................. G01R 31/08
(52) U.S. Cl. ...................................... 370/250; 370/253
(58) Field of Search ........................ 370/216, 217–228, 370/236.2, 241.1, 242, 244, 247–252, 253, 395.1, 395.32, 419, 231, 232

(56) References Cited

U.S. PATENT DOCUMENTS 5,936,943 A * 8/1999 Sakagami et al. ....... 370/236.2
5,974,045 A * 10/1999 Ohkura et al. ........... 370/241.1
6,181,680 B1 * 1/2001 Nagata et al. ............ 370/248

FOREIGN PATENT DOCUMENTS

| JP | 8-204725 | 8/1996 |
| JP | 9-130402 | 5/1997 |
| JP | 9-247184 | 9/1997 |

* cited by examiner

Primary Examiner—David Vincent
(74) Attorney, Agent, or Firm—Katten Muchin Zavis Rosenman

(57) ABSTRACT

A fixed length data processing apparatus has a data processing unit receiving at least fixed length data to perform a desired data processing on the fixed length data, and an operation state monitoring process unit performing a monitoring process to monitor an operation state of an asynchronous communication on the basis of the fixed length data received by said data processing unit, thereby detecting loss or misinsertion of fixed length data such as an ATM cell or the like and monitoring a flow state in a transmission system having a high transmission rate.

39 Claims, 44 Drawing Sheets

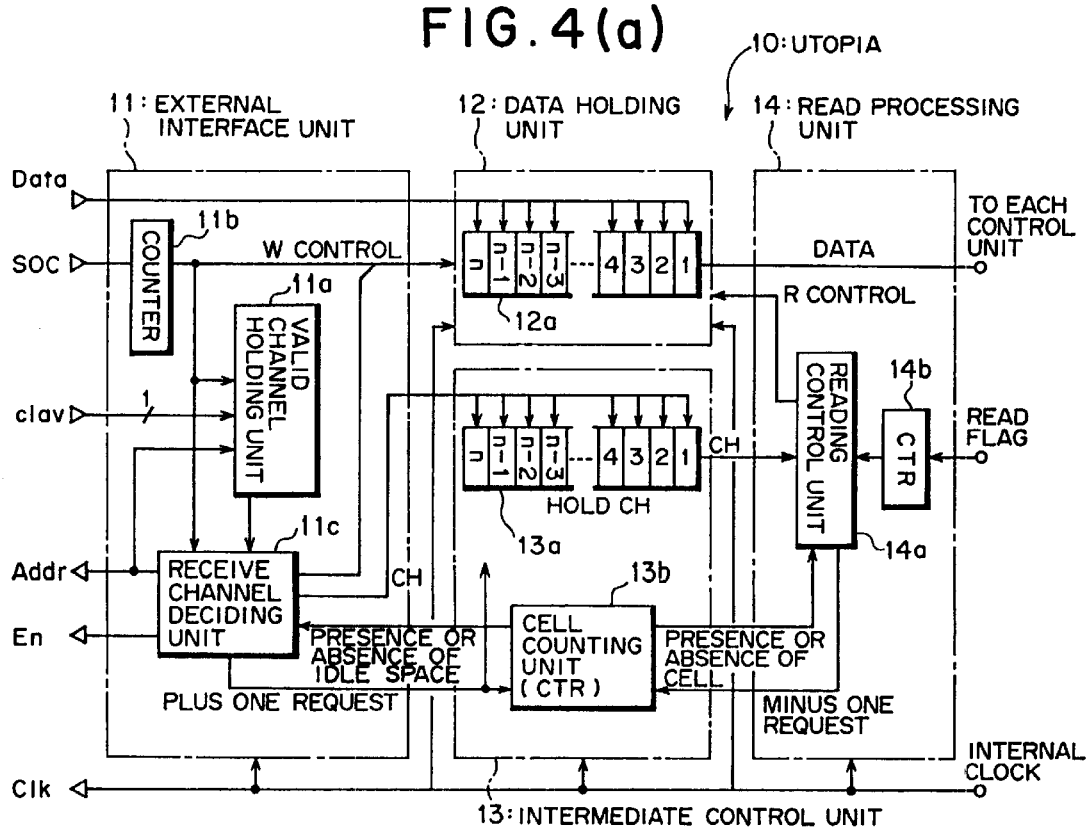
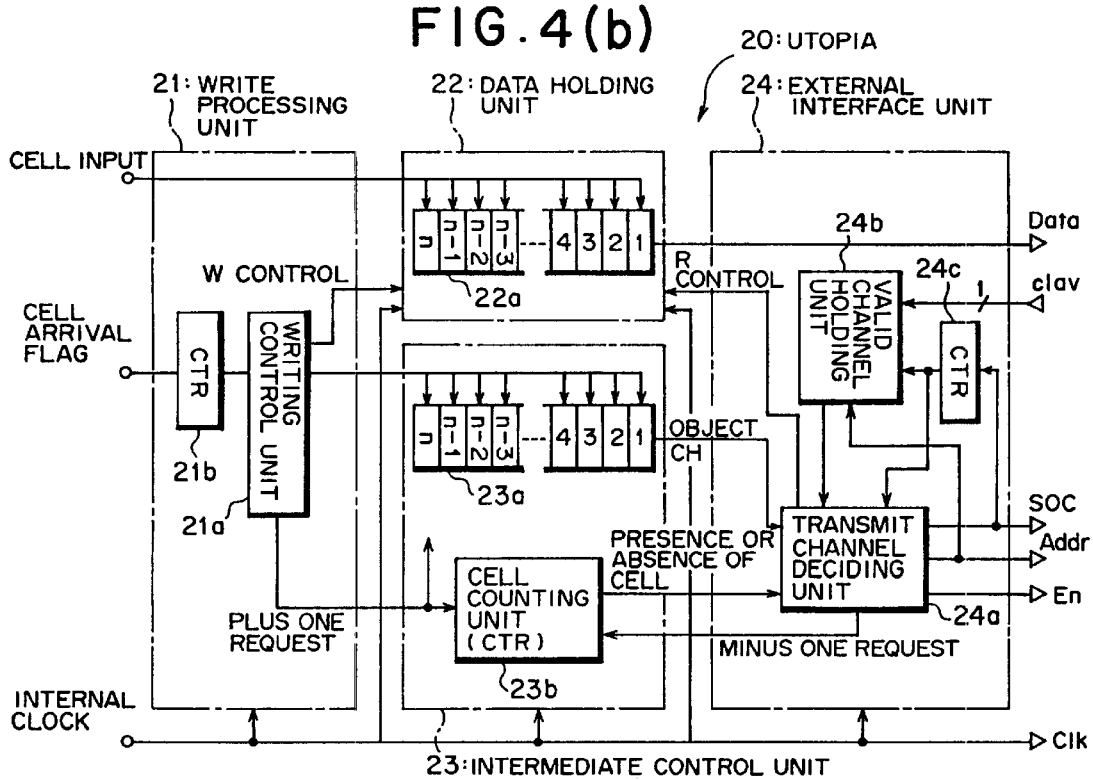

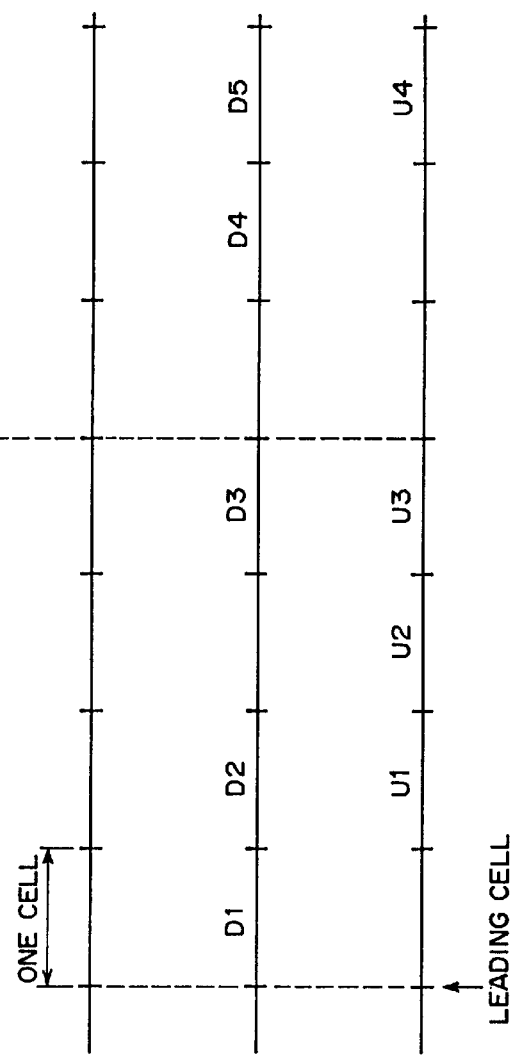

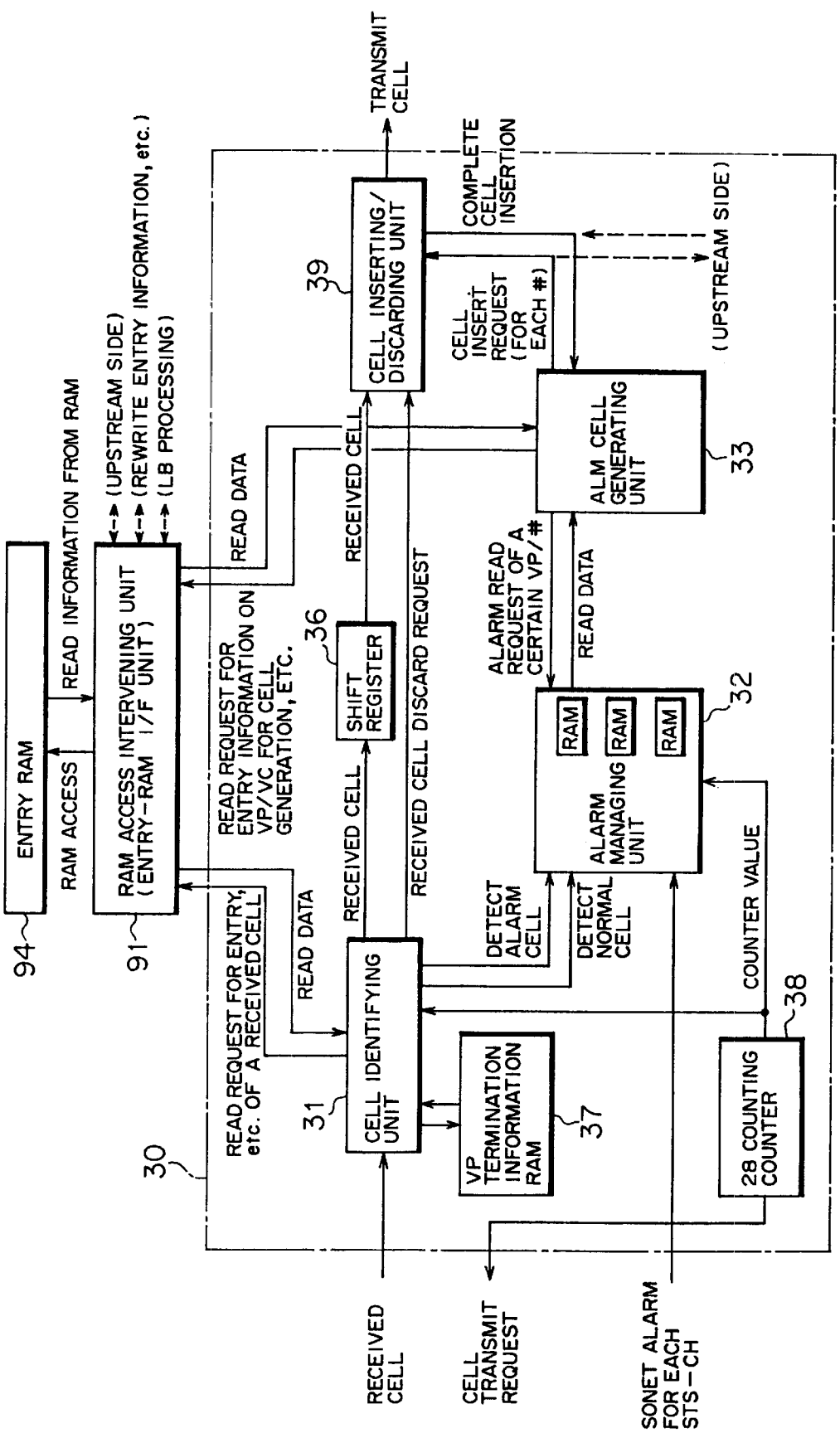

a : COUNTING / NOTIFYING PLANE SWITCHING ADDRESS b : DISCARD CELL GENERATION NUMBER
UP TO 16 VPI/VCIs ( 0~$F_H$ )

C2 : REGISTER FOR HOLDING VPI/VCI OF DISCARD CELL

C1 : REGISTER FOR HOLDING CAUSE OF DISCARDING OF DISCARD CELL

①': SET CL (FORCED CLEARING)
②': SET ACT REQ
③': SET ACT SET
④': SET DACT REQ
⑤': SET DACT SET
⑥': DETECT TIME-OUT

- d : 0~3 : STS #1~#4
- e : 0 : HIGHER ORDER OF PM CAM OUTPUT ADDRESS 15ch (0~14)
- e : 1 : LOWER ORDER OF PM CAM OUTPUT ADDRESS 15ch (16~29)
- f : 0~14 : DISCRIMINATE 15ch OF PM CAM OUTPUT ADDRESS

- g : VPI/VCI
- h : DIRECTION (A TO B, B TO A, TWO-WAY)
- i : END-TO-END OR SEGMENT
- j : OWN STATION REQUEST OR OPPOSITE-STATION REQUEST
- k : IDENTIFY DIRECTION (A TO B OR B TO A) AT THE TIME OF TWO-WAY SETTING
- $l$ : INTERNAL STATE

FIG. 21

| INTERNAL CODE | STATE | NOTIFICATION CODE | NOTIFICATION STATE | STATE | |
|---|---|---|---|---|---|
| 0000 | NO-ENTRY (NOT IN PM) | 000 | NO-ENTRY | MONITORING IS NOT SET | |
| 0001 | DACT CELL SEND REQUEST | 101 | DEACTIVATE REQUEST | DACT CELL SEND REQUEST | |
| 0010 | DACT SENT-BACK CELL WAIT | | | WAIT FOR RESPONSE CELL AFTER SENDING DACT CELL | |
| 0011 | DACT SENDING-BACK COMPLETE OR WAIT | | | WAIT FOR DIRECTION FROM μ-com DUE TO RECEPTION OF RESPOSE CELL | |
| 0100 | IN ACT TIME-OUT | 100 | TIME OUT | TIME-OUT AFTER ACT CELL RE-TRANSMISSION | |
| 0101 | ACT CELL SEND REQUEST | 001 | ACTIVATE REQUEST | ACT CELL SEND REQUEST | |
| 0110 | ACT SENT-BACK CELL WAIT | | | WAIT FOR RESPONSE CELL AFTER SENDING ACT CELL | |
| 0111 | ACT SENDING-BACK COMPLETE OR WAIT | | | WAIT FOR DIRECTION FROM μ-com DUE TO RECEPTION OF RESPONSE CELL | |
| 1000 | IN PM | 010 | ACTIVATE STATE | IN MONITORING | |
| 1001 | DACT CELL SENT REQUEST (IN MONITORING) | 101 | DEACTIVATE REQUEST | DACT CELL SEND REQUEST | |
| 1010 | DACT SENT-BACK CELL WAIT (IN MONITORING) | | | WAIT FOR RESPONSE CELL AFTER SENDING DACT CELL | |
| 1011 | DACT SENDING-BACK COMPLATE OR WAIT (IN MONITORING) | | | WAIT FOR DIRECTION FROM μ-com DUE TO RECEPTION OF RESPONSE CELL | |
| 1100 | IN ACT/DACT TIME-OUT (IN MONITORING) | 100 | TIME OUT | TIME-OUT AFTER RE-TRANSMISSION OF DACT CELL | |
| 1101 | FORCED CLEAR REQUEST | 000 | NO-ENTRY | IN EXECUTION OF FORCED CLEAR SEQUENCE | |
| 1110 | NOT DEFINED (NO-ENTRY) | 000 | NO-ENTRY | — | |
| 1111 | KEEP CHANNEL BY RECEIVED CELL | 000 | NO-ENTRY | NOTIFY OF μ-com AFTER RECEPTION OF ACTIVATE CELL | |

FIG. 22

| AMCK CELTPPM CNT28 | 0 | 1 | 2 | 3 | 4 | 5 | 6 | 7 | 8 | 9 | 10 |
|---|---|---|---|---|---|---|---|---|---|---|---|
| PM-CAM RAM | | | | | | UPDATE CODE W | UPDATE 5s TIMER R | SEARCH FOR PM (FM) GENERATION R | NOTIFY OF μ-com R | UPDATE 5s TIMER W | SEARCH FOR ACT/DACT GENERATION R/W | NOTIFY OF μ-com W |
| PM SETTING RAM | | RECEIVED CELL SETTING DNS R | | | RECEIVED CELL SETTING DNS (1ST) W | | SEARCH FOR PM (FM) GENERATION R/W | NOTIFY OF μ-com R | | SEARCH FOR ACT/DACT GENERATION R | NOTIFY OF μ-com W |
| PM 5s TIMER RAM | | RE-TRY RECEIVED CELL R | | | | UPDATE 5s TIMER R | | | UPDATE 5s TIMER W | SEARCH FOR ACT/DACT GENERATION R/W | INITIALIZE μ-com NOTIFICA-TION W |
| PM 2s TIMER RAM | | | | | | | | RECEIVE CELL, START 2s TIMER W | | SEARCH FOR TIME-OUT GENERATION R/W | |
| ACT-REQ RAM | | | | | | | | | | SEARCH FOR SEND REQUEST 0 R | SEARCH FOR SEND REQUEST 1 R |
| ACT-REQ RAM | | | | | RECEIVED CELL CONTENTS 0 R | | | RECEIVED CELL CONTENTS 1 W | RECEIVED CELL CONTENTS 0 W | SEARCH FOR TIME-OUT GENERATION 0 R | SEARCH FOR TIME-OUT GENERATION 1 R |
| PM 5-STAGE FIFO RAM | | LOOP BACK RECEIVED CELL 5 R | LOOP BACK RECEIVED CELL 6 R | LOOP BACK RECEIVED CELL 7 R | | | LOOP BACK RECEIVED CELL 0 R | LOOP BACK RECEIVED CELL 1 R | | LOOP BACK RECEIVED CELL 2 R | LOOP BACK RECEIVED CELL 3 R |
| MCSN COUNT RAM | | | | | | | | PM (FM) GENERATION (COUNT UP) R | | | PM (FM) GENERATION (COUNT UP) W |
| TUC GENERATION COUNT RAM | | | | | | | RECEIVED CELL UPS USR 0R | RECEIVED CELL UPS USR 1R | PM (FM) GENERATION R | RECEIVED CELL UPS USR 0W | RECEIVED CELL UPS USR 1W |
| TUC RECEPTION HOLDING RAM | | | | | | | | | | | |
| TRCC COUNT HOLDING RAM | | | | | | | | | | | |
| BIPV COUNT RAM | | | | | | | RECEIVED CELL UPS USR 0R | RECEIVED CELL UPS USR 1R | PM (FM) GENERATION R | RECEIVED CELL UPS USR 0W | RECEIVED CELL UPS USR 1W |
| PM COUNT RAM | PM COUNTING 6 W | PM COUNTING 7 W | PM COUNTING TUC₀ 1W | | PM COUNTING TUC₀₊₁ 1R | PM COUNTING TUC₀₊₁ 0R | PM COUNTING TUC₀ 0R | PM COUNTING TUC₀₊₁ 1W | PM COUNTING TUC₀₊₁ 0W | PM COUNTING TUC₀ 0W |

PM CELL DETERMINATION — 4 — — 9 — — 10 — q : BLOCK SIZE COUNT r : FORWARD MONITORING CELL GENERATE REQUEST s : 5-S    COUNT t : RE-TRY NUMBER COUNT u1 : INFORMATION DISCRIMINATING ADDRESS
u2 : CHANNEL IDENTIFYING ADDRESS v1 : VPI/VCI
v2 : CLP
v3 : END-TO-END/SEGMENT
v4 : MESSAGE-ID v5 : DIRECTION
v6 : CORRELATION-TAG
v7 : BLOCK SIZE w1 : VPI/VCI
w2 : STATE NOTIFICATION
w3 : WR BIT
w4 : MESSAGE-ID
w5 : DIRECTION w6 : CORRELATION-TAG
w7 : BLOCK SIZE
w8 : END-TO-END/SEGMENT
w9 : CLP x1 : TIMER VALUE (2-SECOND COUNT)

x2 : ACT CELL IS NOW RECEIVED OR NOT x3 : 2-SECOND TIME-UP (ACT DENI CELL SEND REQUEST)

FIG. 46

```
9 8 7 6 5 4 3 2 1 0
|      z1       | z2  |
``` z2 : DATA TYPE IDENTIFYING ADDRESS
z1 : 120 CHANNELS IDENTIFYING ADDRESS

FIG. 47

19 18 17 16 15 14 13 12 11 10 9 8 7 6 5 4 3 2 1 0  (RAM1)

| # | | | |
|---|---|---|---|
| 0 | MBS | $TUC_{o+1}$ | LSB |
| 1 | MBS | $TUC_o$ | LSB |
| 2 | | MSB $LOST_{o+1}$ | LSB |
| 3 | | MSB $LOST_o$ | LSB |
| 4 | | MSB MISINSERTED USER INFORMATION CELL | LSB |
| 5 | MSB | TOTAL $LOST_{o+1}$ | LSB |
| 6 | MSB | TOTAL $LOST_o$ | LSB |
| 7 | | MSB BIPV | LSB |

↑ ADDRESS z2

FIG. 48

13 12 11 10 9 8 7 6 5 4 3 2 1 0  (RAM2)

| # | | |
|---|---|---|
| 0 | MSB SECB $_{MLOST}$ | LSB |
| 1 | MSB SECB $_{MERRORAD}$ | LSB |
| 2 | MSB SECB $_{MMISINSERTAD}$ | LSB |
| 3 | MSB IMPAIRED BLOCK | LSB |
| 4 | MSB IMPAIRED CELL BLOCKS LOSS/MISINSERTION | LSB |
| 5 | INV | ← UNUSED |
| 6 | MSB | |
| 7 | ------VPI/VCI------ | LSB |

FIG. 51(a)

| | | 15 | | 0 |
|---|---|---|---|---|
| y1 | ADDRESS 0 | GFC | VPI | VCI |
| y1 | ADDRESS 1 | VCI | | PTI CL |
| y1 | ADDRESS 2 | OAM-Ty | Fnc-Ty | Msg-ID | Dir |
| y1 | ADDRESS 3 | Corr-Tag | | Bs A-B | Bs B-A |
| y1 | ADDRESS 4 | "6A" | "6A" |
| y1 | ADDRESS 5 | "6A" | "6A" |
| y1 | ADDRESS 6 | "6A" | "6A" |
| y1 | ADDRESS 7 | "6A" | "6A" |

IN THE CASE OF ACT/DACT CONF/DENI CELL

FIG. 51(b)

| | | 15 | | 0 |
|---|---|---|---|---|
| y1 | ADDRESS 0 | GFC | VPI | VCI |
| y1 | ADDRESS 1 | VCI | | PTI CL |
| y1 | ADDRESS 2 | OAM-Ty | Fnc-Ty | MCSN |
| y1 | ADDRESS 3 | $TUC_{o+1}$ |
| y1 | ADDRESS 4 | $TUC_o$ |
| y1 | ADDRESS 5 | "6A" | $TRCC_o$ |
| y1 | ADDRESS 6 | $TRCC_o$ | $BLER_{o+1}$ |
| y1 | ADDRESS 7 | $TRCC_{o+1}$ |

IN THE CASE OF BACK REP CELL

FIG. 52

y1: DATA DISCRIMINATING ADDRESS
y2: ADDRESS SHOWING A CELL HOLDING WINDOW

FIG. 53

| AMCK CELTPPM CNT28 | 11 | 12 | 13 | 14 | 15 | 16 | 17 | 18 | 19 |
|---|---|---|---|---|---|---|---|---|---|
| PM-CAM RAM | SEARCH 0 R | SEARCH 1 R | SEARCH 2 R | SEARCH 3 R | SEARCH 4 R | SEARCH 5 R | SEARCH 6 R | SEARCH 7 R | SEARCH 8 R |
| PM SETTING RAM | RECEIVED CELL COUNT UPS USE OR | RECEIVED CELL COUNT UPS USE 1R | | RECEIVED CELL COUNT UPS USE OW | RECEIVED CELL COUNT UPS USE 1W | | | | |
| PM 5s TIMER RAM | | | | | | | | | |
| PM 2s TIMER RAM | | | | | UPDATE 2s TIMER, COUNT R | | | UPDATE 2s TIMER, COUNT W | |
| ACT-REQ RAM | | | | | | | | | |
| ACT-REQ RAM | | TIME-OUT GENERATION RW=1 ADNI=1 OW | | | | | | | |
| PM 5-STAGE FIFO RAM | | | | LOOP BACK LECEIVED CELL 4 R | | | | LOOP BCAK LECEIVED CELL 0 W | LOOP BCAK LECEIVED CELL 1 W |
| MCSN COUNT RAM | RECEIVED CELL DNS PM R | | | RECEIVED CELL DNS PM W | | | | | |
| TUC GENERATION COUNT RAM | PM (FM) GENERATION CLEAR W | RECEIVED CELL DNS USR, PM OR | RECEIVED CELL DNS USR, PM 1R | | RECEIVED CELL DNS USR, PM OW | RECEIVED CELL DNS USR, PM 1W | | | |
| TUC RECEPTION HOLDING RAM | | RECEIVED CELL DNS PM R | | | RECEIVED CELL DNS PM W | | | | |
| TRCC COUNT HOLDING RAM | | RECEIVED CELL DNS USR, PM OR | RECEIVED CELL DNS USR, PM 1R | | RECEIVED CELL DNS USR, PM OW | RECEIVED CELL DNS USR, PM 1W | | | |
| BIPV COUNT RAM | PM (FM) GENERATION CLEAR W | RECEIVED CELL DNS USR, PM OR | RECEIVED CELL DNS USR, PM 1R | | RECEIVED CELL DNS USR, PM OW | RECEIVED CELL DNS USR, PM 1W | | | |
| PM COUNT RAM | PM (FM) GENERATION CLEAR TUC$_{0-1}$ W | PM (FM) GENERATION CLEAR TUC$_0$ W | PM COUNTING 0 R | PM COUNTING 1 R | PM COUNTING 2 R | PM COUNTING 0 W | PM COUNTING 1 W | PM COUNTING 2 W | PM COUNTING 3 R |

GENERATE INSERT CELL
——— SEND INSERT CELL (TO UPS INS)
↑
INSERT REQUEST SAMPLING (PMINS)

FIG. 54

| | INSERT REQUEST SAMPLING (UPS INS) | | | | INSERT PERMISSION (UPS INS) | | 26 | |
|---|---|---|---|---|---|---|---|---|
| AMCK CELTPPM CNT28 | ↑ 20 | ↑ 21 | ↑ 22 | ↑ 23 | ↑ 24 | ↑ 25 | ↑ 26 | ↑ 27 |
| PM-CAM RAM | SEARCH 9 R | SEARCH 10 R | SEARCH 11 R | SEARCH 12 R | SEARCH 13 R | SEARCH 14 R | | |
| PM SETTING RAM | | | | | | | | |
| PM 5s TIMER RAM | | | | | | | | |
| PM 2s TIMER RAM | | | | | CANCELL WHILE RECEIVING ACT W | | | |
| ACT-REQ RAM | | | | | μ-COM SETTING 0 W | μ-COM SETTING 1 W | | |
| ACT-REQ RAM | | NOTIFY OF μ-COM (ADNI) 0 R | NOTIFY OF μ-COM 1 R | | μ-COM SETTING WR- 0 W | | | |
| PM 5-STAGE FIFO RAM | LOOP BACK RECEIVED CELL 2 W | LOOP BACK RECEIVED CELL 3 W | LOOP BACK RECEIVED CELL 4 W | LOOP BACK RECEIVED CELL 5 W | LOOP BACK RECEIVED CELL 6 W | LOOP BACK RECEIVED CELL 7 W | | |
| MCSN COUNT RAM | | | | | | | | |
| TUC GENERATION COUNT RAM | | | | | | | | |
| TUC RECEPTION HOLDING RAM | | | | | | | | |
| TRCC COUNT HOLDING RAM | | | | | | | | |
| BIPV COUNT RAM | | | | | | | | |
| PM COUNT RAM | PM COUNTING 4 R | PM COUNTING 5 R | PM COUNTING 3 W | PM COUNTING 4 W | PM COUNTING 5 W | PM COUNTING 6 R | PM COUNTING 7 R | PM COUNTING TUC₀ 1R |

R : READ   W : WRITE

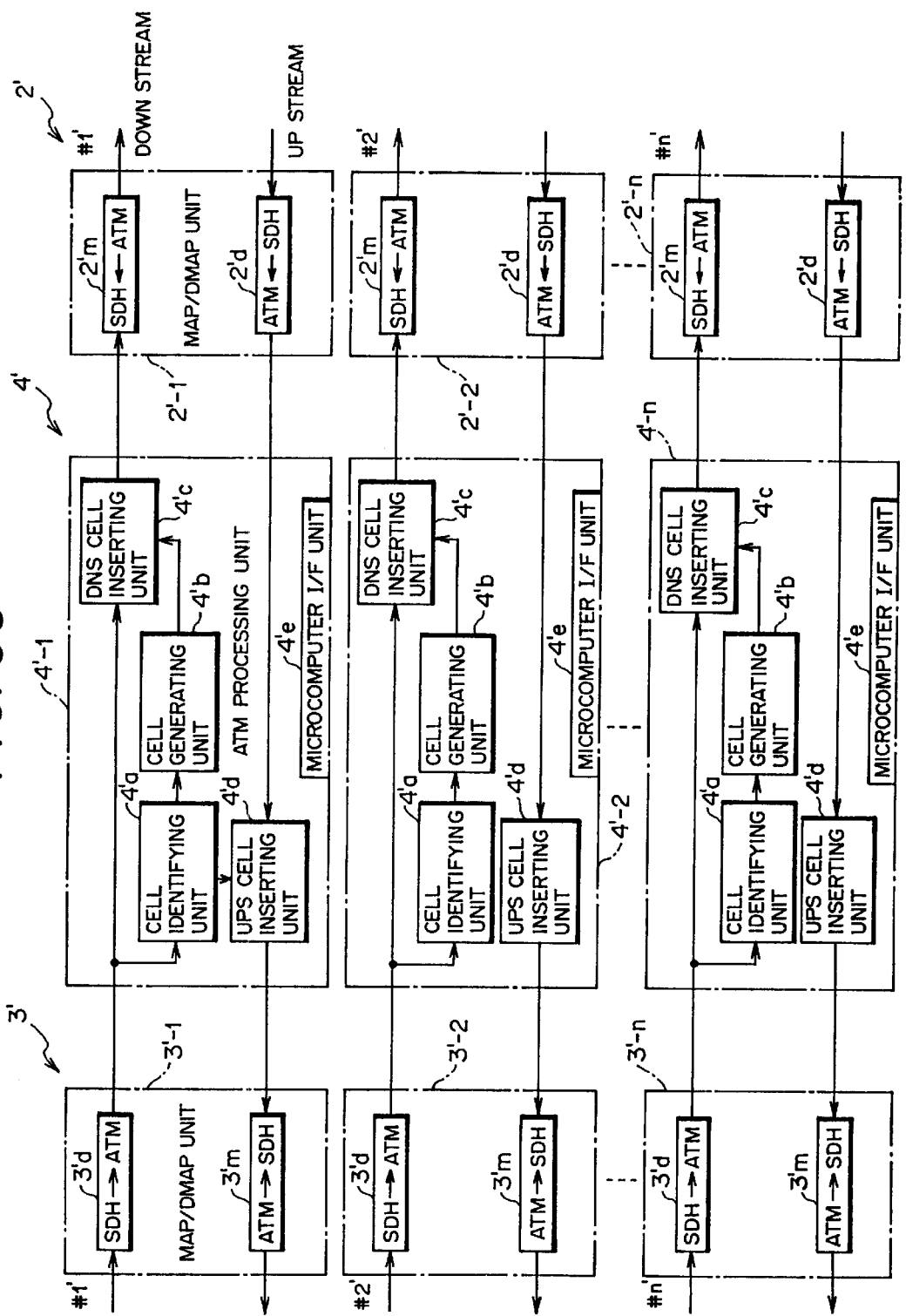

FIXED LENGTH DATA PROCESSING APPARATUS

BACKGROUND OF THE INVENTION (1) Field of the Invention

The present invention relates to a fixed length data processing apparatus, in particular, to a fixed length data processing apparatus suitable for use to execute operation, administration and maintenance (OAM) of ATM (Asynchronous Transfer Mode) communication using fixed length data of 53 bytes called an ATM cell.

(2) Description of Related Art ATM technique is.being introduced for the purpose of realization of B-ISDN (Broadband aspect of ISDN) communication network so as to comply with high speed (large capacity) communications, variable bit rate communications for image, communication systems having various connection configurations such as point-to-point, point-to-n points (n is 2 or more), n points-to-n points, and the like, required presently.

For instance, in SDH (Synchronous Digital Hierarchy) transmission network [called SONET (Synchronous Optical Network) in the North America], it is tried to map (store) signals for various communication services as ATM cells (fixed length data for asynchronous communication) onto a portion of payload of an SDH transmission frame [called STM (Synchronous Transfer Module), or STS (Synchronous Transport Signal) in SONET] and transmit the signal.

When an ATM cell is mapped onto the SDH transmission frame (hereinafter simply referred as a transmission frame, occasionally), a demand is to identify the ATM cell mapped onto the transmission frame in units of ATM cells and perform operation, administration and maintenance [a data (cell) processing such as a terminating processing on an OAM cell] at a level of ATM communication even in the SDH transmission network.

In a ring network 1' configuring the SDH transmission network shown in FIG. 55, for example, it is necessary to interpose an ATM processing apparatus 4' for performing the above cell processing between SDH transmitting apparatus 2' and 3'.

Each of the SDH transmitting apparatus 2' and 3' has a function of mapping an ATM cell on or taking out (demapping) an ATM cell from a transmission frame. Since the ring network 1' (SDH transmitting apparatus 2' and 3') accommodates a plurality of SDH transmitting apparatus 9'-1 through 9'-n (n is an integer not less than 2) which are transmission points in the lower hierarchy, as shown in FIG. 55, the ATM processing apparatus 4' is required to perform the above cell processing on each transmission point. In concrete, it is necessary to separately perform the above cell processing on each transmission frame in a lower layer handled in each of the SDH transmission apparatus 9'-1 through 9'-n [distinguished as an STS channel #i (i=1 through n) in each of the SDH transmitting apparatus 2' and 3' (in a transmission frame in a higher layer)].

For this, each of the SDH transmitting apparatus 2' and 3' has mapping/demapping (MAP/DEMAP) units 2'-1 through 2'-n and 3'-1 through 3'-n according to the number of STS channels #i as shown in FIG. 56, for example. Each of the mapping/demapping units 2'-1 through 2'-n and 3'-1 through 3'-n includes a demapping unit 2'd or 3'd for taking out an ATM cell from a transmission frame in the upstream or in the downstream and outputting the ATM cell to the ATM cell processing unit 4'-i and a mapping unit 2'm or 3'm for storing (mapping) an ATM cell from the ATM cell processing unit 4'-i in a transmission frame in the upstream or in the downstream and outputting the ATM cell to another transmitting apparatus. The ATM processing apparatus 4' has ATM cell processing units 4'-1 through 4'-n according to the number of the STS channels #i.

Each of the SDH transmitting apparatus 2' and 3' can thereby perform the above ATM cell mapping/demapping process for each STS channel #i by the mapping/demapping units 2'-1 through 2'-n and 3'-1 through 3'-n. The ATM cell processing unit 4'-i can perform the above cell processing for each STS channel Namely, the ATM processing apparatus 4'performs the cell processing on ATM cells in transmission frames handled by each of the SDH transmitting apparatus 9'-1 through 9'-n separately for each STS channel #i by each exclusive ATM cell processing unit 4'-i serially.

For instance, an ATM cell from the SDH transmitting apparatus 9'1, 9'-2, . . . or 9'-n in the lower hierarchy of the SDH transmitting apparatus 3' is taken out from a transmission frame in the mapping/demapping unit 3'-1, 3'-2, . . . or 3'-n corresponding to, the STS channel #i, and sent to a corresponding ATM cell processing unit 4'-i according to an internal reference cell cycle of the ATM processing apparatus 4'.

Each of the ATM cell undergoes the cell processing in the ATM cell processing unit 4'-i corresponding to the STS channel #i, is mapped on a transmission frame in the corresponding mapping unit 2'-1, 2'-2, . . . or 2'-n, and transmitted to the SDH transmitting apparatus 9'-1, 9'-2, . . . or 9'-n accommodated in the lower hierarchy of the SDH transmitting apparatus 2'.

Each of the ATM cell processing units 4'-i identifies an ATM cell, and executes fault management [termination of an AIS (Alarm Indication Signal) or an RDI (Remote Defect Indication) cell] on an ALM (Alarm) cell of an OAM cell, mainly.

For instance, when the ATM processing apparatus 4' receives an OAM (ALM) cell (VP/VC-AIS) indicating occurrence of a trouble within a certain VP/VC connection, the ATM processing apparatus 4' notifies of a similar AIS the downstream, or when receiving an alarm (SONET alarm or the like) in a higher layer than AIS, the ATM processing apparatus 4' generates a VP/VC-AIS/RDI cell and sends the cell to a desired destination.

For this, each of the ATM cell processing unit 4'-i has, as shown in FIG. 56, for example, a cell identifying unit 4'a, a cell generating unit 4'b, a cell inserting unit 4'c for downstream, a cell inserting unit 4'd for upstream, and a microcomputer I/F unit 4'e.

The cell generating unit 4'b generates an ALM cell (VP-AIS, VC-AIS), and sends the cell to the downstream through the DnS cell inserting unit 4'c. On the other hand, an ALM cell (VP-RDI, VC-RDI) to be sent back is sent to the upstream through the UpS cell inserting unit 4'd.

The microcomputer I/F unit 4'e has an interface used to set an operation channel, operation environments and the like from a system CPU or collect maintenance and management information (ALM information and the like).

The ALM cell or the like outputted from the ATM cell processing unit 4'-1, 4'-2, . . . , or 4'-n is again mapped on a transmission frame in the mapping/demapping unit 2'-1, 2'-2, . . . or 2'-n, and received by another apparatus which is a destination of the ALM cell.

When data (ATM cell) such as images having a larger volume of information is transmitted by applying VOD (Video on Demand) to the above ring network 1', for example, a transmission capacity of the ring network 1' is increased. When a transmission rate of the ring network 1' is increased as above, a rate of occurrence of ATM cell loss, misinsertion and the like in the network (ATM communication) is increased with an increase of quantity of data (ATM cell) flow.

In particular, when a network structure (connection configuration) for a large capacity transmission of one point-to-n points or n points-to-n points, a variable bit rate communication and the like becomes complex, an increase of rate of occurrence of ATM cell loss, misinsertion and the like is noticeable.

Therefore, it is necessary to monitor an operation state of the network to detect the above cell loss or misinsertion and monitor a flow state in addition to the OAM. However, the ATM processing apparatus 4' shown in FIG. 56 executes only a fault management on ATM cells, not executing detection of cell loss and the like.

SUMMARY OF THE INVENTION

In the light of the above problems, an object of the present invention is to provide a fixed length data processing apparatus which can detect loss or misinsertion of fixed length data as an ATM cell, and monitor a flow state of the fixed length data in a transmission system having a high transmission rate.

The present invention therefore provide s a fixed length data processing apparatus processing fixed length data used in an asynchronous communication comprising a data processing unit for receiving at least the fixed length data and performing a desired data processing on the fixed length data, and an operation state monitoring process unit for performing a monitoring process to monitor an operation state of the asynchronous communication on the basis of the fixed length data received by the data processing unit.

According to this invention, the fixed length data processing apparatus can readily detect loss, misinsertion and the like of the fixed length data, and execute maintenance and management such as monitoring on a flow state and the like in a high speed communication.

BRIEF DESCRIPTION OF THE DRAWINGS

FIGS. 4(a) and 4(b) are block diagrams showing detailed structure of UTOPIAs in the ATM processing apparatus according to the embodiment;

FIGS. 5(a) through 5(e) are timing charts for illustrating a state where a cell from the ATM layer asynchronously inputted to the UTOPIA is transferred to a reference processing timing in the apparatus according to the embodiment;

FIG. 6 is a block diagram showing a cell processing unit according to the embodiment;

FIG. 21 is a diagram showing a list of internal states of a CAM discriminating unit according to the embodiment;

FIG. 22 is a diagram showing a time sequence of a processing control in the PM processing unit according to the embodiment;

FIG. 46 is a diagram showing an example of an address structure in a region of RAM1 and RAM2 according to the embodiment;

FIG. 47 is a diagram showing an example of a data structure of a region in the RAM1 according to the embodiment;

FIG. 48 is a diagram showing an example of data structure in a region of the RAM2 according to the embodiment;

FIGS. 51(a) and 51(b) are diagrams showing an example of a structure in a region of a FiFo RAM according to the embodiment;

FIG. 52 is a diagram showing an example of an address structure in a region of the FiFo RAM according to the embodiment;

FIG. 53 is a diagram showing a time sequence of a processing control in the PM processing unit according to the embodiment;

FIG. 54 is a diagram showing a time sequence of the processing control in the PM processing unit according to the embodiment;

FIG. 56 is a block diagram showing an SDH transmitting apparatus and a known ATM processing apparatus.

DESCRIPTION OF THE PREFERRED EMBODIMENTS

Hereinafter, description will be made of embodiments of this invention with reference to the drawings.

(1) Description of a System Structure

Figure 1:
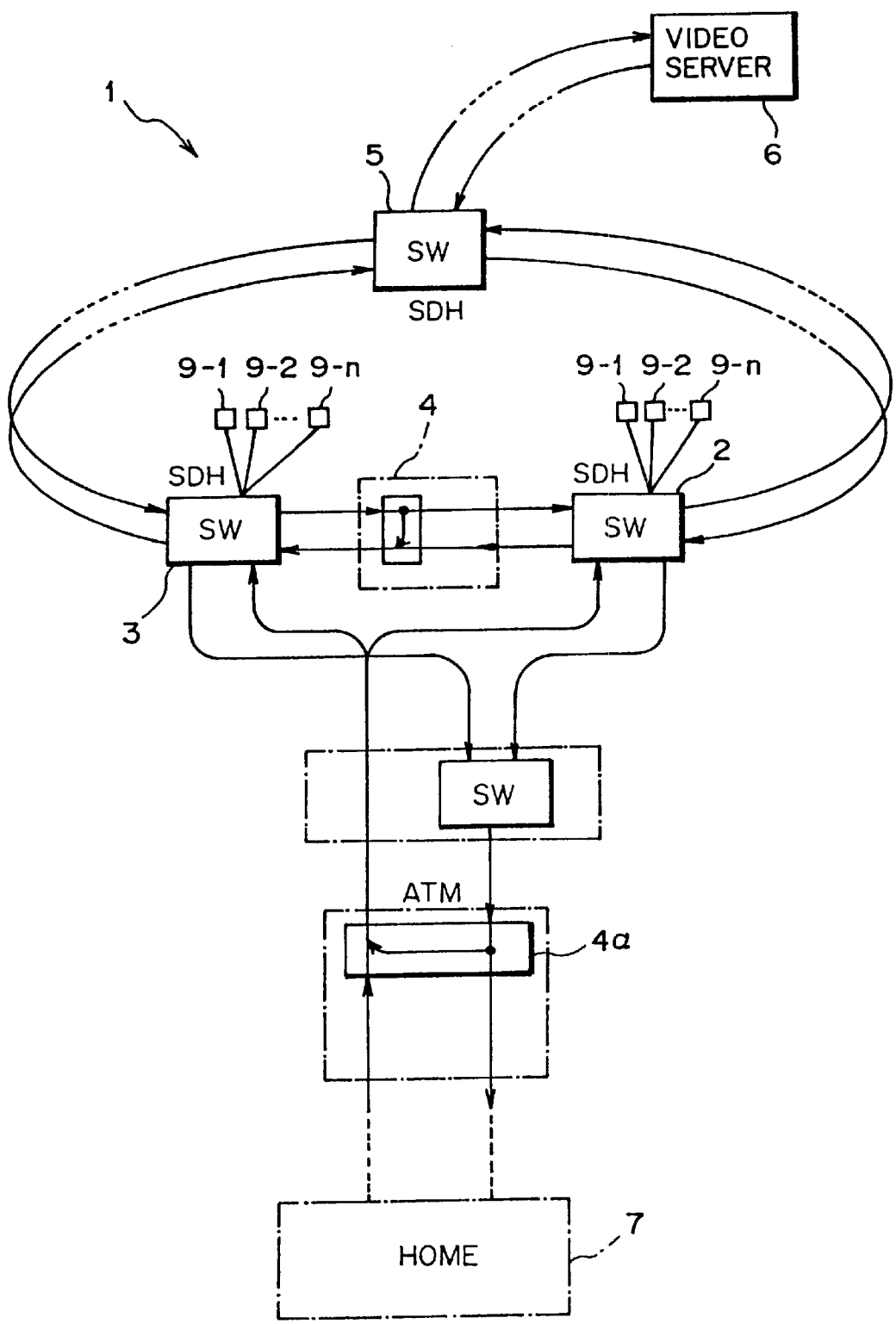
FIG. 1 is a block diagram showing a structure of a ring network configuring an SDH transmission network to which a fixed length data processing apparatus according to an embodiment of this invention is applied.

FIG. 1 is a block diagram showing a structure of a ring network 1 configuring an SDH transmission network to which a fixed length data processing apparatus according to an embodiment of this invention is applied. The ring network 1 shown in FIG. 1 accommodates a video server 6 which can provide image data and voice data to realize a VOD (Video on Demand) system which can provide desired image and voice such as a movie or the like to a subscriber (user) 7 from the video server 6 at an arbitrary time in response to a video view demand from the subscriber (user) 7 in a remote place.

Hereinafter, description will be made on an assumption that a large volume of information is transmitted in the ring network 1 by the VOD service.

The ring network 1 shown in FIG. 1 comprises SDH transmitting apparatus 2, 3 and 5 transmitting an SDH frame between the video server 1 and the subscriber 7. Each of the SDH transmitting apparatus 2 and 3 has, in the lower hierarchy, SDH transmitting apparatus 9-1 through 9-n handling a transmission frame [discriminated as an STS channel #i (apparatus identification information) in the SDH transmitting apparatus 2 and 3 (in a transmission frame in a higher layer, such as STS-3c or the like)] in a lower layer having a lower transmission rate than a transmission frame (STS-12, 48 or the like, for example) handled in the ring network 1.

In the ring network 1, there is provided an ATM processing apparatus (fixed length data processing apparatus) 4 between the SDH transmitting apparatus 2 and 3 to map an ATM cell on an SDH transmission frame, transmit the ATM cell, identify each ATM cell as a unit, and execute operation, administration and maintenance at the ATM communication level.

Figure 2:
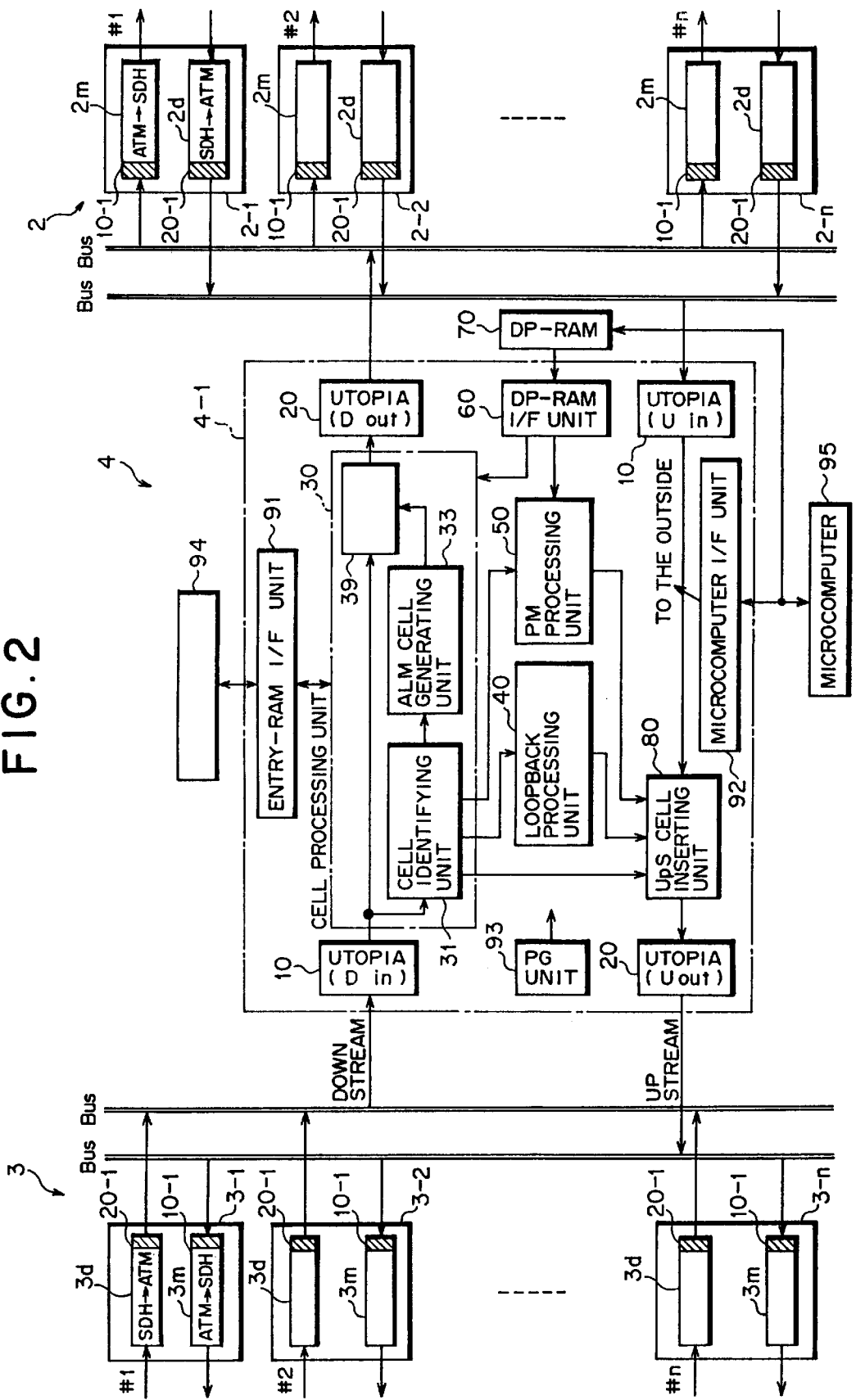
FIG. 2 is a block diagram showing an SDH transmitting apparatus and an ATM processing apparatus according to the embodiment.

The ATM processing apparatus 4 according to this embodiment of this invention comprises, as shown in FIG. 2, an ATM cell processing unit 4-1 common to mapping/demapping units (transmitting apparatus) 2-i and 3-i for STS channels #i (apparatus identification information), thereby performing a process on an ATM cell on each STS channel #i commonly to all the STS channels #i.

As shown in FIG. 2, each of the SDH transmitting apparatus 2 and 3 comprises the mapping/demapping units 2-i or 3-i to perform a mapping/demapping process on an ATM cell on each STS channel #i and exchange the ATM cell with the ATM cell processing unit 4-1. The mapping/demapping unit 3-i comprises a demapping unit 3d for taking out an ATM cell from a transmission frame in the downstream, a mapping unit 3m for storing an ATM cell outputted from the ATM cell processing unit 4-1 on a transmission frame in the upstream, an interface unit 20-1 for exchanging data with an interface unit 10 on the downstream side in the ATM processing apparatus 4, and an interface unit 10-1 for exchanging data with an interface unit 20 on the upstream side in the ATM processing apparatus 4.

Similarly, the mapping/demapping unit 2-i comprises a demapping unit 2d for taking out an ATM cell from a transmission frame in the upstream, a mapping unit 2m for storing an ATM cell outputted from the ATM cell processing unit 4-1 on a transmission frame in the downstream, an interface unit 10-1 for exchanging data with the interface unit 20 on the downstream side in the ATM processing apparatus 4, and an interface unit 20-1 for exchanging data with the interface unit 10 on the upstream side in the ATM processing apparatus 4.

The ATM processing apparatus 4 shown in FIG. 2 is provided with the ATM cell processing unit 4-1, a dual port RAM 70, a single port RAM 94, and a microcomputer (collectively managing unit) 95 as a system CPU.

The ATM cell processing unit 4-1 mainly identifies an ATM cell to execute fault management on an ALM (alarm) cell of an OAM cell [termination or the like of an AIS (Alarm Indication Signal) or an RDI (Remote Defect Indication) cell and the like]. According to this embodiment, the ATM cell processing unit 4-1 can also execute performance monitoring (hereinafter referred simply as "PM") on ATM cells.

The above PM function is to notify of a count of discarded cells or contents of the cell the microcomputer 95 according to a setting from the microcomputer 95, or to monitor a flow state of the cells and notify of a result of the monitoring the microcomputer 95.

To this end, the ATM cell processing unit 4-1 comprises the interface units 10 and 20 for exchanging an ATM cell with the interface units 10-1 and 20-1 of the mapping/demapping units 2-1 through 2-n and 3-1 through 3-n, a cell processing unit 30, an PM processing unit 50, an interface unit (DUEL PORT RAM I/F: hereinafter referred as "DP-RAM I/F unit") unit 60 for exchanging information with an externally attached dual port RAM 70 to be described later, a cell inserting unit for upstream (hereinafter referred as "UpS cell inserting unit") 80, an entry RAM (ENTRY-RAM) interface unit (hereinafter referred as "RAM access intervening unit", occasionally) 91 for exchanging information with the single port RAM 94 holding information necessary to identify an received cell, and a microcomputer interface unit (hereinafter referred as "microcomputer I/F unit", occasionally) 92 for exchanging information about various settings for PM with the microcomputer 95 and.notifying of it to each of the parts. The ATM cell processing unit 4-1 also comprises a sent-back (hereinafter referred as "LB") processing unit 40.

The interface unit 10 (for receiving) shown in FIG. 2 is configured with a UTOPIA (Universal Test & Operation PHY Interface for ATM) in this embodiment. The interface unit 10 receives a cell in asynchronization from an arbitrary mapping/demapping unit (physical layer) 2-i or 3-i based on UTOPIA interface standard and sends the received cell to the cell processing unit 30 according to a reference timing in the ATM cell processing unit 4-1.

The interface unit 20 (for transmitting) shown in FIG. 2 is configured with a UTOPIA; as well, which transmits a cell to an arbitrary mapping/demapping unit (physical layer) 2-i or 3-i in asynchronization based on UTOPIA interface standard. The interface unit 10-1 (for reception) and the interface unit 20-1 (for transmission) in the mapping/demapping units 2-i and 3-i (physical layer) are also configured with UTOPIAs.

(1-1) Description of the UTOPIA 20-1

Figure 3A:
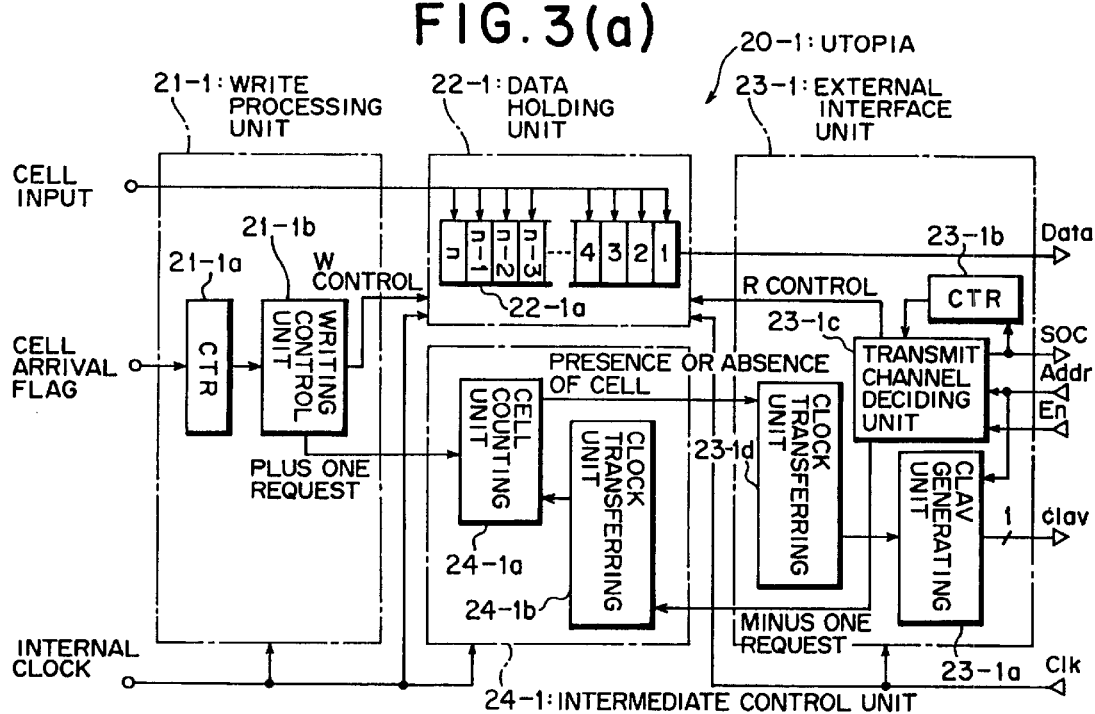
FIGS. 3(a) and 3(b) are block diagrams showing detailed structures of UTOPIAs in a mapping/demapping unit according to the embodiment.

FIG. 3(a) is a block diagram showing an example of a detailed structure of the UTOPIA 20-1 for transmission in the above mapping/demapping unit 2-i or 3-i. As shown in FIG. 3(a), the UTOPIA 20-1 comprises a write processing unit 21-1, a data holding unit 22-1, an intermediate control unit 24-1 and an external interface unit 23-1.

The data holding unit 22-1 holds a cell demapped in the demapping unit 2d (3d). In consideration that a cell reading process is halted in an external interface unit 23-1 due to delay of the data processing in the ATM processing apparatus 4, the data holding unit 22-1 comprises a data holding buffer 22-1a which can hold a plurality of cells.

The write processing unit 21-1 successively writes cells demapped in the demapping unit 2d (3d) in the above data holding buffer 22-1a. To this end, the write processing unit 21-1 comprises a counter 21-1a and a write control unit 21-1b.

The counter 21-1a counts up a count value by clocks corresponding to a length of cells with a cell arrival flag (H level) indicating cell inputting from the demapping unit 2d (3d) as a trigger. The writing control unit 21-1b executes a write control on the data holding.buffer 22-1a according to an output (count value) of the counter 21-1a, thereby successively writing cells transmitted from the demapping unit 2d (3d) one by one in the data holding buffer 22-1a.

The intermediate control unit 24-1 monitors the number of cells held in the above data holding buffer 22-1a to manage presence or absence of a cell to be transmitted to the ATM processing apparatus 4 (UTOPIA 11A). According to this embodiment, the intermediate control unit 24-1 comprises a cell counting unit (CTR) 24-1a, as shown in FIG. 3(a). Incidentally, reference numeral 24-1b denotes a clock transferring unit.

The above cell counting unit 24-1a counts up its count value according to "plus one request (receive complete signal)" received each time a cell is written in the data holding buffer 22-1a by the above writing control unit 21-1b, while counting down the count value according to "minus one request (transmit complete signal) received each time a cell is read out from the data holding buffer 22-1a by the transmit channel deciding unit 23-1c (to be, described later) in the external interface unit 23-1. When the count value is not less than 1, it is known that the data holding buffer 22-1a holds one cell or more.

The clock transferring unit 24-1b matches clocks for the above "plus one request" and "minus one request" notified the cell counting unit 24-1a. The clock transferring unit 24-1b matches clocks for the above requests by transferring a clock for the above "minus one request" notified according to an operation clock on the side of the external interface unit 23-1 (ATM processing apparatus 4) to a basic operation clock of the write processing unit 21-1 [on the side of the demapping unit 2d (3d)].

The clock transferring unit 24-1b is required since the external interface unit 23-1 operates according to a clock different from a clock on the side of the write processing unit 21-1 received from the ATM processing apparatus 4. Basically, the clock transferring unit 24-1b is dispensable when the write processing unit 21-1 and the external interface unit 23-1 operate according to the same clock.

The external interface unit 23-1 reads a cell held in the above data holding buffer 22-1a, and transmits the cell to the ATM processing apparatus 4. The external interface unit 23-1 comprises, as shown in FIG. 3(a), for example, a clav generating unit 23-1a, a counter 23-1b, a transmit channel deciding unit 23-1c and a clock transferring unit 23-1d.

When an address (Addr) signal from the ATM processing apparatus 4 indicates an STS channel #i handled by the UTOPIA 20-1 of its own and the UTOPIA 20-1 of its own is designated as a UTOPIA 20-1 that is an object of cell reception by the ATM processing apparatus 4, the clav generating unit 23-1a determines whether a count value of the cell counting unit 24-1a is not less than 1 or not. When the count value is not less than 1 and a cell to be transmitted exists, the clav generating unit 23-1a notifies of it the ATM cell processing unit 4 (UTOPIA 10) using a clav signal H level).

The transmit channel deciding unit 23-1c reads a cell held in the data holding buffer 22-1a of the data holding unit 22-1. When receiving a transmit permission from the UTOPIA 10 in response to the above notification by the clav generating unit 23-1a [when an enable signal (En) becomes H level] the transmit channel deciding unit 23-1c reads one cell from the data holding buffer 22-1a, and transmits the cell along with a signal SOC (H level) indicating initiation of cell reading (transmitting) to the UTOPIA 10.

The counter 23-1b counts up its count value by clocks corresponding to a length of cells with the cell reading (H level of the above transmit start signal SOC) by the transmit channel deciding unit 23-1c as an opportunity (trigger). The transmit channel deciding unit 23-1c monitors the count value to determine an end of cells being now read out, thereby performing the next reading process.

The clock transferring unit 23-1d transfers the clock for a signal indicating presence or absence of a cell from the cell counting unit 24-1a inputted to the clav generating unit 23-1a to the basic operation clock of the external interface unit 23-1 (on the side of the ATM processing apparatus 4). Incidentally, the clock transferring unit 23-1d is dispensable when the write processing unit 21-1 and the external interface unit 23-1 operate according to the same clock, similarly to the clock transferring unit 24-1b in the intermediate control unit 24-1.

In the UTOPIA 20-1 for transmitting in the mapping/demapping unit 2-i or 3-i (physical layer) with the above structure, cells taken out from a frame by the demapping unit 2d (3d) are successively written in the data holding buffer 22-1a by the writing control unit 21-1b. At this time, the intermediate control unit 24-1 counts up a count value of the cell counting unit 24-1a according to "plus one request" outputted from the writing control unit 21-1b each time a cell is written in the data holding buffer 22-1a.

In the external interface unit 23-1, when an STS channel #i handled by the transmit channel deciding unit 23-1c is indicated by an address (Addr) signal and its own UTOPIA 20-1 is designated as a UTOPIA 20-1 that is an object of cell reception by the ATM processing apparatus (UTOPIA 10), the clav generating unit 23-1a determines whether a count value of the cell counting unit 24-1a in the intermediate control unit 24-1 is not less than 1 or not. When the count value is not less than 1, the clav generating unit 23-1a makes the clav signal "H" level, and notifies the UTOPIA 10 that the UTOPIA 20-1 of its own holds a cell to be transmitted.

When receiving a transmit permission from the UTOPIA 10 in response to the above notification (when the STS channel #i handled by itself is indicated in the address signal, and the enable signal becomes H level), the transmit channel deciding unit 23-1c starts to read cells from the data holding buffer 22-1a and makes the reading start signal SOC H level, and reads only one cell from the data holding buffer 22-1a according to the count value of the counter 23-1b.

The transmit channel deciding unit 23-1c sends "minus one request" to the cell counting unit 24-1a in the intermediate control unit 24-1 when reading a cell from the data holding buffer 22-1a. The cell counting unit 24-1a counts down the count value by one when receiving the "minus one request".

After that, each time an address signal from the UTOPIA 10 indicates the STS channel #i handled by itself, the UTOPIA 20-1 repeats the above transmitting (reading) process so long as a cell is held in the data holding buffer 22-1a, so as to successively read cells held in the data holding buffer 22-1a and transmit the cells to the UTOPIA 10 (ATM cell processing unit 4).

(1-2) Description of the UTOPIA 10-1

Figure 3B:
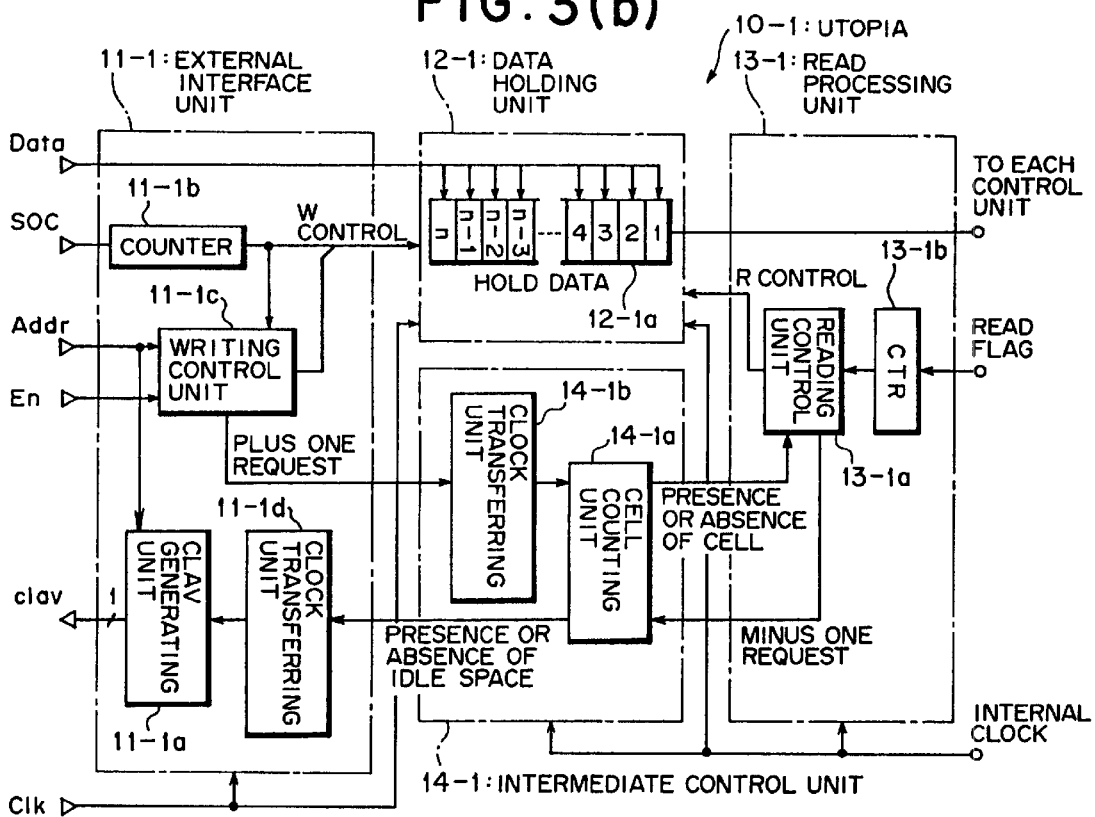

FIG. 3(b) is a block diagram showing a detailed structure of the UTOPIA 10-1 for receiving in the above mapping/demapping unit 2-i or 3-i (physical layer). As shown in FIG. 3(b), the UTOPIA 10-1 comprises an external interface unit 11-1, a data holding unit 12-1, an intermediate control unit 14-1 and a read'processing unit 13-1.

The data holding unit 12-1 holds a cell processed in the ATM processing apparatus 4. In this case, in consideration that the cell reading process might stop in the read processing unit 13-1 due to delay of the mapping process in the mapping unit 2m (3m), the data holding unit 12-1 comprises a data holding buffer 12-1a which can hold a plurality of cells in units of cell.

The external interface unit 11-1 receives a cell processed in the ATM processing apparatus 4, and makes the above data holding buffer 12-1a hold the cell (writes the cell in the data holding buffer 12-1a). The external interface unit 11-1 comprises, as shown in FIG. 3(b), a clav generating unit 11-1a, a counter 11-1b, a writing.control unit 11-1c and a clock transferring unit 11-1d.

When an address (Addr) signal indicates an STS channel #i handled by itself and the ATM processing apparatus 4 (UTOPIA 20) designates the UTOPIA 10-1 of its own as a UTOPIA 10-1 that is an object of cell reception, the clav generating unit 11-1a determines whether there is a free space (a space for a received cell) in the data holding buffer 12-1a or not on the basis of a count value of a cell counting unit 14-1a (to be described later) in the intermediate control unit 14-1. When there is a free space, the clav generating unit 11-1a notifies of it the UTOPIA 20 using a clav signal (H level).

The counter 11-1b counts up its count value by clocks corresponding to a length of cells with H level of a cell transmission start signal SOC from the UTOPIA 20. The writing control unit 11-1c monitors the count value of the counter 11-1b to determine an end of the received cells so as to successively write the next received cell.

When receiving a receive permission from the UTOPIA 20 in response to the notification about a free space in the data holding buffer 12-1a from the above clav generating unit 11-1a (when an enable signal becomes H level), the writing control unit 11-1c writes received cells in the data holding buffer 12-1a according to the count value of the above counter 11-1b. The clock transferring unit 11-1d transfers a clock for a signal indicating presence or absence of a free space from the cell counting unit 14-1a inputted to the clav generating unit 11-1a to a basic operation clock of the external interface unit 11-1 (on the side of the ATM processing apparatus 4).

The intermediate control unit 14-1 monitors the number of cells (holding status) in the above data holding buffer 12-1a to manage presence or absence of a cell to be transmitted to the mapping unit 2m (3m) and a free space in the data holding buffer 12-1a. To this end, the intermediate control unit 14-1 comprises a cell counting unit (CTR) 14-1a. Incidentally, reference numeral 14-1b denotes a clock transferring unit.

The above cell counting unit 14-1a counts up its count value according to "plus one request" received each time a cell is written in the data holding.buffer 12-1a by the above counter 11-1b, while counting down the count value according to "minus one request" received each time a cell is read out from the data holding buffer 12-1a by a reading control unit 13-1a (to be described later). When the count value is not less than 1, it is known that a cell is held in the data holding buffer 12-1a. Further, when the count value is below a capacity value of the data holding buffer 12-1a, it is known that there is a free space in the data holding buffer 12-1a.

The above clock transferring unit 14-1b matches the clocks for "plus one request" from the writing control unit 11-1c and "minus one request" from the reading control unit 13-1a notified the cell counting unit 14-1a. In this case, the clock transferring unit 14-1b is dispensable when the external interface unit 11-1 and a read processing unit 13-1 operate according to the same clock.

The above read processing unit 13-1 successively reads out cells from the data holding unit 12-1a according to a cell transmit request (read flag) from the mapping unit 2m (3m). To this end, the read processing unit 13-1 comprises, as shown in FIG. 3(b), the reading.control unit 13-1a and a counter 13-1b.

The counter 13-1b counts up a count value thereof by clocks corresponding to a length of cells with the read flag (H level) from the mapping unit 2m (3m) as a trigger. The reading control unit 13-1a successively reads out the cells from the data holding buffer 12-1a one by one according to the count value of the counter 13-1b so long as a cell is held in the data holding buffer 12-1a. The reading control unit 13-1a sends the above "minus one request" to the cell counting unit 14-1a in the intermediate control unit 14-1 each time a cell is read out.

In the UTOPIA 10-1 for receiving in the mapping/demapping unit 2-i or 3-i (physical layer) with the above structure when an address (Addr) signal from the ATM processing apparatus 4 (UTOPIA 20) indicates an STS channel #i handled by the UTOPIA 10-1 and the UTOPIA 10-1 is designated as a UTOPIA 10-1 that is an object of cell reception, the clav generating unit 11-1a determines whether there is a free space in the data holding buffer 12-1a or not on the basis of a count value of the cell counting unit 14-1a in the intermediate control unit 14-1. When there is a free space, the clav generating unit 11-1a makes the clav signal H level, and notifies of it the UTOPIA 20.

When receiving a receive permission from the UTOPIA 20 (when the enable signal becomes H level) in response to the notification, the writing control unit 11-1c writes a received cell (DATA) in the data holding buffer 12-1a according to a count value of the counter 11-1b, which starts to count up, with H level of the transmission start signal SOC from the UTOPIA 20 as a trigger.

At this time, the writing control unit 11-1c sends "plus one request" to the cell counting unit 14-1a in the intermediate control unit 14-1 each time one cell is written in the data holding buffer 12-1a. The cell counting unit 14-1a counts up the count value by one when receiving the "plus one request".

After that, each time an address signal from the UTOPIA 20 indicates the STS channel #i handled by itself, the UTOPIA 10-1 performs the above receiving (writing) process so long as there is a free space in the data holding buffer 12-1a to successively write cells in the data holding buffer 12-1a.

In the read processing unit 13-1, the counter 13-1a starts to count up with that the read flag from the mapping unit 2m (3m) becomes H level as a trigger. With this, the reading control unit 13-1a successively reads out cells from the data holding buffer 12-1a according to a count value of the counter 13-1b so long as a cell is held in the data holding buffer 12-1a, and sends the cells to the mapping unit 2m (3m). The reading control unit 13-1a outputs "minus one request" to the cell counting unit 14-1a in the intermediate control unit 14-1 each time.one cell is read out.

(1-3) Description of the UTOPIA 10

FIG. 4(a) is a block diagram showing an example of a detailed structure of the UTOPIA 10 for receiving in the above ATM processing apparatus 4 (ATM layer). As shown in FIG. 4(a), the UTOPIA 10 comprises an external interface unit 11, a data holding unit 12, an intermediate control unit 13 and a read processing unit 14.

The data holding unit 12 holds a cell transmitted from the above UTOPIA 20-1 on the side of the mapping/demapping unit 2-i or 3-i (physical layer). In this case, in consideration that the cell reading process might stop in the read processing unit 14 due to delay of the data processing in the UTOPIA 20 to be described later, the data holding unit 12 comprises a data holding buffer 12a which can hold a plurality of cells in units of cell.

The intermediate, control unit 13 monitors the number of cells (holding status) held in the above data holding buffer 12a to manage presence or absence of a cell to be outputted to a cell processing unit 30 to be described later and a free space in the data holding buffer 12a, while managing STS channels #i of cells held in the data holding buffer 12a. To this end, the intermediate control unit 13 comprises an STS channel holding buffer 13a and a cell counting unit (CTR) 13b.

The STS channel holding buffer 13a holds an STS channel #i of a cell held in the above data holding buffer 12a. As will be described later, an STS channel #i decided by a receive channel deciding unit (writing control unit) 11c (to be described later) in the external interface unit 11 is written in the STS channel holding buffer 13a.

Namely, the above data holding buffer 12a and the STS channel holding buffer 13a can store a cell and an STS channel #i [identification information on physical layer (mapping/demapping unit 2-i or 3-i), respectively.

The cell counting unit 13b counts the number of cells of each STS channel #i held in the buffer 13a. The cell counting unit 13b comprises counters (not shown) for respective channels #i to manage the number of held cells of respective STS channels #i by counting up/counting down a count value of a corresponding counter (counter not shown for each STS channel #i) in response to "plus one request"/ "minus one request" received each time a cell is written in/read out from the data holding buffer 12a by the receive channel deciding unit 11c and the reading control unit 14a (to be described later).

The external interface unit (receiving interface unit) 11 receives a cell from an arbitrary mapping/demapping unit 2-i or 3-i (physical layer), correlates the cell with an STS channel #i of the cell, and writes the cell and the STS channel #i in the buffers 12a and 13d, thereby managing the received cell for each STS channel #i.

The external interface unit 11 gives a cell transmit permission to an arbitrary UTOPIA 20-1 on the basis of the cell holding status in the UTOPIA 20-1 to receive a cell from the UTOPIA 20-1. As shown in FIG. 4(a), the external interface unit 11 comprises an valid channel holding unit 11a, a counter 11b and the receive channel deciding unit 11c.

When the receive channel deciding unit 11c designates a UTOPIA 20-1 that is an object of cell reception in polling (serially) using an address signal, the valid channel holding unit la holds a clav signal indicating whether the UTOPIA 20-1 has a cell to be transmitted or not (H level when the UTOPIA 20-1 has a cell, or L level when not) sent back from each of the UTOPIAs 20-1, thereby storing cell holding status information on each STS channel #i.

The receive channel deciding unit 11c decides an STS channel #i [UTOPIA 20-1] that is an object of cell reception on the basis of the holding status information held in the valid channel holding unit 11a and free space information on the data holding buffer 12a managed for each STS channel #i by the cell counting unit 13b, sends an enable signal (H level) and an address signal indicating a receive STS channel #i (gives a transmit permission) to a UTOPIA 20-1 of the decided receive STS channel #i, receives a cell from the UTOPIA 20-1, and writes the received cell in the data holding buffer 12a, while writing the above decided receive STS channel #i in the STS channel holding buffer 13a.

Namely, the above receive channel deciding unit 11c receives notifications about the cell holding status from a plurality of UTOPIAs 20-1 [physical layer (mapping/demapping units 2-i or 3-i) serially, so as to decide a UTOPIA 20-1 to which the above enable signal (H level) should be given. The receive channel deciding unit 11c sends the above "plus one request" to the cell counting unit 13b each time one cell and an STS channel #i of the cell are written.

The counter 11b counts up its count value by clocks corresponding to a length of cells with a cell transmission start signal SOC (H level) from the UTOPIA 20-1 as a trigger. The receive channel deciding unit 11c monitors the count value of the counter 11c to determine an end of the received cells, and starts decision of the next receive STS channel #i at that timing (decide timing).

The read processing unit 14 reads a cell written in the data holding buffer 12a by the above external interface unit 11, reads an STS channel #i corresponding to the cell from the STS channel holding buffer 13a, and outputs the cell and the STS channel #i to the cell processing unit 30 to be described later. The read processing unit 14 comprises, as shown in FIG. 4(a), a reading control unit 14a and a counter 14b.

The counter 14b counts up its count value by clocks corresponding to a length of cells with a read flag (H level) from the cell processing unit 30 (to be described later) as a trigger. The reading control unit 14a successively reads out cells from the data holding buffer 12a each time the count value of the counter 14b becomes an initial value so long-as a cell is held in the data holding buffer 12a. The reading control unit 14a sends the above "minus one request" to the cell counting unit 13b each time one cell is read out.

According to this embodiment, the cell processing unit 30 (to be described later) sends the above read flag in units of length of a cell (unit of one cell).

Hereinafter, description will be made in detail an operation of the UTOPIA 10 for receiving in the ATM processing apparatus 4 (ATM layer) with the above structure according to this embodiment.

The receive channel deciding unit 11c of the external interface unit 11 sends an address signal in order (serially) to any one of the UTOPIA 20-1 for transmitting in an opposite mapping/demapping unit 2-i or 3-i to designate a UTOPIA 20-1 that is an object of cell reception in polling.

When the UTOPIA 20-1 is designated as a UTOPIA 20-1 that is an object of cell reception by the above address signal, the clav generating unit 23-1a [refer to FIG. 3(a)] in the external interface unit 23-1 sends back a cell holding status (as to whether the UOPTIA 20-1 holds a cell to be transmitted or not) using a clav signal.

The external interface unit 11 serially receives the clav signals in the above order designated by the valid channel holding unit 11a to store cell holding status information on each STS channel #i, and displays the stored contents in the receive channel deciding unit 11c.

The receive channel deciding unit 11c decides a UTOPIA 20-1 (STS channel #i) that is an object of cell reception on the basis of the stored contents (cell holding status information) and presence or absence of a free space in the data holding buffer 12a managed for each STS channel #i by the cell counting unit 13b in the intermediate control unit 13, and sends an enable signal (H level) and an address signal to the decided UTOPIA 20-1.

Namely, the external interface unit 11 polls a cell holding status in the UTOPIA 20-1 for each physical layer (mapping/demapping unit 2-i or 3-i), serially receives notification about the cell holding status of each UTOPIA 20-1, confirms the cell holding status of each STS channel #i and decides which mapping/demapping unit 2-i or 3-i (UTOPIA 20-1) of an STS channel #i among the STS channels #i a transmit permission should be given to.

The UTOPIA 20-1 starts to read a cell by the transmit channel deciding unit 23-1c. In the external interface unit 11, the counter 11b operates (counts up) with a cell reading start signal SOC (H level) sent from the transmit channel deciding unit 23-1c of the UTOPIA 20-1 as a trigger.

According to a count value of the counter 11b, the receive channel deciding unit 11c performs a writing control on the buffers 12a and 13a to write a received cell in the data holding buffer 12a in the data holding unit 12, while writing an STS channel #i of the cell in the STS channel holding buffer 13a in the intermediate control unit 13.

At this time, the receive channel deciding unit 11c sends "plus one request" with respect to the number of held cells to the cell counting unit 13b in the intermediate control unit 13 each time one cell is written in the data holding buffer 12a. The cell counting unit 13b counts up a count value of the STS channel #i to update information about the number of cells held in the data holding buffer 12a each time the cell counting unit 13b receives the "plus one request".

On the other hand, the read processing unit 14 refers to each count value of the cell counting unit 13b in the intermediate control unit 13 on occasion to monitor presence or absence of a cell in the data holding buffer 12a. If a cell is held in the data holding buffer 12a, the read processing unit 14 reads a cell in the order written from the data holding buffer 12a and reads an STS channel #i of the read cell from the STS channel holding buffer 13a, and outputs the cell and the STS channel #i to the cell processing unit 30 (Ups cell inserting unit 80).

At this time, the reading control unit 14a sends "minus one request" with respect to the number of held cells to the cell counting unit 13b each time the reading control unit 14a reads one cell from the data holding buffer 12a. The cell counting unit 13b counts down a count value of a corresponding STS channel #i each time the cell counting unit 13b receives the "minus one request" to update information about the number of held cells of the STS channel #i, and shifts forward a position in the STS channel holding buffer 13a at which the next STS channel #i is written.

Namely, the above external interface unit 11, the data holding unit 12 and the intermediate control unit 13 function as a received data managing unit for receiving a cell from an arbitrary physical layer among a plurality of physical layers (mapping/demapping units 2-i or 3-i) and managing the cell for each STS channel #i based on the STS channel #i as identification information about the physical layer. The read processing unit 14 transmits a cell along with the STS channel #i managed by the received data managing unit to the cell processing unit 30 to be described later.

As above, the read processing unit 14 outputs, for example, received cells (D1, D2, D3, D4 and D5) in the downstream shown in FIG. 5(*a*) received at an a synchronous timing from a physical layer (mapping/demapping unit 3-*i*) at a timing in synchronization with a length of the cell (at a reference timing in the ATM cell processing unit 4-1; cell synchronization) to the cell processing unit 30 (to be described later) [refer to FIGS. 5(*c*) and 5(*d*)].

Received cells (U1, U2, U3 and U4) in the upstream shown in FIG. 5(*b*) received at an a synchronous timing from a physical layer (mapping/demapping unit 2-*i*) are transferred to the reference timing in the ATM cell processing unit 4-1 shown in FIG. 5(*c*), and sent to the cell processing unit 30 (UpS cell inserting unit 80) (to be described later) as shown in FIGS. 5(*d*) and 5(*e*).

Namely, timings for ATM cell flows transmitting the-upstream and the downstream (positions of the leading cells) within the ATM cell processing unit 4-1 become the same.

The reference timing in the ATM cell processing unit 4-1 is generated with 28 clocks (CLK) as one cycle, and one cycle is a range to process one cell (53 bytes). The reason why 28 clocks are one cycle is as follows. When a cell of 53 bytes is processed in parallel by 16 bits, one cell can be processed in 27 clocks. However, if an access is had to the single port RAM 94 once in four clocks, for example, 27 clocks cannot be divided. Therefore, 28 clocks are determined to be one cycle. When one cell is not processed in parallel by 16 bits, or when an access timing to the single port RAM 94 is altered, the number of clocks of the reference timing differs. Hereinafter, 28 clocks are assumed to be one cycle, but another clock number may be employed as one cycle.

(1-4) Description of the UTOPIA 20

FIG. 4(*b*) is a block diagram showing a detailed structure of the UTOPIA 20 for transmitting in the above ATM processing apparatus 4 (ATM layer). As shown in FIG. 4(*b*), the UTOPIA 20 comprises a write processing unit 21, a data holding unit 22, an intermediate control unit 23 and an external interface 24.

The data holding unit 22 holds a cell outputted from the cell processing unit 30 (UpS cell inserting unit 80) (to be described later). In consideration that a cell reading process in the external interfacing unit 24 might halt due to delay of a mapping process in the mapping unit 2*m* (3*m*), the data holding unit 22 comprises a data holding buffer 22*a* which can hold a plurality of cells.

The intermediate control unit 23 monitors the number of cells (holding status) held in the above data holding buffer 22*a* to manage presence or absence of a cell to be outputted to the UTOPIA 10-1, while managing an STS channel #*i* of the cell held in the data holding buffer 22*a*. To this end, the intermediate control unit 23 comprises an STS channel holding buffer 23*a* and a cell counting unit (CTR) 23*b*.

The STS channel holding buffer 23*a* holds an STS channel #*i* of a cell held in the above data holding buffer 22*a*, in which an STS channel #*i* outputted together with a cell from the cell processing unit 30 (UpS cell inserting unit 80) (to be described later) is written by a writing control unit 21*a* of the write processing unit 21.

Namely, the above data holding buffer 22*a* and the STS channel holding buffer 23*a* function as a storing unit for transmission which can store a cell and an STS channel #*i* [identification information on a physical layer (mapping/demapping unit 2-*i* or 3-*i*)].

The cell counting unit 23*b* counts the number of cells held in the buffer 22*a* for each STS channel #*i*. To this end, the cell counting unit 23*b* comprises counters (not shown) for respective STS channels #*i* to count up/count down of a count value of a corresponding counter (counter not shown for each STS channel #*i*) in response to "plus one request"/"minus one request" received each time a cell is written in/read out from the buffer 22*a* by the writing control unit 21*a* (to be described later) and a transmit channel deciding unit 24*a* (to be described later), thereby managing the number of held cells of each STS channel #*i*.

The write processing unit 21 receives a cell processed in the cell processing unit 30 (UpS cell inserting unit 80) (to be described later), and successively writes the cell in the data holding buffer 22*a*, while successively writing an STS channel #*i* of the cell in the STS channel holding buffer 23*a*. To this end, the write processing unit 21 comprises, as shown in FIG. 4(*b*), a counter 21*b* and the writing control unit 21*a*.

The counter 21*b* counts up with a cell arrival flag (H level) indicating a cell inputting from the cell processing unit 30 (UpS cell inserting unit 80) (to be described later) as a trigger. The writing control unit 21*a* performs a writing control on the buffers 22*a* and 23*a* according to an output (count value) of the counter 21*b* to write a cell from the cell processing unit 30 (UpS cell inserting unit 80) (to be described later) in the data holding buffer 22*a*, while writing an STS channel #*i* from the cell processing unit 30 (UpS cell inserting unit) (to be described later) in the STS channel holding buffer 23*a*.

Namely, the above write processing unit 21 receives a cell to be transmitted to the UTOPIA 10-1 [opposite physical layer (mapping/demapping unit 2-*i* or 3-*i*)] and an STS channel #*i* of the cell from the cell processing unit 30 (UpS cell inserting unit 80) (to be described later), correlates the cell with the STS channel #*i*, and writes the cell and the STS channel #*i* in the buffers 22*a* and 23*a*, thereby managing the cell for each STS channel #*i*.

The external interface unit 24 reads a cell to be transmitted to the opposite physical layer (mapping/demapping unit 2-*i* or 3-*i*) (UTOPIA 10-1) from the data holding buffer 22*a*, and transmits the cell to the UTOPIA 10-1. The external interface unit 24 is configured as a permission sending type transmitting interface unit which gives a cell receive permission to an arbitrary UTOPIA 10-1 on the basis of the cell holding status (space for received cells) in the UTOPIA 10-1, and transmits the cell.

As shown in FIG. 4(*b*), the external interface unit 24 further comprises a valid channel holding unit 24*b*, a counter 24*c*, and a transmit channel deciding unit 24*a*.

When the transmit channel deciding unit 24*a* designates in polling (serially) a UTOPIA 10-1 that is an object of cell transmission using an address signal, the valid channel holding unit 24*b* holds a clav signal (H level in the case where there is a space, or L level in the case there is no space) indicating a cell holding status sent back from each UTOPIA 10-1, thereby storing the cell holding status (availability for receiving) for each STS channel #*i*.

The transmit channel deciding unit 24*a* decides a physical layer (mapping/demapping unit 2-*i* or 3-*i*) that is an object of cell transmission on the basis of the information held in the valid channel holding unit 24*b* and an STS channel #*i* held in the STS channel holding buffer 23*a*, sends an address signal (signal indicating an STS channel #*i*) and an enable signal (H level) (gives a receive permission) to the decided TUOPIA 10-1, reads a cell from the data holding buffer 22*a*, then transmits the cell to the UTOPIA 10-1.

Namely, the above transmit channel deciding unit 24*a* serially receives notification about a cell holding status from each of a plurality of UTOPIAs 10-1 [physical layers (mapping/demapping units 2-i or 3-i)] to decide a UTOPIA 10-1 to which the above enable signal (H level) should be given. The transmit channel deciding unit 24a sends the above "minus one request" to the cell counting unit 23a each time one cell is read out.

The counter 24c counts up its count value by clocks corresponding to a length of cells with a cell transmission start signal SOC (H level) to the UTOPIA 10-1 as a trigger. The above transmit channel deciding unit 24a monitors a count value of the counter 24c to determine an end of the transmit cells, and starts to decide the next transmit channel (STS channel #i) at that timing (decide timing).

The UTOPIA 20 for transmitting in the ATM processing apparatus 4 (ATM layer) with the above structure according to this embodiment starts to count up by the counter 21b in the write processing unit 21 when receiving a cell arrival flag from the cell processing unit 30 (UpS cell inserting unit 80) (to be described later), and performs the writing control on the data holding buffer 22a in the data holding unit 22 and the STS channel holding buffer 23a in the intermediate control unit 23 according to a count value of the counter 21b, thereby successively writing a cell and an STS channel #i of the cell outputted from the cell processing unit 30 (UpS cell inserting unit 80) (to be described later) in the buffers 22a and 23a.

At this time, the writing control unit 21a sends-"plus one request" with respect to the number of held cells to the cell counting unit 23b in the intermediate control unit 23 each time one cell is written in the data holding buffer 22a. The cell counting unit 23b updates a count value of a corresponding counter (counter not shown for each STS channel #i), and successively shifts a position in the STS channel holding buffer 23a at which the STS channel #i is written to the next to update the position each time the cell counting unit 23b receives the "plus one request".

In the external interface unit 24, the transmit channel deciding unit 24a sends an address signal in order (serially) to any one of the opposite UTOPIAs 10-1 for physical layer, thereby deciding a UTOPIA that is an object of cell transmission in polling.

When the UTOPIA 10-1 is designated as a UTOPIA 10-1 that is an object of cell transmission by the above address signal, the clav generating unit 11-1a [refer to FIG. 3(b)] in the external interface unit 11-1 sends back a cell holding status (as to whether there is a space for received cells or not) to the UTOPIA 20 (external interface unit 24) using a clav signal.

The external interface unit 24 serially receives the clav signal in the order designated, stores the cell holding status of each STS channel #i, and displays the stored contents in the transmit channel deciding unit 24a.

The transmit channel deciding unit 24a decides an STS channel #i [physical layer (UTOPIA 10-1)] that is an object of cell transmission on the basis of presence or absence of a cell in the data holding buffer 22a managed for each STS channel #i by the cell counting unit 23b in the intermediate control unit 23 and the STS channel #i stored in the STS channel holding buffer 23a in the intermediate control unit 23.

Namely, the external interface unit 24 polls a cell holding status (space for received cells) in each physical layer (UTOPIA 10-1), serially receives a notification (clav signal) about the above cell holding status from each physical layer (UTOPIA 10-1) to decide which physical layer among the physical layers (UTOPIAs 10-1) a cell receive permission should be given to.

The transmit channel deciding unit 24a sends an address signal and an enable signal (H level) to a UTOPIA 10-1 for the above decided transmit STS channel #i, reads a cell from the data holding buffer 22a, and transmits the cell along with a reading start signal SOC to the above UTOPIA 10-1.

At this time, the transmit channel deciding unit 24a sends "minus one request" with respect to the number of held cells to the cell counting unit 23b each time one cell is read out from the data holding buffer 22a. The cell counting unit 23b counts down a count value of the corresponding STS channel #i each time the cell counting unit 23b receives the "minus one request" to update information on the number of held cells of the STS channel #i, and shifts forward a position in the STS channel holding buffer 23a at which the next STS channel is written by one.

Namely, the above write processing unit 21, the data holding unit 22 and the intermediate control unit 23 manage a cell processed in the cell processing unit 30 (UpS cell inserting unit 80) to be described later for each physical layer on the basis of an STS channel #i as identification information on a physical layer (mapping/demapping unit 2-i or 3-i). The external interface unit 24 transmits the managed cells to an arbitrary physical layer on the basis of the above STS channel #i.

The cell processing unit 30 (data processing unit) shown in FIG. 2 receives fixed length data, and performs a desired data processing on the fixed length data. The cell processing unit 30 identifies data (cell) after cell synchronization (refer to FIG. 5), and terminates/generates an ALM (alarm) cell.

To this end, the cell processing unit 30 comprises, as shown in FIGS. 2 and 6, a cell identifying unit 31, an alarm managing unit 32, an ALM cell generating unit 33, a shift register 36, a VP termination information RAM 37, a 28-ary counter 38 and a cell inserting/discarding unit 39.

The cell identifying unit 31 identifies which kind of cell [user cell, or OAM (ALM, PM, LB) cell] a cell from the UTOPIA 10 is. When identifying a received cell, the cell identifying unit 31 reads entry information and the like on the received cell from the entry RAM 94, reads VP termination information from the VP termination information RAM 37, and identifies the received cell on the basis of the read information.

The cell identifying unit 31 notifies the alarm managing unit 32 that an alarm cell (cell) is detected. When the cell identifying unit 31 detects a cell to be discarded (hereinafter, called a discard cell), a cell discard request for the received cell to be discarded is notified the cell inserting/discarding unit 39, and contents of the received cell are notified the PM processing unit 50 by the cell identifying unit 31.

When identifying a received cell, the cell identifying unit 31 sends a read request to read entry information and the like on the received cell to the entry RAM interface (ENTRY-RAM I/F) unit 91 (to be described later). Read data in response to the read request is read out from the entry RAM 94 by the ENTRY-RAM I/F unit 91 (to be described later), and sent to the cell identifying unit 31. The cell identifying unit 31 can also detect a received cell to be discarded.

The 28-ary counter 38 generates a count value on the basis of a frequency dividing signal from the PG unit 93 (to be described later). The count value is counted from 0 to 27, which corresponds to 28 clocks of the reference timing in the ATM cell processing unit 4-1.

The alarm managing unit 32 manages information (alarm state information and the like) on an alarm (ALM) identified by the cell identifying unit 31. The ALM cell generating unit 33 reads alarm information on a certain VP managed in the alarm managing unit 32 and entry information on a VP/VC that is an object of ALM cell generation held in the entry RAM 94 to generate an ALM cell on the basis of the above information. When an ALM cell should be generated, the ALM cell generating unit 33 makes an insert request to insert an ALM cell to the cell insert/discarding unit 39 to insert the ALM cell to a received cell flow in the cell inserting/discarding unit 39. The ALM cell generating unit 33 does not receive all alarm information from the alarm managing unit 32, but reads each piece of the alarm information one by one in order.

The shift register 36 temporarily holds a cell received from the cell identifying unit 31. The VP termination information RAM 37 holds termination information on a VP. The cell inserting/discarding unit 39 transmits a received cell (user cell) from the shift register 36 to the UTOPIA 20 (for transmitting) on the downstream side, discards a cell corresponding to a received cell discard request from the cell identifying unit 31, and inserts an ALM cell in a cell flow in response to a cell insert request from the ALM cell generating unit 33.

The LB processing unit 40 shown in FIG. 2 executes a continuity test. In concrete, the LB processing unit 40 performs an LB processing based on the ATM transmission system to make a loopback request to loop back an LB cell (cell for continuity test) identified by the cell processing unit 30 and the LB processing unit 40 to the upstream side, or make an LB cell send request (request for sending an LB cell) by the LB setting from the microcomputer 95 to the UpS cell inserting unit 80.

Figure 7:
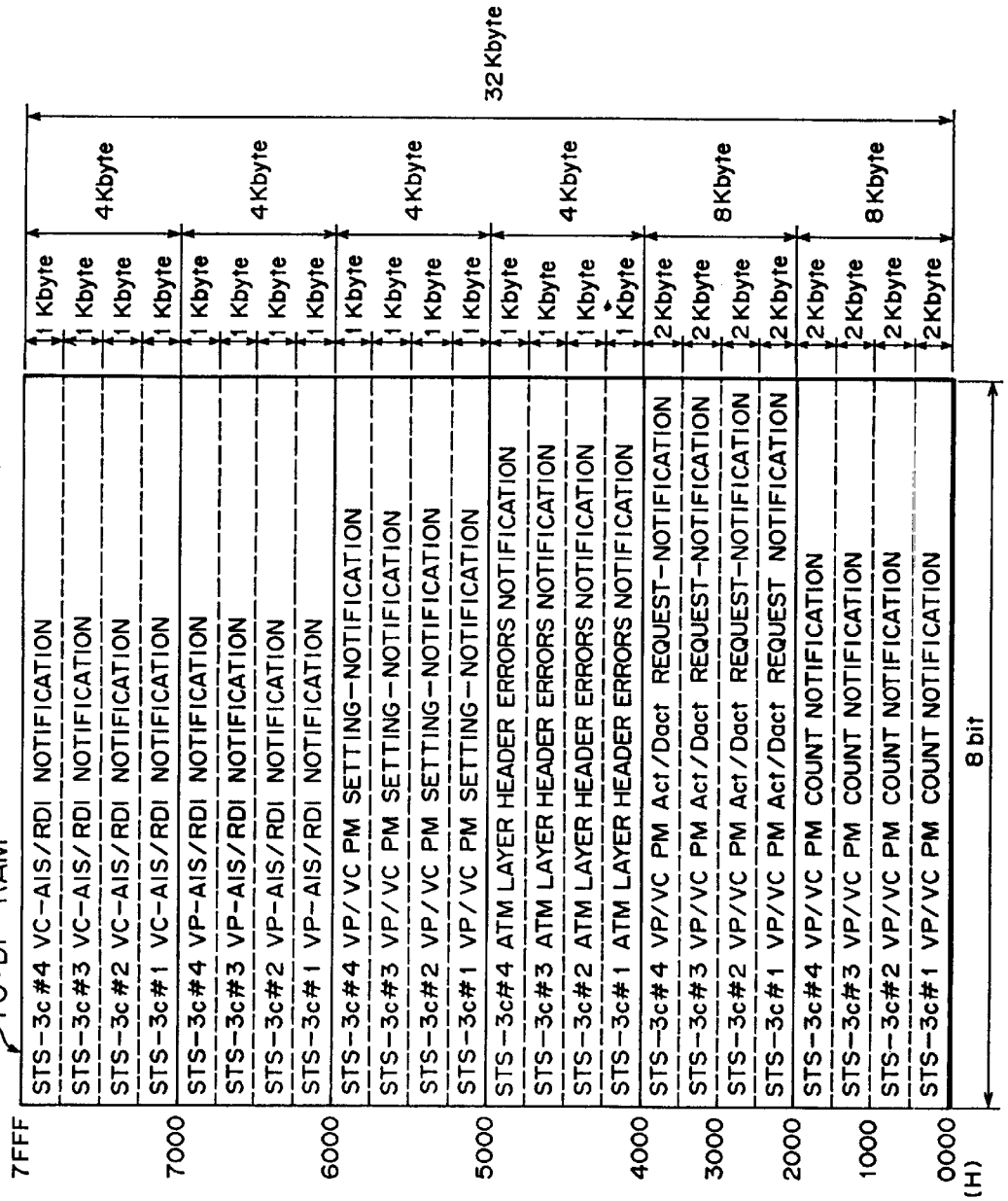
FIG. 7 is a diagram showing assignment of a region of a DP-RAM according to the embodiment.

The DP-RAM interface (Dual Port RAM I/F) unit 60 interfaces with the external DP-RAM 70, which writes ALM (AIS, RDI) information from the cell processing unit 30 in the DP-RAM 70, reads information relating to the PM processing set in the DP-RAM 70 from the microcomputer 95, and writes information to be notified the microcomputer 95 by the PM processing unit 50. When handling STS-3c, the DP-RAM 70 can hold information such as VC-AIS/RDI, VP-AIS/RDI and the like for each STS-3c (STS channel #i), as shown in FIG. 7, for example.

The UpS cell inserting unit 80 inserts a cell in a cell flow in the upstream in response to an ALM cell inserting request (request for inserting an ALM cell) from the cell processing unit 30, an LB cell inserting request (request for inserting an LB cell) from the LB processing unit 40 or a PM cell insert request (request for inserting a PM cell) from the PM processing unit 50. When there is a plurality of access requests to the entry RAM 94, the ENTRAY-RAM I/F 91 intervenes (intervention of timings) on the basis of predetermined order of priority of RAM accesses, for example, to perform an access processing to the entry RAM 94.

The microcomputer I/F unit 92 interfaces with the microcomputer 95, through which a setting of a system operation mode, a setting of an operation channel and the like are sent from the microcomputer 95, and these kinds of information are notified the inside of the ATM cell processing unit 4-1.

The PG unit 93 generates the reference timing in the ATM cell processing unit 4-1.

The PM processing unit 50 performs, as an operation state monitoring process unit, a monitoring process to monitor an operation state of the ATM communication on the basis of a cell received by the cell processing unit 30. In concrete, the PM processing unit 50 notifies of a cell identified by the cell processing unit 30 and the PM processing unit 50 the microcomputer 95, makes a sent-back request, counts for PM, and makes a PM cell send request (request for sending a PM cell) according to a PM setting from the microcomputer 95.

Figure 8:
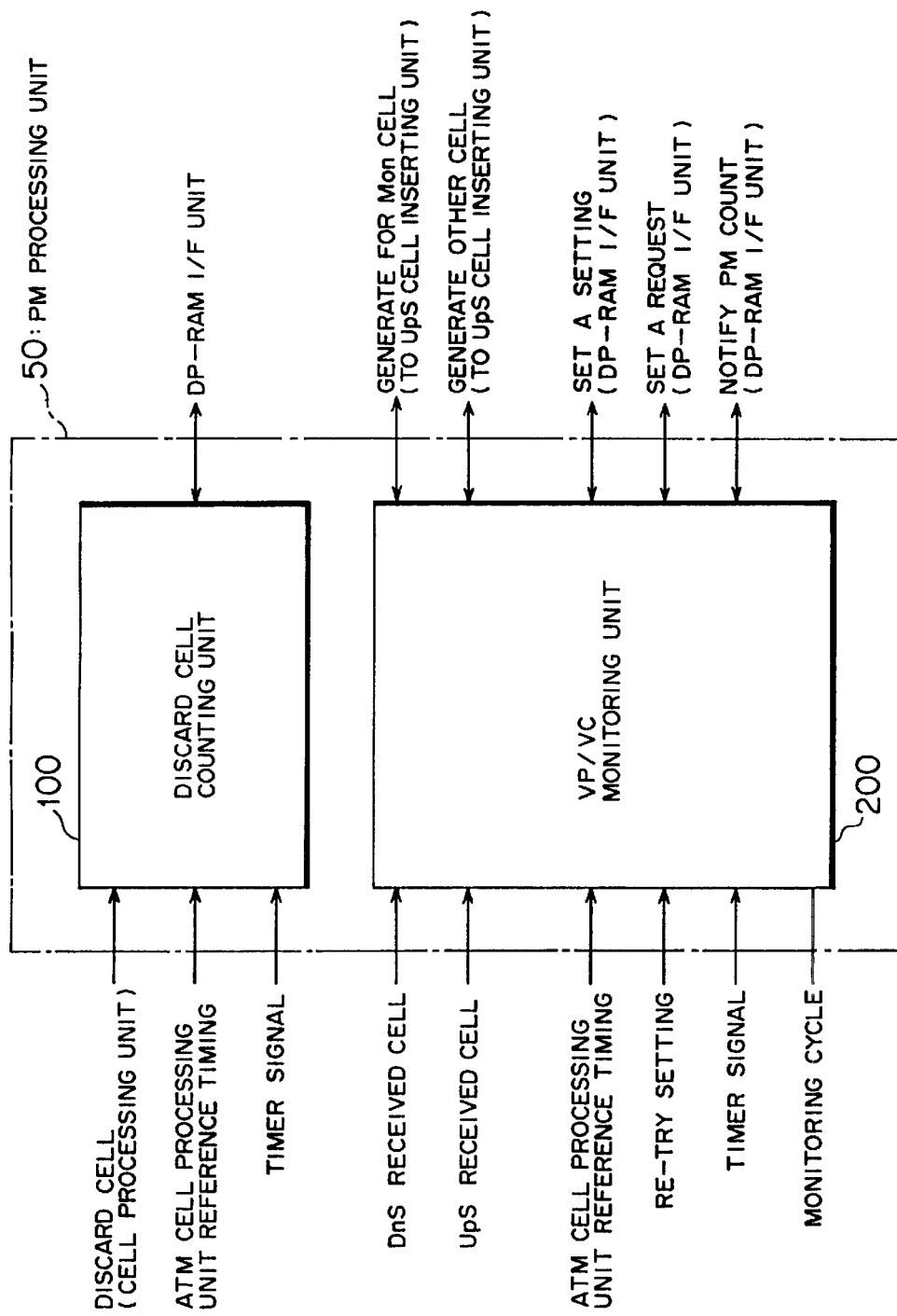
FIG. 8 is a block diagram showing a structure of a PM processing unit according to the embodiment.

To this end, the PM processing unit 50 comprises, as shown in FIG. 8, for example, a discard cell counting unit 100 and a VP/VC monitoring unit 200.

Hereinafter, the discard cell counting unit (discard state monitoring unit) 100 and the VP/VC monitoring unit (flow state monitoring unit) 200 will be separately described, wherein the same reference character designates a part having a similar function. Structures of the discard cell counting unit 100 and the VP/VC monitoring unit 200 will be described in detail later. First, time sequence of process controls in the PM processing unit 50 comprising the discard cell counting unit 100 and the VP/VC monitoring unit 200 are shown in FIGS. 22, 53 and 54.

(2) Description of the Discard Cell Counting Unit

The discard cell counting unit 100 collects and manages information on a discard cell that is identified as a cell that should be discarded by the cell processing unit 30 to monitor a discard state of an ATM cell, and notifies of a count of cells that become objects of the discarding and contents of the cell ((microcomputer 95). In concrete, the discard cell counting unit 100 counts the number of cells identified as discard cells within a predetermined monitoring cycle, identifies a VPI/VCI (Virtual Path Identifier/Virtual Channel Identifier) of the discard cell and a cause of the discarding (contents of discarding) of the discard cell, and notifies of these pieces of information the microcomputer 95. The above cause of the discarding is coded and notified the microcomputer 95.

Figure 9:
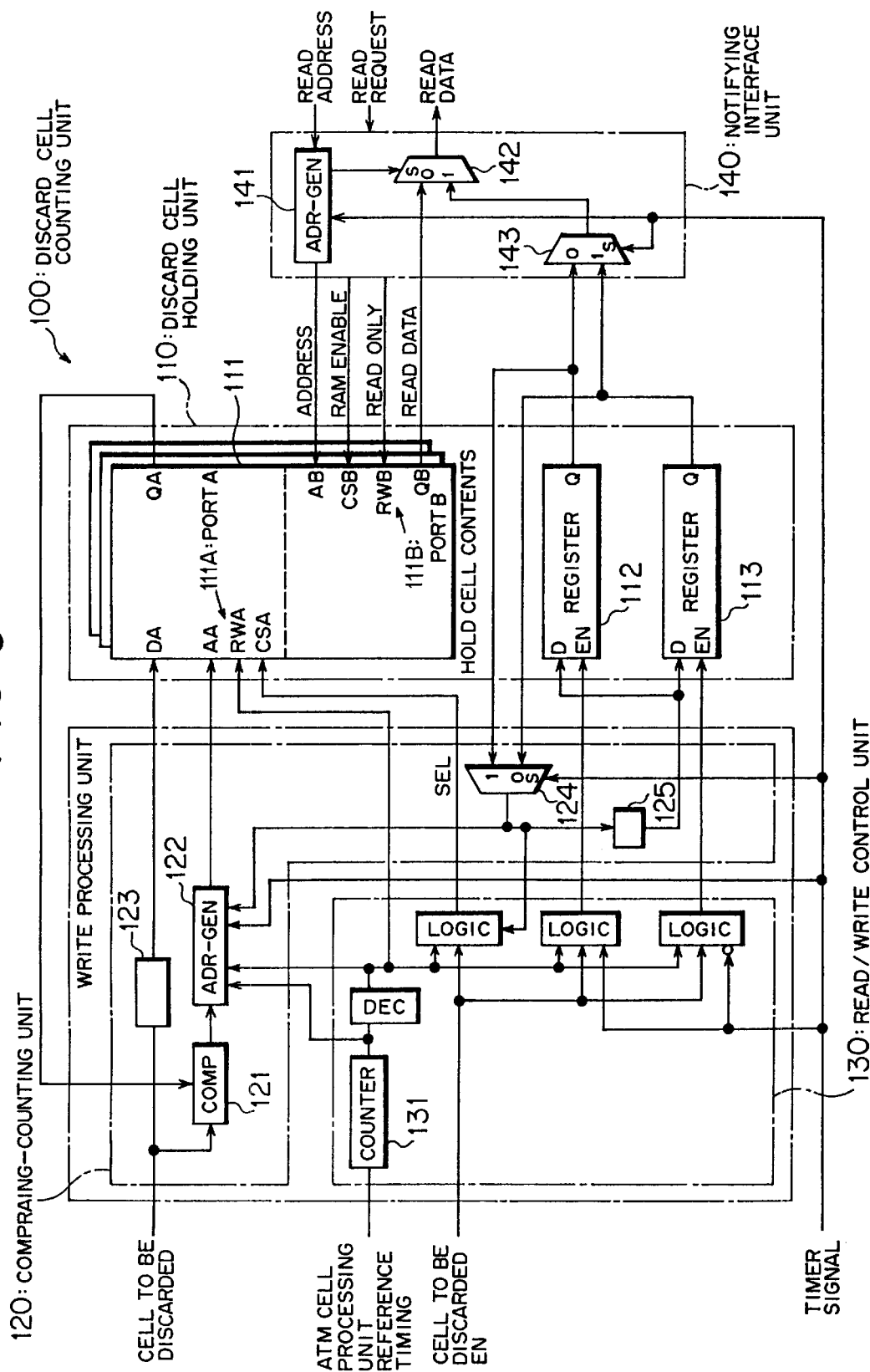
FIG. 9 is a block diagram showing a discard cell counting unit according to the embodiment.

To this end, the discard cell counting unit 100 comprises, as shown in FIG. 9, for example, a discard cell holding unit 110, a comparing-counting unit 120, a read/write control unit 130 and a notifying interface unit 140.

The discard cell holding unit 110 (discard contents holding unit and a discard number holding unit) holds a cause of discarding (discard contents information) of a discard cell and the number of discard cells (discard number information).

To this end, the discard cell holding unit 110 comprises a Dual Port RAM 111, and registers 112 and 113.

The Dual Port RAM 111 (discard contents holding unit) holds a cause of discarding of each discard cell within a predetermined monitoring cycle, which is configured with two planes (two holding regions), that is, a plane holding a cause of discarding of each discarded cell within the preceding monitoring cycle, and a plane holding a cause of discarding of each discarded cell within the current monitoring cycle. The Dual Port RAM 111 notifies of a cause of discarding held on one plane the microcomputer 95 while holding a cause of discarding on the other plane.

Incidentally, a port 111A is used (for updating) to read/write held contents of a discard cell, while a port 111B is exclusively used to read to notify the microcomputer 95. A cause of discarding is stored for each VPI/VCI in the Dual Port RAM 111. The Dual Port RAM 111 is configured with two planes, as stated above.

Hereinafter, description will be made by way of example where each of the SDH transmitting apparatus 2 and 3 handles 4 STS channels #i (i=1 to 4), all channels (channels: virtual channels of the ATM communication) included in one STS channel [STS-3 (155M)] #i are objects, and causes of discarding that can be stored in one plane of the Dual Port RAM 111 is 16 VPIs/VCIs at most. Here, all channels are objects of the counting of discard cells, and causes of discarding of discard cells for 32 (16×2) channels that are first comers among them are held along with VPIs/VCIs thereof in the Dual Port RAM 111.

For this, 8 Dual Port RAMs 111 are provided in the discard cell holding unit 110 in order to deal with 128 channels in total included in 4 STS channels #i (i =1 to 4).

Incidentally, two Dual Port RAMs 111 are used for each STS channel #i, in which one of the two Dual Port RAM 111 is used to store causes of discarding for 16 channels (0 to 15), while the other is used for the remaining 16 channels (16 to 31).

Figure 10:
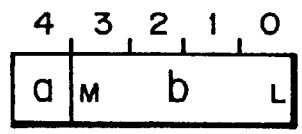
FIG. 10 is a diagram showing an example of a structure of an address in a Dual-Port RAM according to the embodiment.
Figure 11:
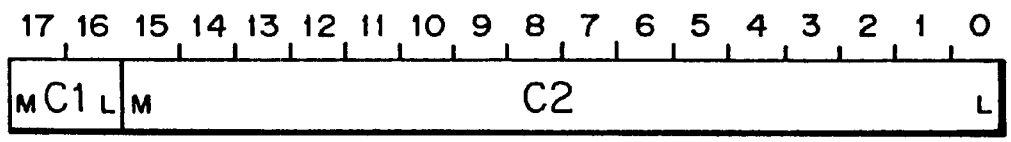
FIG. 11 is a diagram showing a bit structure of data in the Dual-Port RAM according to the embodiment.

The Dual Port RAM 111 stores a VPI/VCI of a discard cell and a cause of the discarding of the same as shown in FIG. 11 in a region (plane) designated by an address of 5 bits as shown in FIG. 10, for example.

In other words, in an address of the Dual Port RAM 111, the most significant bit (region designated by "a" in FIG. 10) is used to identify either one of the two planes (switched by a timer signal), and the remaining bits (region designated by "b" in FIG. 10) are used to identify a region in which data of each channel is stored. When data of a cause of discarding of a certain VPI/VCI of a certain STS channel #i is stored in a desired region of either one of the two Dual Port RAMs 111 [RAMs consisting of a RAM for 16 channels (0 to 15) and a RAM for the remaining channels (16 to 31)], for example, the most significant bit of the address specifies either one plane among the two planes of the Dual Port RAM 111, and the remaining bits specify a region in which data as shown in FIG. 11 of the above VPI/VCI is stored.

Data in the Dual Port RAM 111 is configured with bits (region designated by "c1" in FIG. 11) holding a cause of discarding, and bits (region designated by "c2" in FIG. 11) holding a VPI/VCI of a discard cell. Further, the cause of discarding is coded since there are a plurality of causes of discarding, and held.

With respect to a causes of discarding of a discard cell stored in a region (region designated by "c1" in FIG. 11) in the Dual Port RAM 111, a code "00" is stored when a cell is invalid, a code "01" is stored when a cell is out of a range of the VPI/VCI (Out of Range VPI/VCI), a code "10" is stored when a VPI/VCI of the cell is not assigned, or a code "11" is stored when a PTI of the cell is invalid.

Table 1 below shows an example of codes for causes of discarding.

TABLE 1

EXAMPLE OF CODES OF DISCARDING

| code | Cause of discarding |
| --- | --- |
| 00 | Invalid |
| 01 | Out of Range VPI/VCI |
| 10 | Unassigned VPI/VCI |
| 11 | Invalid PTI |

The above predetermined code is generated on the basis of contents of a discard cell from the cell identifying unit 31 by a discarding cause coding unit 123 (to be described later) in the comparing-counting unit 120, and stored along with a VPI/VCI of the discard cell in a region (refer to FIG. 11) designated by an address (refer to FIG. 10) generated by an ADR-GEN 122 (to be described later).

Each of the registers 112 and 113 (discard number holding unit) shown in FIG. 9 holds the number of discard cells within a predetermined cycle. One of the registers 112 (113) is used to count the number of discard cells within the preceding monitoring cycle, while the other register 113 (112) is used to count the number of discard cells within the current monitoring cycle. The former is used to notify of a result of the counting within the preceding monitoring cycle the microcomputer 95. As each of the registers 112 and 113, a flip-flop or the like is used to hold a count number of discard cells.

The comparing-counting unit 120 reads contents (VPI/VCI) of an existing discard cell as shown in FIG. 11 from the Dual Port RAM 111 in order, and compares the contents with a VPI/VCI in contents of the discard cell received from the cell identifying unit 31. When the contents coincide, the comparing-counting unit 120 updates the contents of the discard cell held in the Dual Port RAM 111. When the contents differ, the comparing-counting unit 120 adds the contents to those in the Dual Port RAM 111.

In other words, the comparing-counting unit 120 compares contents of a cell [cell (κ), for example] determined as a discarded cell by the cell identifying unit 31 within the current monitoring cycle with contents of each of all discard cells [cell group (Σ), for example] monitored and held within the current monitoring cycle in the discard cell holding unit 110. When a cell having the same VPI/VCI of the cell (κ) exists in the cell group (Σ), the comparing-counting unit 120 rewrites the contents to contents of the cell (κ), and again stores the content in the discard cell holding unit 110 while counting up the number of discard cells within the current monitoring cycle. When there is no cell having the same VPI/VCI of the cell (κ) in the cell group (Σ) as a result of the comparing, the comparing-counting unit 120 stores a new cell (κ) in the discard cell holding unit 110.

To this end, the comparing-counting unit 120 comprises a comparator (COMP in FIG. 9) 121, an address generating unit (ADR-GEN in FIG. 9) 122, the discarding cause coding unit 123, a selector (SEL) 124, a counting-up unit 125.

The comparator 121 compares a new discard cell inputted with contents (VPI/VCI) of an existing discard cell read in order from the Dual Port RAM 111, and notifies of information on, for example, a VPI/VCI of the received discard cell the ADR-GEN 122, so as to generate an address of a region in which data of the discard cell received from the cell identifying unit 31 is stored.

The comparator 121 reads data 16 times from each Dual Port RAM 111, and compares information on the received discard cell with data monitored in the preceding cycle in a parallel processing on each Dual Port RAM 111.

The discarding cause coding unit (discard cause coding unit) 123 converts a cause of discarding to a predetermined code as shown in Table 1 above on the basis of contents (data) of the discard cell received from the cell identifying unit 31, and transmits the converted code and data of a VPI/VCI of the discard cell to the Dual Port RAM 111.

The SEL 124 switches an output between the registers 112 and 113 with a timer signal as an opportunity. The counting-up unit 125 adds one to a count value of discard cells irrespectively of agreement or disagreement of a VPI/VCI of the discard cell in the comparator 121.

The read/write control unit 130 performs writing and reading controls on the Dual Port RAM 111 and registers 112 and 113. In concrete, the read/write control unit 130 switches a plane of the Dual Port RAM 111 having the two planes on which a reading process and a writing process are performed.

The read/write control unit 130 controls the counter 131 on the basis of the reference timing in the ATM cell processing unit 4-1 to generate a RAM address and a RAM control signal (RWA, CSA, register EN) on the basis of a count value in the counter 131 and a discard cell EN (enable).

The above comparing-counting unit 120 and the read/write control unit 130 function in combination as a write processing unit to write information on a cause of discarding and a VPI/VCI of a discard cell in the Dual Port RAM 111 and write a count value of discard cells in the registers 112 and 113 on the basis of VPIs/VCIs of each channel.

The notifying interface unit 140 reads information (result of monitoring in the preceding monitoring cycle) held in the Dual Port RAM 111 and the registers 112 and 113 in response to a read request from the microcomputer 95, and notifies of the information the microcomputer 95. As shown in FIG. 9, the notifying interface unit 140 comprises an address generating unit (ADR-GEN in FIG. 9) 141, and selectors (SEL) 142 and 143.

The ADR-GEN 141 generates an address of a region in the Dual Port RAM 111 using a read address from the DP-RAM interface unit 60 and a timer signal. The SEL 143 switches between the two registers 112 and 113 so as to output a count value of discard cells from either one of the registers 112 and 113. The other SEL 142 switches between the Dual Port RAM 111 and the register 112 (113) to output either data held in the Dual Port RAM 111 or the register 112 (113). Data outputted from the SEL 142 is transmitted to the DP-RAM interface unit 60.

In the notifying interface unit 140, which plane of the Dual Port RAM 111 a cause of discarding of discard cell is read out from and which register between the two registers 112 and 113 a count number of discard cell is read out from are switched according to a timer signal.

With the above structure, an ATM cell of an arbitrary STS channel #i is inputted to the ATM processing apparatus 4 by exchanging control signals such as Clav and the like between the UTOPIA 10 (for receiving) and the UTOPIA 20-1 (for transmitting). Each ATM cell is identified by the cell identifying unit 31, and when the ATM cell is a discard cell, contents of the discard cell are notified the discard cell counting unit 100.

When the discard cell counting unit 100 receives the contents of the discard cell outputted from the cell identifying unit 31, the comparator 121 compares (checks) to detect whether a VPI/VCI of the discard cell is already stored in the Dual Port RAM 111 or not while successively reading information in the Dual Port RAM 111.

When the information on the same VPI/VCI of the discard cell is stored in the Dual Port RAM 111 as a result, the discarding cause coding unit 123 replaces a cause of discarding received from the cell identifying unit 31 with a predetermined code, and writes (overwrites) the code in a relevant address region in the Dual Port RAM 111.

When information on a discard cell having the same VPI/VCI is not yet stored in the Dual Port RAM 111, a VPI/VCI and a cause of discarding (code) of the discard cell is stored in an address region in the Dual Port RAM 111 designated by the ADR-GEN 122. The number of pieces of information on discard cells being able to be stored in the Dual Port RAM 111 within a monitoring cycle is for 32 channels, so that discard cell information on the 33rd and later channels is not stored in the Dual Port RAM 111, but only the number of discard cells on the 33rd and the later channels is counted.

At this time, the regions of two planes of the Dual Port RAM 111 in which data is stored are switched in each predetermined cycle (500 ms, for example) with a timer signal as a trigger. While a code and the like of a discard cell within the current monitoring cycle is written in one plane, data of a cause of discarding and the like written within the preceding cycle is read out from the other plane by the notifying interface unit 140. Since two Dual Port RAMs 111 are assigned to 32 channels of one STS channel #i, two planes of one Dual Port RAM 111 are alternately switched to store causes of discsrding and the like of discard cells (0 to 15 channels), while the two planes of the other Dual Port RAM 111 are alternately switched to use the planes to write and read causes of discarding and the like of discarded cells (16 to 31 channels).

Similarly, each of the registers 112 and 113 uses one of two planes to count up the number of discard cells, while using the other planes to read the number of discard cells counted within the preceding monitoring cycle.

Figure 12:
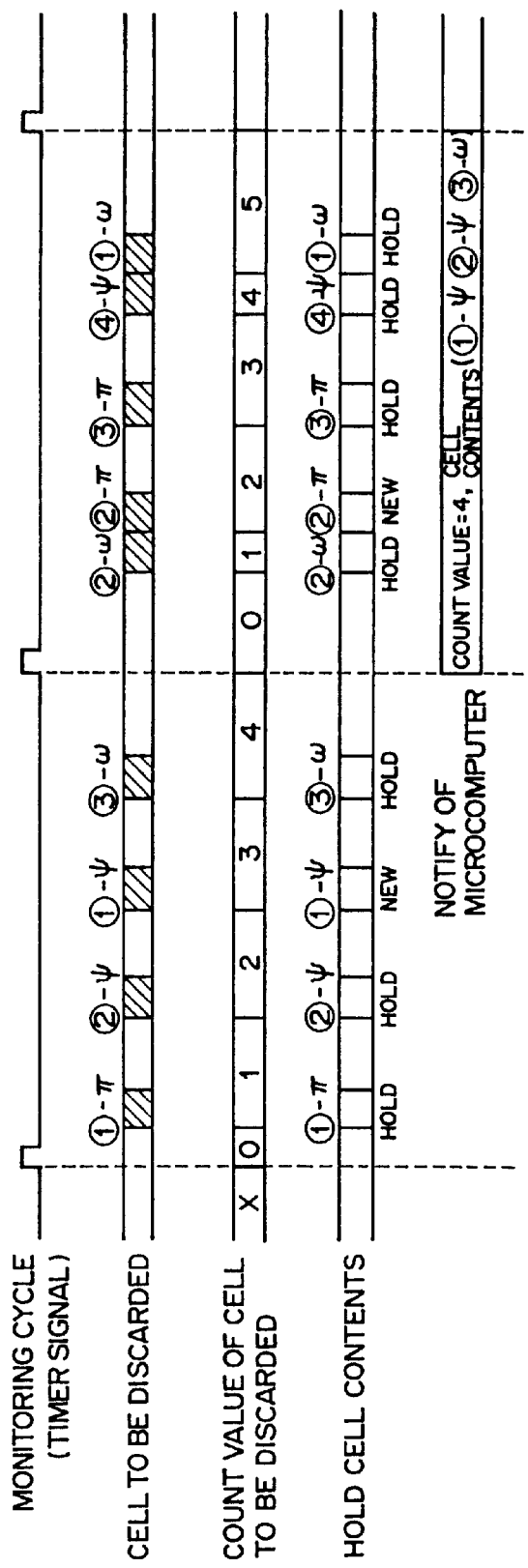
FIG. 12 is a timing chart for illustrating a process in the discard cell counting unit according to the embodiment.

FIG. 12 is a timing chart for illustrating a process in the discard cell counting unit 100. When the cell identifying unit 31 reports discard cell information to the comparing-counting unit 120, the discard cell counting unit 100 counts the number of discard cells within a monitoring cycle, and stores contents of discarding [mentioned as ① (information on a VPI/VCI)–π (information on a cause of discarding), ② (information on a VPI/VCI)–φ (information on a cause of discarding), and the like in FIG. 12] for 32 channels that are first comers within a monitoring cycle in the Dual Port RAM 111.

The comparing-counting unit 120 distinguishes a VPI/VCI of an ATM cell in one STS channel #i and compares the ATM cells. Namely, the comparing-counting unit 120 compares a VPI/VCI of a discard cell outputted from the cell identifying unit 31 with a VPI/VCI held in the Dual Port RAM 111 within the current monitoring cycle to determine whether there is the same VPI/VCI or not. When there is the same VPI/VCI, the comparing-counting unit 120 updates (overwrites) data held in the Dual Port RAM 111 (mentioned as "new" in FIG. 12). When there is not the same VPI/VCI, contents of the discard cell are added in the Dual Port RAM 111 (mentioned as "held" in FIG. 12)

As shown in FIG. 12, when the comparing-counting unit 120 receives discard cell information [VPI/VCI (②)–cause of discarded (φ)] from the cell identifying unit 31 after discarding contents of information (π) on a cause of discarding is stored at VPI/VCI (①) in the Dual Port RAM 111, the comparing-counting unit 120 compares a VPI/VCI of the discard cell with each VPI/VCI held in the Dual Port RAM 111. Since, the same VPI/VCI is not held in the Dual Port RAM 111 within the current monitoring cycle in FIG. 12, so that the discard cell information [VPI/VCI (②)–cause of discarding (φ)] is added in the Dual Port RAM 111.

After that, the discard cell information [VPI/VCI (①)–cause of discarding (π)] held in the Dual Port RAM 111 within the current monitoring cycle is updated (overwritten) on the basis of the discard cell information [VPI/VCI (①)–cause of discarding (φ)] received from the cell identifying unit 31.

When the notifying interface unit 140 receives a read request (a read request and a read address from the DP-RAM interface unit 60) from the microcomputer 95, the notifying interface unit 140 reads a cause of discarding and a VPI/VCI stored in a predetermined address in the Dual Port RAM 111 generated by the ADR-GEN 141, and reads a count value from the side holding a discard cell number within the preceding monitoring cycle of the two registers 112 and 113.

At this time, when reading data from either one of two planes of the Dual Port RAM 111 and the registers 112 and 113, the notifying interface unit 140 uses the port 111B of the Dual Port RAM 111 at the time of reading in response to an asynchronous access (read request) from the microcomputer 95.

The notifying interface unit 140 notifies of a cause of discarding and the like read out from the discard cell holding unit 110 the DP-RAM interface unit 60. The DP-RAM interface unit 60 makes the DP-RAM 70 hold the cause of discarding and the like, and the microcomputer 95 is notified of the cause of discarding and the like about a certain VPI/VCI by appropriately reading information held in the DP-RAM 70.

By means of the discard cell counting unit 100 according to this embodiment, it is possible to realize a Cell Discarded Due to ATM layer Header Errors function of detecting a discard cell or a misinserted cell, which largely contributes to an improvement of performance of system management/maintenance.

With the Dual Port RAM 111, it is possible to decrease a scale of the circuit or simplify the circuit. Further, a region in which causes of discarding and the like are stored consists of two planes, in one of which causes of discarding and the like are written, and from the other of which the causes of discarding and the like are read out. It is thereby possible to simultaneously count the number of discard cells and notify the microcomputer 95, which enables a quick processing.

Still further, the port 111A is used for reading/writing, while the port 111B is exclusively used for reading. It is thereby possible to readily deal with a read request from the microcomputer 95 accessing asynchronously.

Still further, the discarding cause coding unit 123 codes a predetermined cause of discarding of a cell. It is thereby possible to hold and notify a cause of discarding with a small sized circuit even in a complex network structure for a large capacity communication.

(3) Description of the VP/VC Monitoring Unit (3-1) Description of a Scheme of the VP/VC Monitoring Unit The VP/VC monitoring unit (flow state monitoring unit) 200 monitors a flow state of ATM cells between the ATM processing apparatus 4 and another ATM processing apparatus (not shown) interposed on a transmission route. The VP/VC monitoring unit 200 notifies of a cell identified by the cell processing unit 30 and a PM determining unit 310 (to be described later), makes a sent-back request of the cell, counts the cells, and makes a PM cell send request according to a PM setting from the microcomputer 95.

First, a monitoring operation to monitor a flow state between ATM processing apparatus will be described.

Figure 13A:
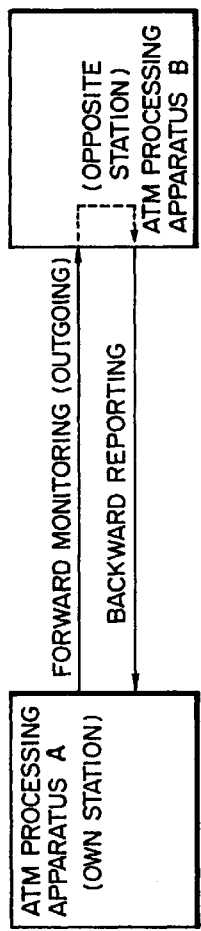
FIGS. 13(a) through 13(c) are diagrams for illustrating a flow state monitoring operation between the fixed length data processing apparatus according to the embodiment.
Figure 13B:
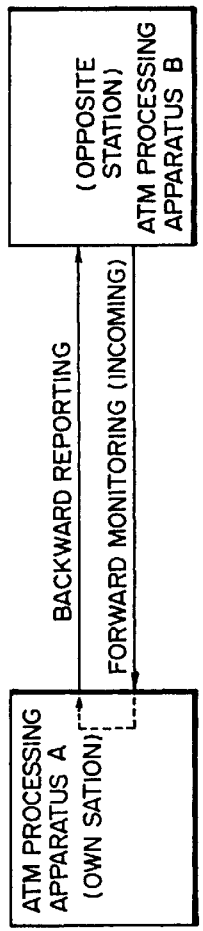
Figure 13C:
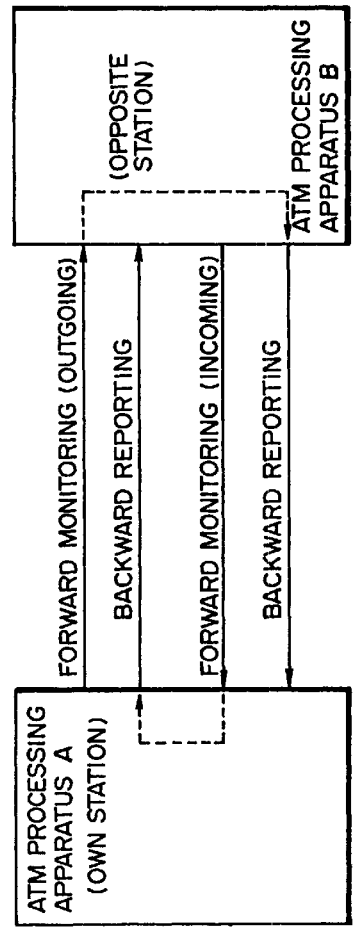

FIGS. 13(a) through 13(c) are diagrams for illustrating monitoring of a flow state between ATM processing apparatus 4 (hereinafter referred as "A" and "B", occasionally; when without "A" or "B", it signifies the both apparatus). In FIGS. 13(a) through 13(c), another ATM processing apparatus B is assumed to be an opposite apparatus.

In FIG. 13(a), the ATM processing apparatus A sends a cell (Forward Monitoring Cell; simply referred as "For Mon Cell", occasionally) to monitor a flow state to the opposite ATM processing apparatus B. The ATM processing apparatus B sends back a cell (Backward Reporting Cell; simply referred as "Back Rep Cell", occasionally) including information on a result of the monitoring on the basis of the received Forward Monitoring Cell and a user cell to the ATM processing apparatus A.

In concrete, when a performance monitoring is established, the ATM processing apparatus A generates a PM cell (Forward Monitoring Cell) for each predetermined block size, and sends the cell. The ATM processing apparatus B generates a PM cell for sending back (Backward Reporting Cell) on the basis of the received PM cell, and sends the cell to the ATM processing apparatus A.

Note that the Backward Reporting Cell is send irrespectively of a block size.

The ATM processing apparatus A collects PM data from information on the received PM cell (Backward Reporting Cell).

The above PM (A to B) is established by transmitting a cell (Activate Request Cell; merely called "Act Req Cell" occasionally) asking for a start of a monitoring process to monitor a flow state of cells to the ATM processing apparatus B, and receiving a confirmed cell (Activate Confirmed Cell; merely called "Act Conf Cell" occasionally) to confirm a start of PM from the ATM processing apparatus B as a response to the cell. However, when a cell denying a start of PM (Activate Denied Cell; merely called "Act Deni Cell" occasionally) is received, the PM is not established.

When the PM is desired to be cancelled, it is only necessary to transmit a cell requesting to cancel the PM (Deactivate Request Cell; merely called "Dact Req Cell" occasionally) from the ATM processing apparatus A to the ATM processing apparatus B. When a cell permitting the PM cancellation (Deactivate Confirmed Cell; merely called "Dact Conf Cell" occasionally) is received in response to the Deactivation Request Cell the PM is cancelled.

When the ATM processing apparatus A receives a cell including information signifying that the cancellation is denied (Deactivate Denied Cell; merely called "Dact Deni Cell" occasionally), the ATM processing apparatus A continuously sends the Forward Monitoring Cell.

As shown in FIG. 13(b), the ATM processing apparatus A can also perform PM (B to A), in which the ATM processing apparatus A sends an Activate Request Cell to another ATM processing apparatus B, receives a Forward Monitoring Cell: (incoming) from the ATM processing apparatus B, and sends back a Backward Reporting Cell.

The ATM processing apparatus B transmits an Activate Confirmed Cell permitting the execution in response to the Activate Request Cell received from the ATM processing apparatus A, after that, periodically generates a Forward Monitoring Cell addressed to the ATM processing apparatus A and transmits the cell. Further, it is possible to monitor a flow state in two ways (Two-Way) between the ATM processing apparatus A and B, as shown in FIG. 13(c). Hereinafter, description will be made on the assumption of FM (A to B) shown in FIG. 13(a) as an example. Note that PM (B to At Two-Way) shown in FIGS. 13(b) and 5(c) is done in the same or similar manner.

In the course of VP/VC monitoring, an internal processing state of the VP/vc monitoring unit 200 transits according to a setting from the microcomputer 95.

Figure 16:
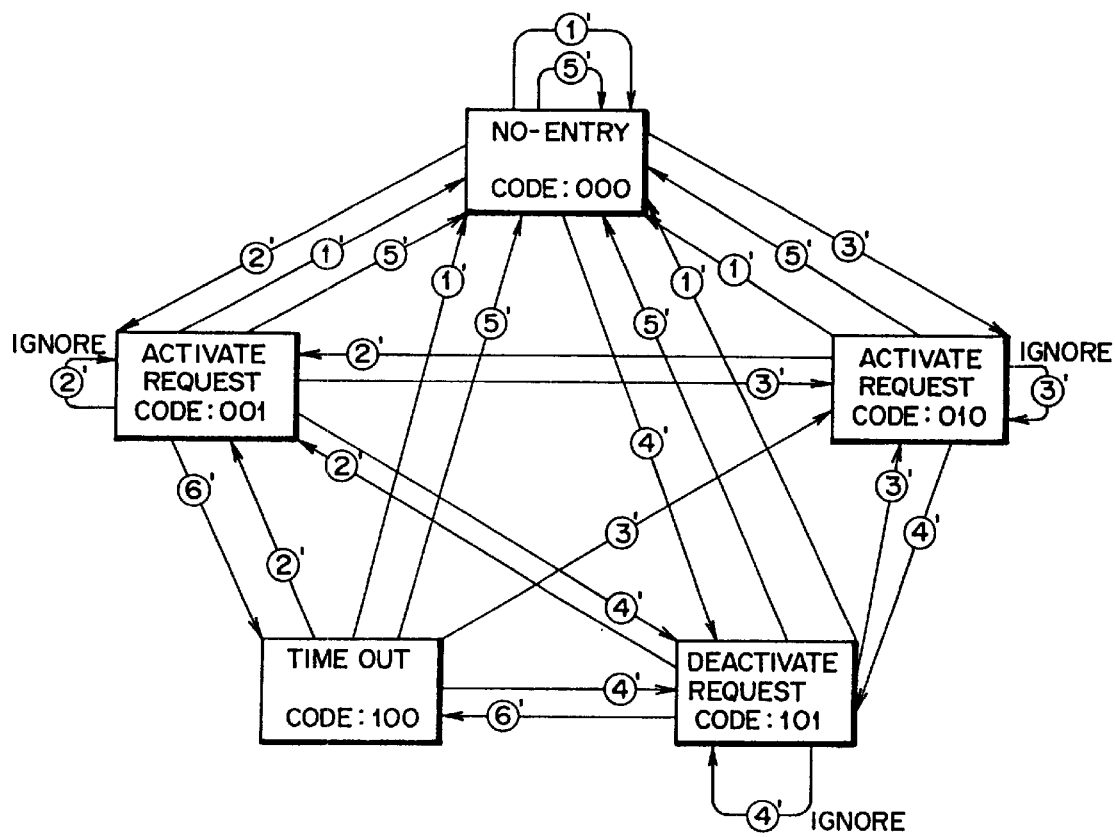
FIG. 16 is a diagram showing an example of state transition of a VP/VC Monitoring unit according to the embodiment.

FIG. 16 is a diagram showing transition of a state of the VP/VC monitoring unit 200. The VP/VC monitoring unit 200 monitors a flow state according to an internal processing state transition shown in FIG. 16.

Figure 14:
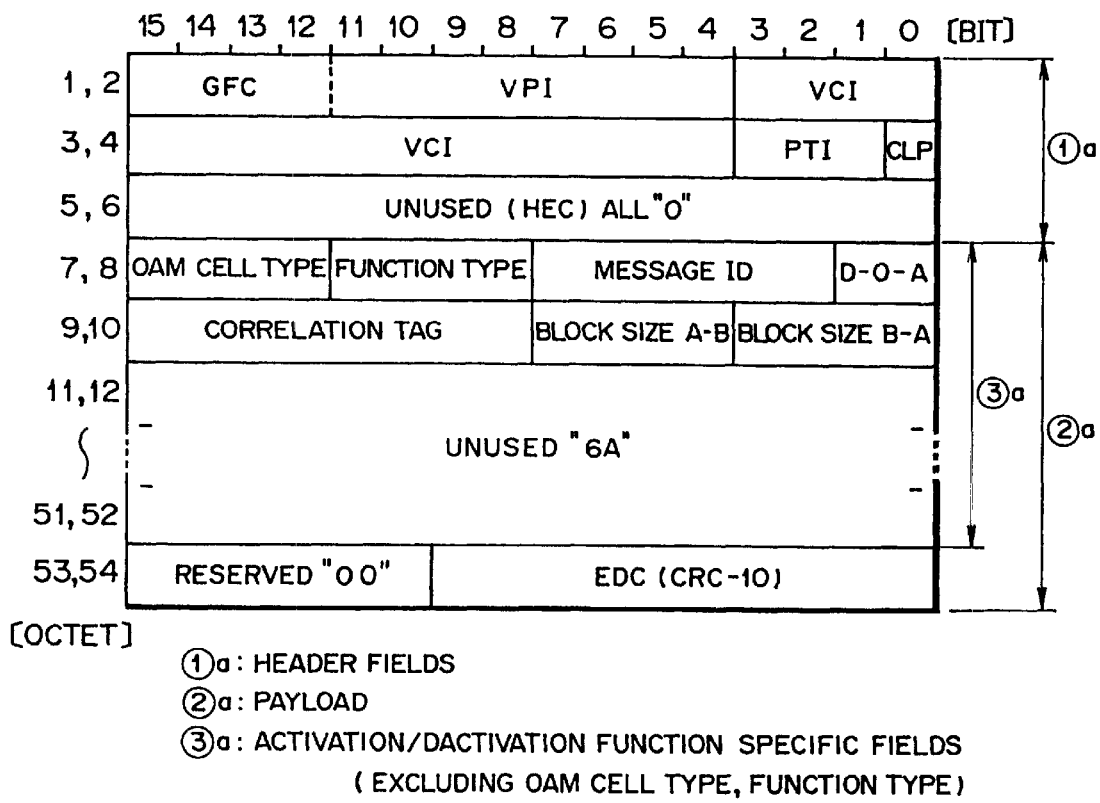
FIG. 14 is a diagram showing an example of a format of an Activate/Deactivate Cell according to the embodiment.

FIG. 14 is a diagram showing an example of a format of the above Activate/Deactivate Cell. The Activate/Deactivate Cell shown in FIG. 14 is inserted a setting value from the microcomputer 95 thereto, and generated. In a field of Message ID in the Activate/Deactivate Cell shown in FIG. 14, a value according to a use as shown in Table 2 below is inserted according to a setting of the microcomputer 95.

TABLE 2

EXAMPLE OF MESSAGE IDS

| Item | MESSAGE | VALUE | USE |
|---|---|---|---|
| 1 | Activation | 000001 | Used when Activation request is made |
| 2 | Activation Confirmed | 000010 | Used when Activation request is accepted |
| 3 | Activation Request Denied | 000011 | Used when Activation request is denied |
| 4 | Deactivation | 000101 | Used when Deactivation request is made |

TABLE 2-continued

EXAMPLE OF MESSAGE IDS

| Item | MESSAGE | VALUE | USE |
|------|---------|-------|-----|
| 5 | Deactivation Confirmed | 000110 | Used when Deactivation request is accepted |
| 6 | Deactivation Request Denied | 000111 | Used when Deactivation request is denied |

In a field of D-o-A (Direction of Action) in the activate/Deactivate Cell shown in FIG. 14, a value according to a use as shown in Table 3 below is inserted according to a setting of the microcomputer 95.

TABLE 3

EXAMPLE OF D-o-A

| CODE | DIRECTION | REMARKS |
|------|-----------|---------|
| 00 | not applicable | Default value |
| 01 | B TO A | (Invalid cell) |
| 10 | A TO B | |
| 11 | for Two-way | |

The number of times of re-try to be described later is inserted in Correlation Tag. The number of user cells to be sent during one block (during 1 P.M cell) is coded according to a setting from the microcomputer 95, and inserted in Block Size A-B and B-A.

Figure 15:
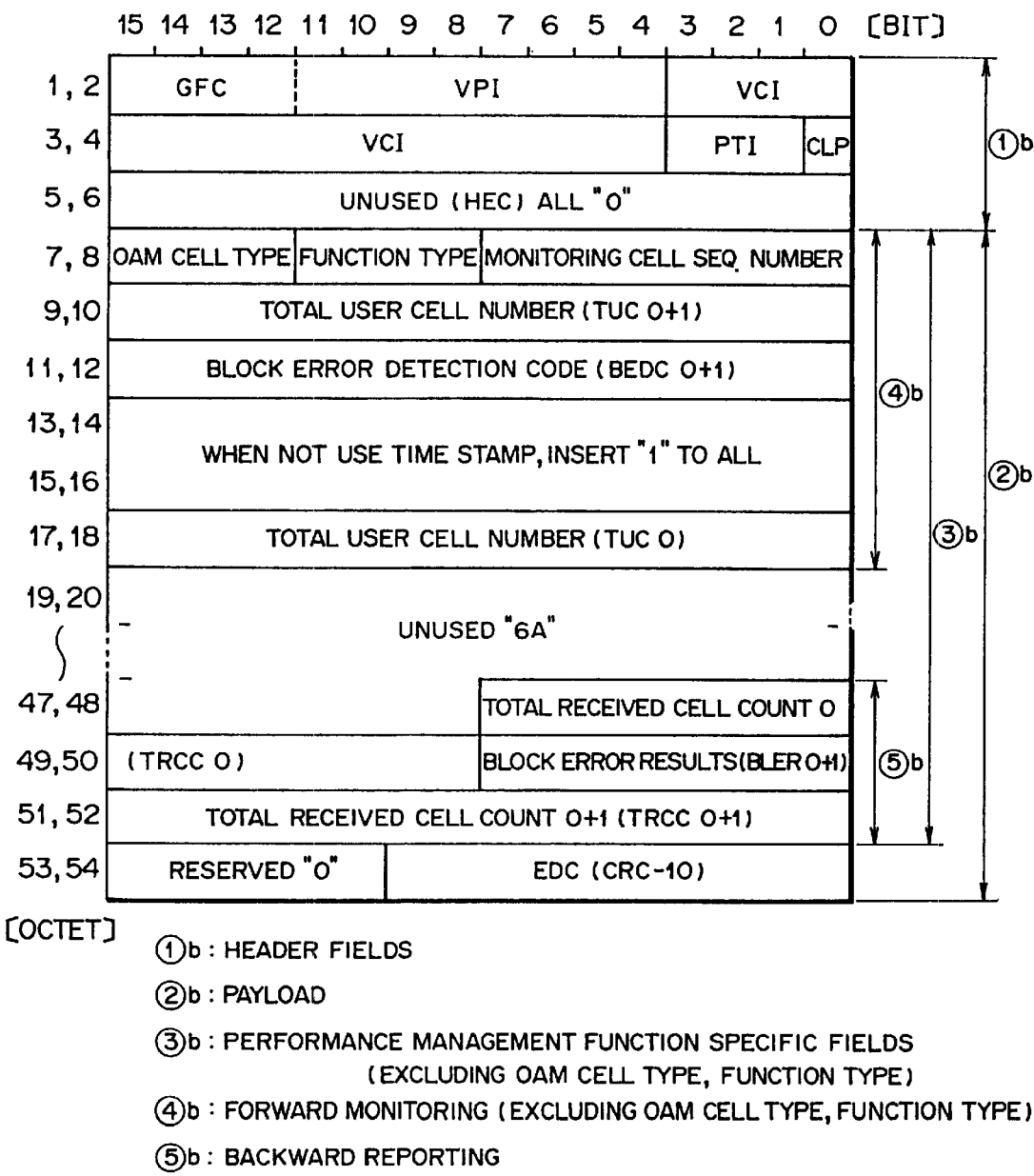
FIG. 15 is a diagram showing an example of a format of a Performance Monitoring Cell according to the embodiment.

FIG. 15 is a diagram showing an example of a format of a PM cell (Forward Monitoring, Backward Reporting). When an activate request from the microcomputer 95 is received and the state becomes a monitoring state, the ATM processing apparatus receiving the activate request outputs a PM cell shown in FIG. 15 to another ATM processing apparatus according to a setting by the microcomputer 95. Incidentally, $TUC_{0+1}$, $BEDC_{0+1}$, $TUC_0$ and the like in the PM cell will shown in FIG. 15 will be described later.

Hereinafter, description will be made mainly with the ATM processing apparatus A. However, the ATM processing apparatus B has a similar function, description of which is thus omitted.

Figure 17:
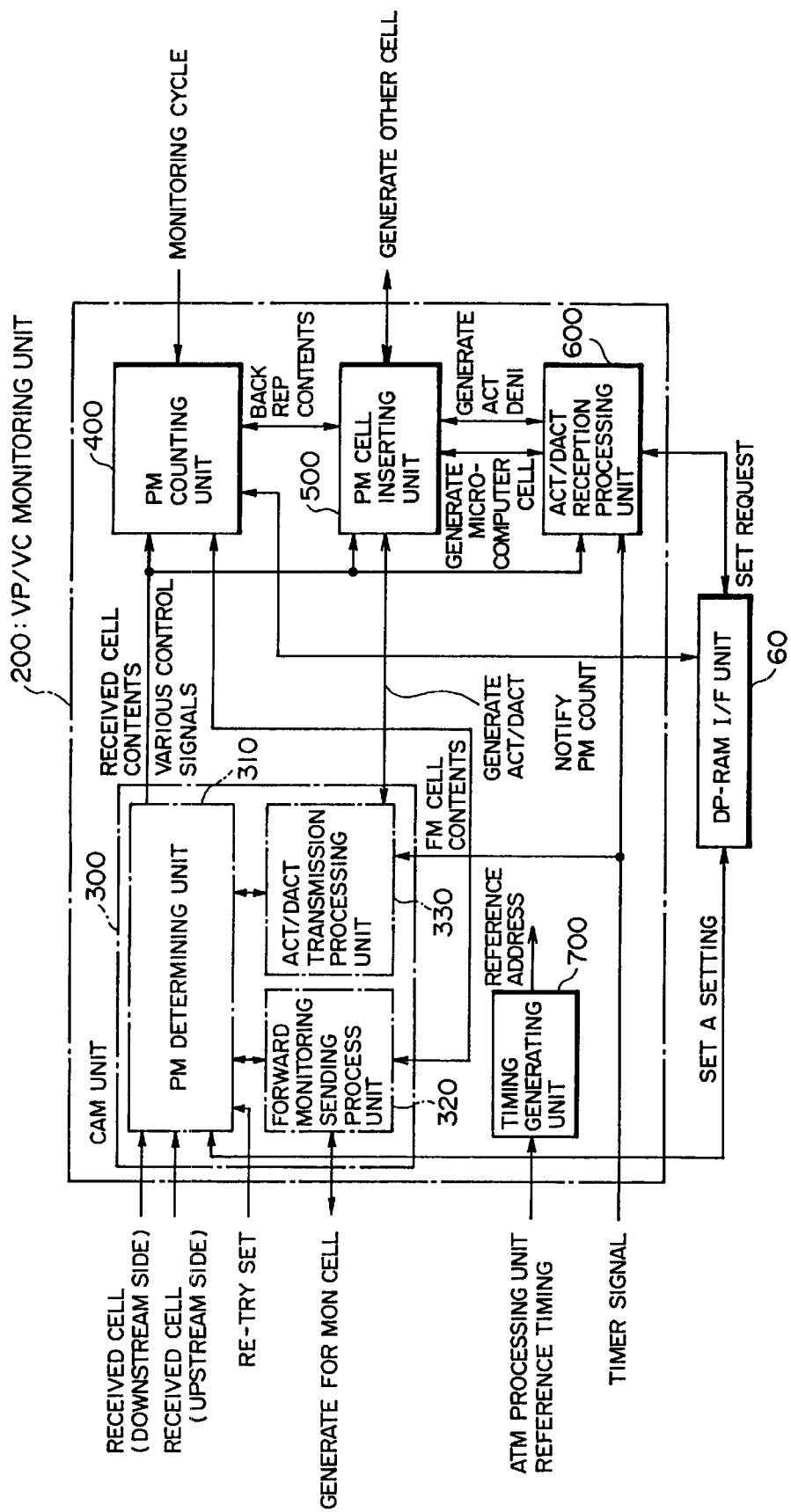
FIG. 17 is a block diagram showing the VP/VC Monitoring unit according to the embodiment.

The VP/VC monitoring unit 200 comprises, as shown in FIG. 17, a CAM unit 300, a PM counting unit 400, a PM cell inserting unit 500, an Act/Dact reception processing unit 600 and a timing generating unit 700 in order to operate as schematically described above.

Hereinafter, each element will be described.
(3-2) Description of the CAM Unit

The CAM unit 300 discriminates a user cell (User Cell) and a cell for-VP/VC monitoring received from the downstream side, and a user cell received from the upstream side to extract contents of a received cell and generates various control signals. The CAM unit 300 also has a function of sending monitoring data (Forward Monitoring Cell) and control data (Activate Request Cell, Deactivate Request Cell) under predetermined conditions.

The CAM unit 300 has a function of a Contents Addressable Memory to designate information held in the CAM unit 300, retrieve as to whether there is the same information or not with one access, and output a position (address of RAM, for example) at which the information is stored if the same information is stored, when executing discrimination.

Figure 18:
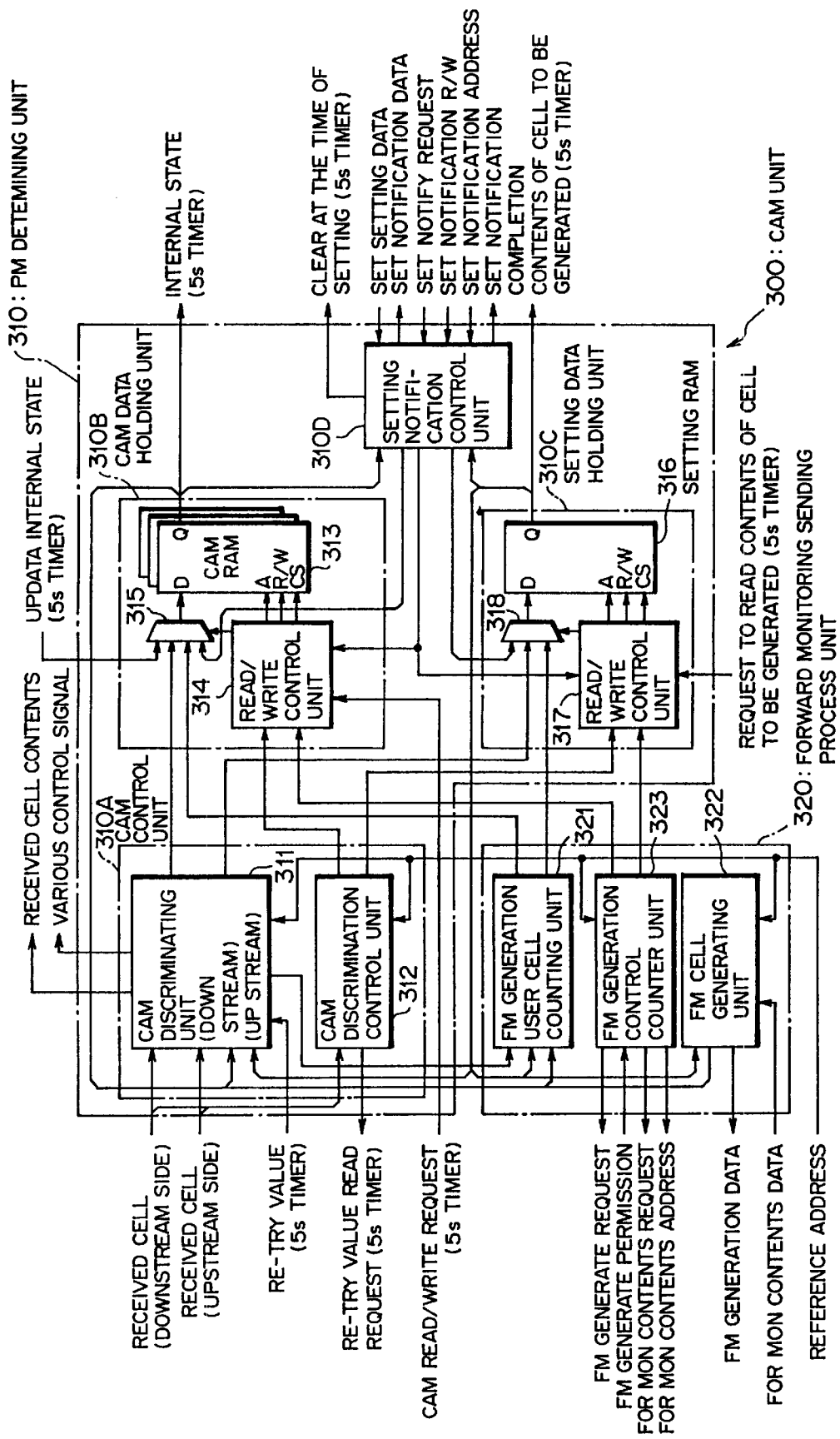
FIG. 18 is a block diagram showing a PM determining unit and a Forward Monitoring sending process unit according to the embodiment.
Figure 26:
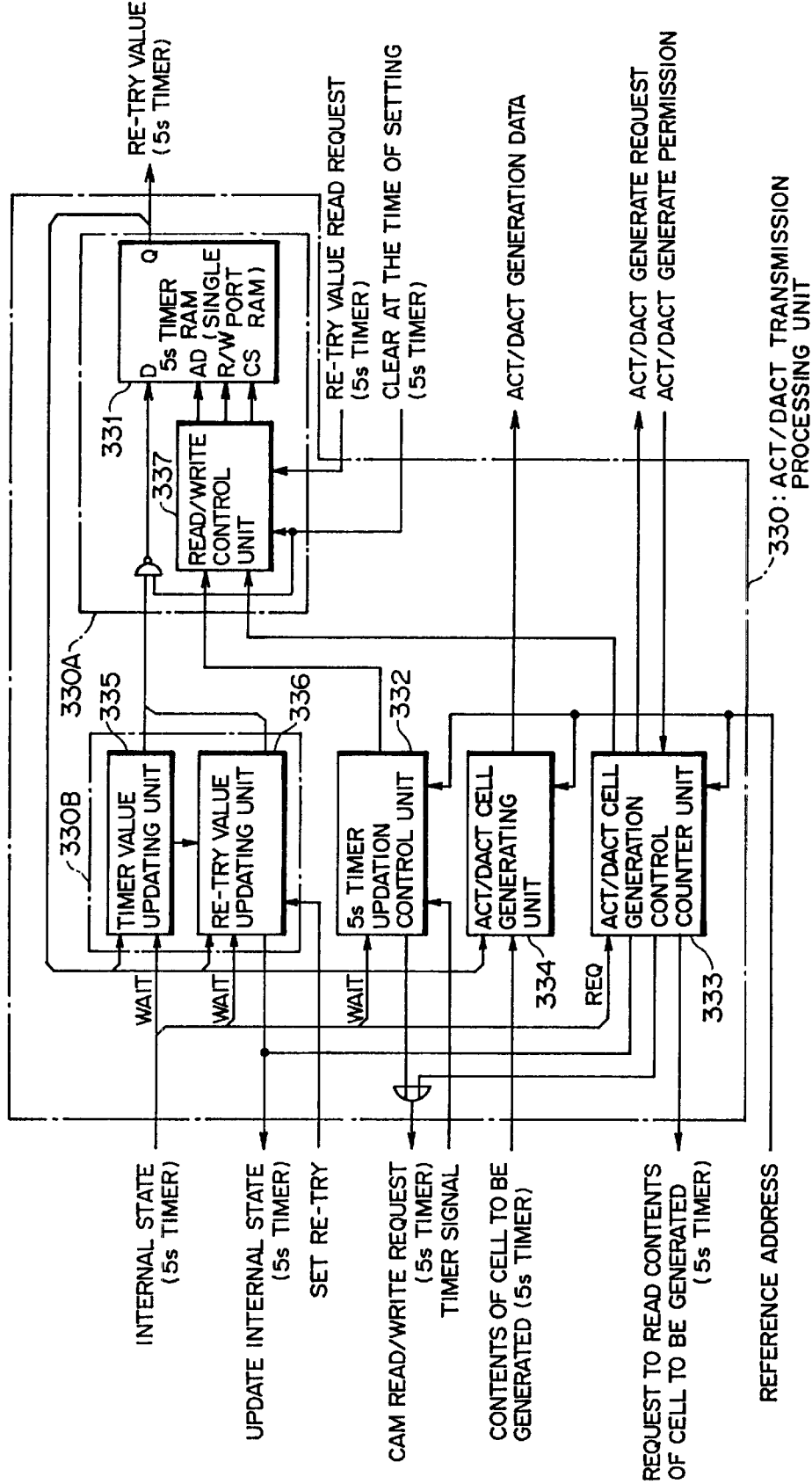
FIG. 26 is a block diagram showing an Act/Dact transmission processing unit according to the embodiment.

To this end, the CAM unit 300 comprises, as shown in FIGS. 18 and 26, a PM determining unit 310, a Forward Monitoring sending process unit 320, and an Act/Dact transmission processing unit 330.

The PM determining unit (discriminating unit) 310 determines 8 kinds of PM related cells [Act Req Cell (control data), Act Conf Cell, Act Deni Cell, Dact Req Cell (control data), Dact Conf Cell, Dact Deni Cell, For Mon Cell, Back Rep Cell] received from another ATM processing apparatus, and user cells from the downstream side and the upstream side on the basis of discrimination information to generate various control signals and extracts contents of cells. The PM determining unit 310 notifies of 6 kinds of cell contents (Act Req/Conf/Deni Cell, Dact Req/Conf/Deni Cell) as one of the various control signals the microcomputer 95. The PM determining unit 310 also discriminates whether contents of a cell should be notified the microcomputer 95 or not on the basis of an internal processing state of its own.

To this end, the PM determining unit 310 comprises, as shown in FIG. 18, a CAM control unit 310A for controlling an extracting process to extract contents of a received cell, a CAM data holding unit 310B holding data to be used for discrimination, a setting data holding unit 310C holding setting data corresponding to a certain channel, and a setting notification control unit 310D interfacing with the DP-RAM interface unit 60.

The above CAM data holding unit 310B holds discrimination information, which comprises, as shown in FIG. 18, a CAM RAM (single port RAM, sometimes called "CAM RAM") 313, a read/write control unit 314 controlling reading/writing on the CAM RAM 313, and an SEL 315.

The CAM RAM (discrimination information holding RAM) 313 holds discrimination information, which is configured with a single port RAM.

Here, description will be made on the assumption that management for maintenance and operation is executed on 30 channels among 1024 channels (virtual channels in ATM communication) entry-set by the-microcomputer 95 in each STS channel [STS-3(c) (155 Mb/s)] #i (i=1 to 4), in the case where information for 120 channels included in 4 STS channels #i in total is stored in the CAM data holding unit 310B.

As an example where discrimination information for 120 channels (ATM communication) is held, the CAM RAM 313 uses two single port RAMs for one STS channel #i, and stores discrimination information for 15 channels in one CAM RAM 313.

In the case of discrimination information for 30 channels (0 to 29) in one STS channel #i, for example, one CAM RAM of the two CAM RAM 313 holds discrimination information for 15 channels (0 to 14) and the other CAM RAM 313 holds discrimination information for the remaining 15 channels (15 to 29).

Namely, in order to deal with 4 STS channels #i, the CAM data holding unit 310B comprises 8 CAM RAMs 313.

Figure 19:
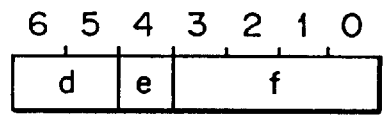
FIG. 19 is a diagram showing an example of an address structure in a region of a CAM RAM according to the embodiment.
Figure 20:
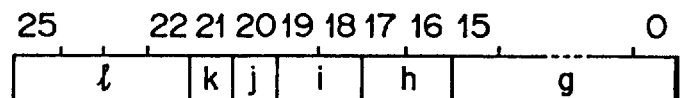
FIG. 20 is a diagram showing an example of a data structure in a region of the CAM RAM according to the embodiment.

The CAM RAM 313 holds discrimination information in a region as shown in FIG. 20 designated by an address of 7 bits as shown in FIG. 19, for example.

In order to specify a region in which data for each channel is held in 8 CAM RAMs 313, an address shown in FIG. 19 discriminates an STS channel #i using 2 bits (region designated by "d" in FIG. 19), discriminates two CAM RAMs 313 in which discrimination information for one STS channel #i is stored using another 1 bit (region designated by "e" in FIG. 19), and discriminates 15 channels using the remaining 4 bits (region designated by "f" in FIG. 19).

Namely, 2 bits is used to discriminate an STS channel #i, 1 bit is used to discriminate information for discriminating cells divided into two groups each consisting of 15 channels and stored in different CAM RAMs 313, that is, which CAM RAM 313 between the two CAM RAMs 313 stores each cell, and 4 bits are used to determine which channel the discrimination information is about. As this, a destination of each discrimination information is discriminated by the above address.

With respect to data stored in each CAM RAM 313, as shown in FIG. 20, 16 bits (region designated by "g" in FIG. 20) are used to, store a VPI/VCI, 2 bits (regions designated by "h" in FIG. 20) are used to store Direction (refer to Table 3), 2 bits (region designated by "i" in FIG. 20) are used to store a section [End-to-End (between terminals) or Segment (repeat section)], 1 bit (region designated by "j" in FIG. 20) is used to indicate an own station request or an opposite station request, 1 bit (region designated by "k" in FIG. 20) is used to discriminate a direction when Two-Way is set, and 4 bits (region designated by "1" in FIG. 20) are used to show internal processing state.

Namely, the above PM determining unit 310 comprises a plurality (8) of CAM RAMs 313 to perform a discriminating process on a plurality of control data in parallel.

The above information on an internal processing state is coded by the CAM determining unit 311 and stored in the CAM RAM 313.

A code (internal CODE) showing information on an internal processing state includes a code representing whether the monitoring process is being carried out or not. As shown in FIG. 21, for example, a state such as NO-ENTRY [PM is not performed (monitoring is not set)], in the process of PM, or the like is coded with 4 bits. Further, when the most significant bit is "1", it shows a monitoring state. When the most significant bit is "0", it shows a non-monitoring state. A code (notification CODE) for notification showing a notification state with 3 bits corresponding to a code (Internal CODE) showing an internal processing state with 4 bits is transmitted to the microcomputer 95, as shown in FIG. 21.

States represented by codes "0001", "0010" and "0011" in FIG. 21 do not exist principally. However, these codes are provided in order to readily manage the system by faithfully operating the system according to a setting by the microcomputer 95.

The CAM control unit 310A shown in FIG. 18 comprises, as shown in FIG. 18, a CAM discriminating unit 311 and a CAM discrimination control unit 312 in order to discriminate contents of a received cell and perform a control required for the discrimination.

The CAM discriminating unit 311 determines 8 PM related cells [Act Req Cell (control data), Act Conf Cell, Act Deni Cell, Dact Req Cell (control data), Dact Conf Cell, Dact Deni Cell, For Mon Cell, Back Rep Cell] received from another ATM processing apparatus B and user cells in the downstream and the upstream on the basis of discrimination information to generate various control signals and extract contents of the cells. As various control signals, the PM determining unit 310 notifies of contents of 6 kinds of cells (Act Req/Conf/Deni Cell, Dact Req/Conf/Deni Cell), and makes a sent-back request for a Backward Reporting Cell, a sent-back request for an Activate Denied Cell, a sent-back request for a Deactivate Confirmed Cell, a sent-back request for a Deactivate Denied Cell and the like to the PM cell inserting unit 500 (to be described.later).

The PM determining unit 310 determines whether contents of a cell should be notified the microcomputer 95 or not on the basis of, for example, its own internal processing state. The extracted contents of the received cell are used to generate or the like a PM cell to be described later.

When receiving a cell (downstream received cell, upstream received cell) and executing a discriminating process, the CAM discriminating unit 311 discriminates the cell while reading contents of the received cell and data for 120 channels stored in the CAM RAM 313 in order. Here, the CAM discriminating unit 311 can read discrimination information for 120 channels in total within a short period by reading 15 times the discrimination information from 8 CAM RAMs 313.

Figure 24:
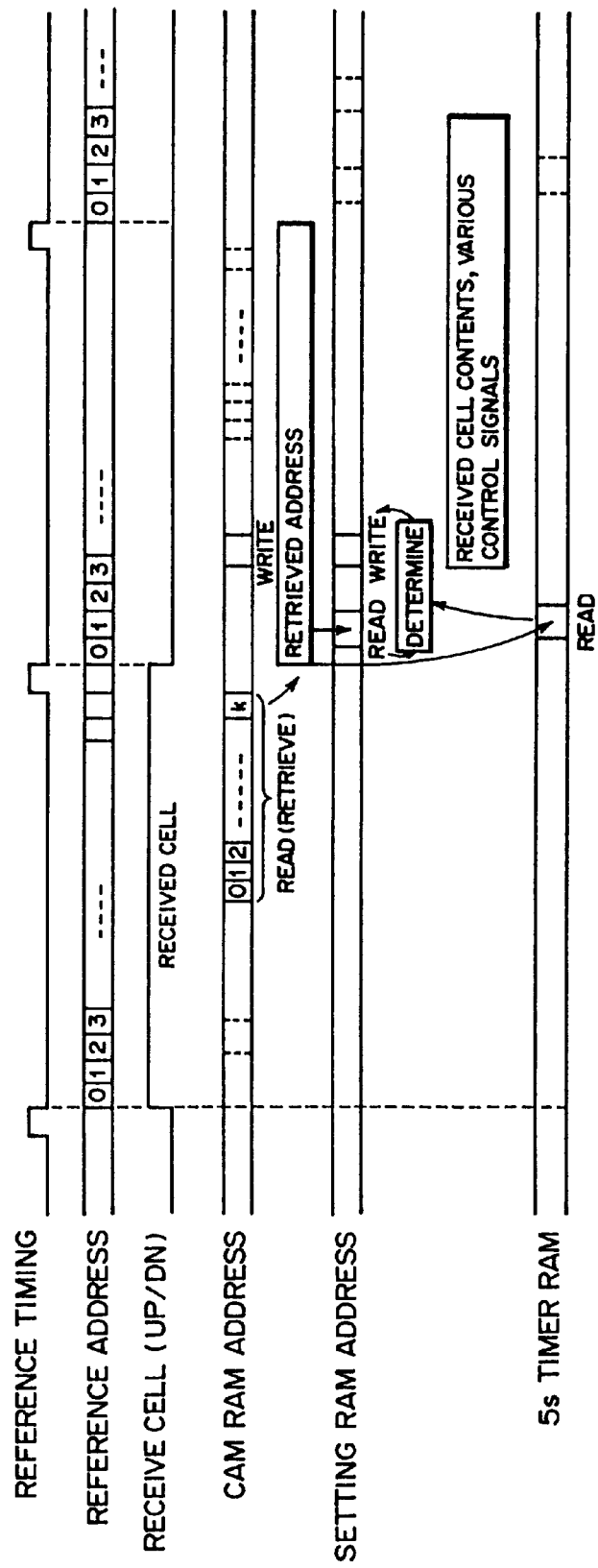
FIG. 24 is a timing chart for illustrating a CAM discriminating operation according to the embodiment.

As shown in FIG. 24, for example, the CAM discriminating unit 311 discriminates a received cell while reading contents of the CAM RAM 313 in order when receiving the cell (discriminates the upstream and the downstream, separately). The CAM discriminating unit 311 reads the discrimination information 15 times from the 8 CAM RAMS 313, and retrieves a CAM RAM address of a channel of the received cell on the basis of the discrimination information for 120 channels in total (K is 14 in FIG. 24) and the received contents [functioning as a contents addressable memory]. However, each CAM RAM 313 stores only minimum items necessary for discrimination, so that the CAM discriminating unit 311 reads the other setting information from a setting RAM 316 (to be described later) and a five-second timer RAM 331 (to be described later) on the basis of the discriminated information [mentioned as "retrieve address" in the CAM RAM address (in FIG. 24)], and makes a final determination. The CAM discriminating unit 311 extracts the contents of the received cell, generates various control signals and stores a change of the internal processing state obtained by a result of the determination in the CAM RAM 313 and the setting RAM 316 (to be described later) after the final determination.

When the CAM discriminating unit 311 determines as a result of the discrimination that to notify the microcomputer is unnecessary and to send back to another ATM processing apparatus B is necessary, the CAM discriminating unit 311 outputs requests (various control signals) to generate a sent-back cell and send the cell to the PM cell inserting unit 500 (a sent-back cell generating unit 510 to be described later), so as to generate a sent-back cell in response to the received cell and output the sent-back cell.

A time to output a sent-back cell send request from the CAM discriminating unit 311 to the PM cell inserting unit 500 is when the CAM discriminating unit 511 receives an Activate Request Cell (control data) of a certain VPI/VCI while executing a PM monitoring on the same VPI/VCI (while sending a For Mon Cell), or receives an Activate Request Cell of the same VPI/VCI while waiting for a response from another ATM processing apparatus B after sending a Deactivate Request Cell. In these cases, the CAM discriminating unit 311 outputs a sent-back request for an Activate denied Cell to the PM cell inserting unit 500 (to be described later). When the CAM discriminating unit 311 receives a Deactivate Request Cell while the internal processing state is NO ENTRY (when no setting is done), it is unnecessary to notify the microcomputer 95. In such case, the CAM discriminating unit 311 outputs a send-back request for a Deactivate Confirmed Cell to the PM cell inserting unit 500 (to be described later).

The CAM discrimination control unit 312 in the CAM control unit 310A performs a timing control for discrimination.

The setting data holding unit 310C shown in FIG. 18 holds setting data, which comprises the setting RAM 316, a read/write control unit 317 performing a read/write control on the setting RAM 316, and an SEL 318, for example.

The setting RAM (setting data holding unit) 316 holds setting data not used in the discriminating process in the CAM discriminating unit 311 since information held in the CAM RAM 313 is only minimum items necessary for discrimination. The setting RAM 316 is configured with a single port RAM.

Figure 23:
FIG. 23 is a diagram showing an example of a data structure in a region of a setting RAM according to the embodiment.

As an address of the setting RAM 316, it is possible to use the same address as an address (refer to FIG. 19) of the above CAM RAM 313, for example. In a region designated by this address of 7 bits, there are held various setting data (designated by "p" in FIG. 23) corresponding to each channel, a block size count (designated by "q" in FIG. 23), and a Forward Monitoring generate request (request for generating a Forward Monitoring Cell-designated by "r" in FIG. 23), as shown in FIG. 23, for example.

The setting notification control unit 310D shown in FIG. 18 has functions of setting information from the microcomputer 95 in the various data holding units (CAM RAM 313, setting RAM 316), and notifying, of a VP/VC Monitoring state (internal processing state) held in the CAM RAM 313 and the like and the various setting data held in the RAM 316 the microcomputer 95.

The Forward Monitoring sending process unit (monitoring data transmitting processing unit) 320 shown in FIG. 18 periodically generates a Forward Monitoring Cell [Outgoing: refer to FIG. 13(a)] addressed to another ATM processing apparatus B and transmits the cell when receiving response data (Activate Confirmed Cell) permitting execution of PM as a response to control data (Activate Request Cell) outputted toward the ATM processing apparatus B. After transmitting the response data (Activate Confirmed Cell) permitting execution of PM in response to the control data (Activate Request Cell) received from the ATM processing apparatus B, the Forward Monitoring sending process unit 320 periodically generates a Forward Monitoring Cell [Incoming: refer to FIG. 13(b)] addressed to the ATM processing apparatus B, and transmits the cell. Hereinafter, description will be made on the assumption that the Forward Monitoring Cell (Outgoing) is transmitted.

The Forward Monitoring sending process unit 320 counts the number of user cells in the upstream discriminated by the CAM control unit 310A. When a count number exceeds a set value, the Forward Monitoring sending process unit 320 generates a Forward Monitoring Cell on the basis of For Mon contents data from the CAM data holding unit 310B, the setting data holding unit 310C and the PM counting unit 400 (to be described later), and makes a generate request to the Ups Cell inserting unit 80.

To this end, the Forward Monitoring sending process unit 320 comprises, as shown in FIG. 18, an Fm generation User Cell counting unit 321, an Fm cell generating unit 322 and an Fm generation control counter unit 323.

Figure 25A:
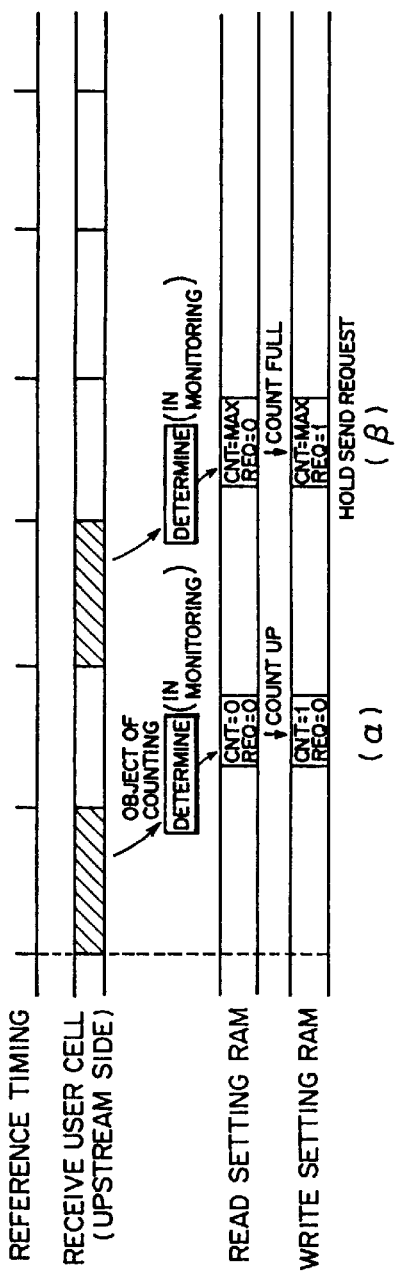
FIGS 25(a) and 25(b) are timing charts for illustrating Forward Monitoring Cell generation according to the embodiment.

The Fm generation User Cell counting unit 321 counts the number of received user cells in the upstream in order to decide intervals to generate a For Mon Cell. In concrete, the Fm generation User Cell counting unit, 321, as shown in FIG. 25(a), receives information signifying that a cell is received on the upstream side and discriminated as a user cell from the CAM discriminating unit 311, and if an internal processing state of a channel that is an object of the received user cell is "in monitoring", counts up a block size of a corresponding address of the setting RAM 316. At a timing indicated by "α" in FIG. 25(a), the Fm generation User Cell counting unit 321 counts up a block size count (CNT) by one. When the count-up processing is proceeded and a count value reaches a maximum value, the Fm generation User Cell counting unit 321 stores a Forward Monitoring generate request [Active=1 (mentioned as "Req 1" in FIG. 25(a)] in the setting RAM 316 (refer to FIG. 23) (at a timing indicated by "β" in FIG. 25(a)].

Figure 25B:
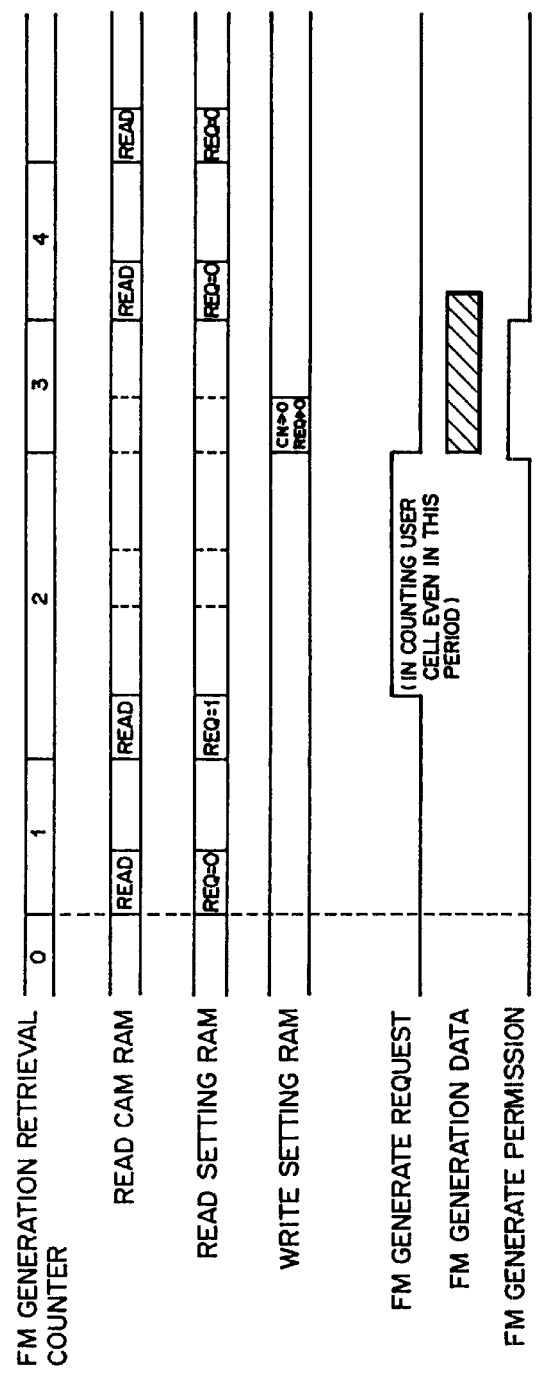

The Fm cell generating unit 322 detects generation of a For Mon Cell from a User Cell count number to generate a cell. The Fm generation control counter unit 323 controls a counting in the Fm generation User Cell counting unit 321 and a timing to generate a cell in the Fm cell generating unit 322, and makes a cell generate request. As shown in FIG. 25(b), for example, the Fm cell generating unit 322 searches for a channel on which the monitoring is carried out and a Forward Monitoring generate request bit is active [mentioned as "Req=1" in FIG. 25(b)] when retrieving generation of a For Mon Cell, outputs an Fm generate request when detecting a relevant channel, and sends a For Mon Cell when receiving an Fm generation permit signal from the UpS cell inserting unit 80.

When the Fm generation permit signal (signal for permitting to generate the For Mon cell) is received from the Ups Cell inserting unit 80, the Fm generation control counter unit 323 clears a count and a generation request bit of the setting RAM 316 [mentioned as "CNT=>0, Req=>0 in FIG. 25(b)]. Further, an Fm cell (Fm generation data) generated on the basis of For Mon contents data received by the Fm cell generating unit 322 by receiving the Fm generation permit signal from the UpS cell inserting unit 80 is sent to another ATM processing apparatus B that is an object of PM through the UpS cell inserting unit 80.

Incidentally, a read/write access to the CAM RAM 313 and the setting RAM 316 in the For Mon Cell generation retrieval is had in the same time sequence as shown in FIGS. 22, 53 and 54.

The above Act/Dact transmission processing unit (controls data generation processing unit) 330 generates an Act/Dact Cell as control data for controlling execution of the monitoring process according to a direction from the microcomputer 95. The Act/Dact transmission processing unit 330 also has a timer function to detect whether an Act/Dact Conf/Deni Cell corresponding to a Act/Dact Cell sent within 5 second after the Act/Dact Cell is sent out is received or not, and an Act/Dact Cell re-transmitting function to retransmit an Act/Dact Cell in the case where the Act/Dact Conf/Deni Cell is not received. The Act/Dact transmission processing unit 330 can send an Act/Dact Cell for each channel according to a setting by the microcomputer 95.

To this end, the Act/Dact transmission processing unit 330 comprises, as shown in FIG. 26, a five-second timer data holding unit 330A, a timer counting unit 330B, a five-second timer updation control unit 332, an Act/Dact cell generation control counter unit 333, and an Act/Dact cell generating unit 334.

The five-second timer data holding unit 330A holds a count value showing a time elapsed after an Act/Dact Cell is sent, which is configured with a five-second timer RAM (first timer RAM) 331 configured with a single port RAM storing the count value, and a read/write control unit 337 controlling writing/reading on the five-second timer RAM 331.

In concrete, the single port RAM (five-second timer RAM) 331 holds a time elapsed after an Act/Dact cell is sent, also holds the number of times of re-transmission (re-try number count) along with the time elapsed.

A re-transmission number is information showing the number of times of re-transmission at the time of the current processing. Re-transmission by re-try of the Act/Dact Cell is done within a range set by the microcomputer 95. When the number of times of re-try is set to three by the microcomputer 95, for example, the Act/Dact Cell is sent three times including the first sending.

Figure 27:
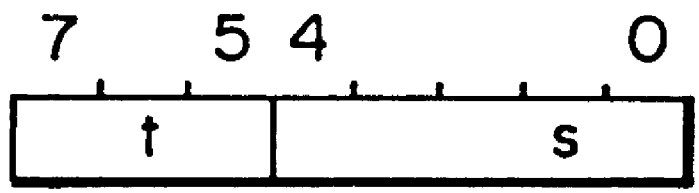
FIG. 27 is a diagram showing an example of a data structure in a region of a five-second timer RAM according to the embodiment.

For the purpose of counting for each channel, the single port RAM 331 holds a count value for each channel. A timer count value is written in/read from the single port RAM 331, in which a timer count value (5-second count) as shown in FIG. 27, is held with 5 bits (designated by "s" in FIG. 27), and a re-transmission number (re-try number count) is held with 3 bits (designated by "t" in FIG. 27).

The timer counting unit 330B performs an update control on a count value stored in the single port RAM 331, which comprises, as shown in FIG. 26, a timer value updating unit 335 and a re-try value updating unit 336.

The timer value updating unit 335 updates a 5-second count value stored in the single port RAM 331 on the basis of a 5-second count value stored in the single port RAM 331 and information.on an internal processing state read out from the CAM RAM 313. In concrete, the timer value updating unit 335 does not count up if the internal processing state is not "Act/Dact response cell wait (WAIT)", while counting up when the internal processing state is "Act/Dact response cell wait".

The re-try value updating unit 336 updates (counts up) a re-try number count that is a re-transmission number set by the microcomputer 95 (re-try setting) stored in the five-second timer RAM 331 on the basis of information from the CAM RAM 313 and the five-second timer RAM 331. If there is no response (Activate Confirmed Cell or Activate Denied Cell) to a sent Act/Dact Cell even when the counted-up re-try number count reaches a microcomputer set value, the re-try value updating unit 336 notifies the CAM RAM 313 so as to update the internal processing state to a time-out state (internal state updation), and waits for the next setting from the microcomputer 95.

When the re-try value updating unit 336 receives information signifying that the 5-second count reaches a maximum value and 5 seconds have been elapsed from the timer value updating unit 335, the re-try value updating unit 336 makes the internal processing state transit to "Act/Dact Cell send request". The Act/Dact cell generation control counter unit 333 to be described later detects information ("Activate/Deactivate request" for the second,time) on the internal processing state held in the CAM RAM 313, and sends an Act/Dact generate request (request for generating an Act/Dact Cell) and the like to the PM cell inserting unit 500.

The five-second timer updation control unit 332 controls a timing to write or read information held in the five-second timer RAM 331, with a timer signal as an opportunity, and outputs a read request (CAM read/write request) to read an internal processing state and the like to the CAM RAM 313.

As above, the five-second timer data holding unit 330A and the timer counting unit 330B function as a first, timer counting unit to monitor whether an Act/Dact Conf/Deni Cell permitting/denying execution of the monitoring process as a response to a sent Act/Dact Cell is received within 5 seconds or not, besides having a function for a re-generating process (re-transmitting process) to re-generate the above Act/Dact Cell when response data (Act/Dact Conf/Deni Cell) permitting/denying execution of the PM processing is not received within 5 seconds.

The Act/Dact cell generation control counter unit 333 controls a timing to generate an Act/Dact Cell. For instance, the Act/Dact cell generation control counter unit 333 outputs an Act/Dact generate request to the PM cell inserting unit 500 on the basis of an internal processing state, and makes the internal processing state of the CAM RAM 313 transit to "Act/Dact sent-back cell wait" when receiving a Act/Dact generation permit signal (signal for permitting to generate an Act/Dact Cell), besides outputting a read request for contents of a cell to be generated to the setting RAM 316.

The Act/Dact cell generating unit 334 generates a cell to be generated using contents of a generated cell read out in response to the contents of a cell to be generated read request outputted to the setting RAM 316 of the above Act/Dact cell generation control counter unit 333.

On the side generating the above Act/Dact cell, data is read out from the CAM RAM 313, the setting RAM 316 and the five-second timer 331, and a state is shifted to retrieval of the next channel if the internal processing state is not for a channel on which an Activate/Deactivate request is being made.

If the internal processing state of a channel read out in response to the CAM read/write request outputted to the .CAM RAM 313 is not "Activate/Deactivate request", the Act/Dact cell generation control counter unit 333 shifts to a process of reading an internal processing state of another channel to shift to the retrieving process on another channel.

Figure 28:
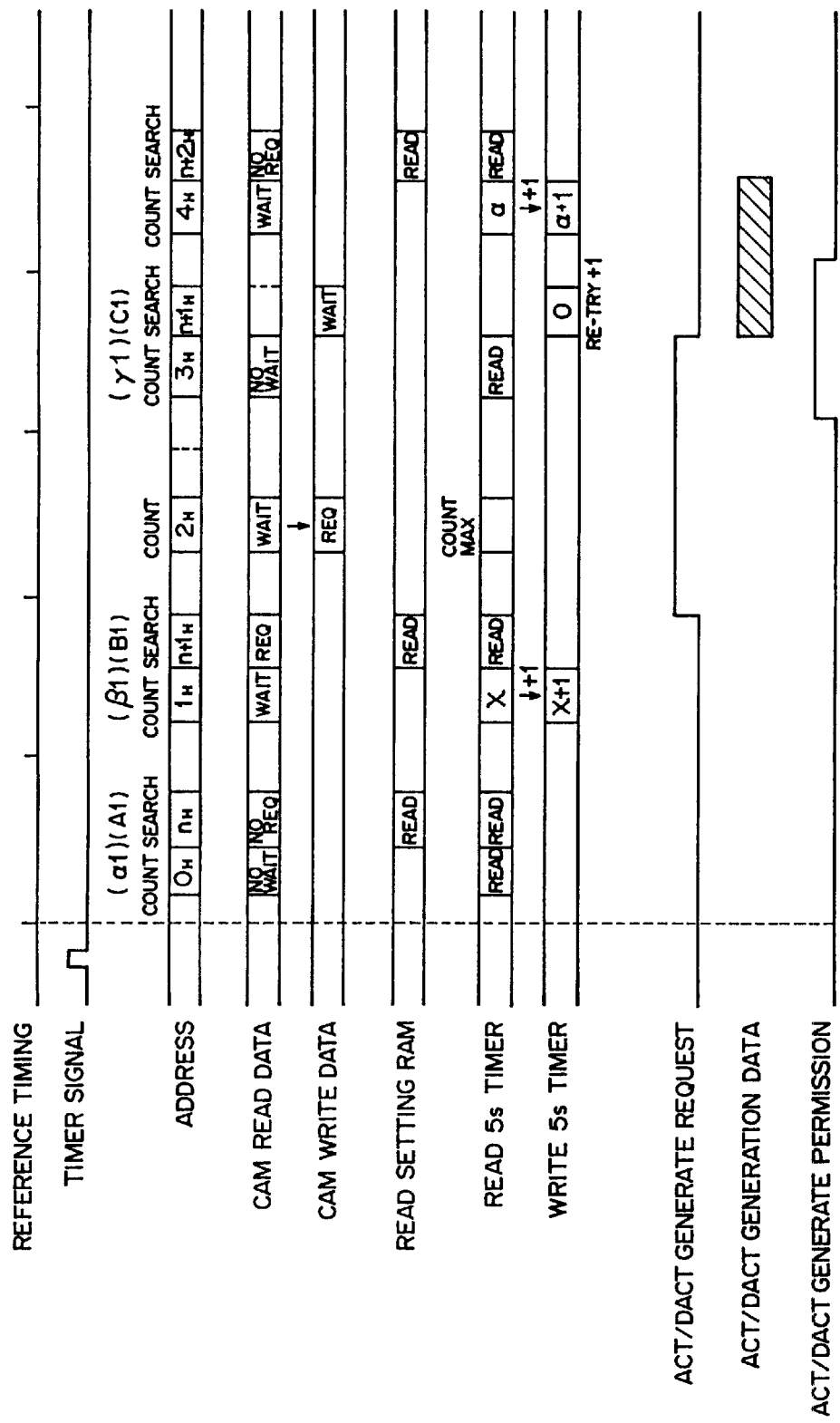
FIG. 28 is a timing chart for illustrating a process in the Act/Dact transmission processing unit according to the embodiment.

FIG. 28 is a timing chart for illustrating a process of the Act/Dact transmission processing unit 330. As shown in FIG. 28, the Act/Dact transmission processing unit 330 counts up a 5-second count with a timer signal as an opportunity. In concrete, the timer value updating unit 335 counts for each channel, and reads information on an internal processing state and information on a 5-second count from the CAM RAM 313 and the five-second timer RAM 331. The timer value updating unit 335 does not count up the 5-second count (at a timing designated by "α1" in FIG. 28) when the internal processing state is not "Act/Dact sent-back cell wait" (mentioned as "no wait" in FIG. 28). When the internal processing state is "Act/Dact sent-back cell wait" (mentioned as "wait" in FIG. 28), the timer value updating unit 335 counts up (counts up a count value X to X+1) (at a timing designated by "β1" in FIG. 28). The re-try value updating unit 336 notifies of a direction the CAM RAM 313 to update the internal processing state if the state is "Act/Dact sent-back cell wait" and the 5-second count value is a maximum value. The CAM RAM 313 makes the internal processing state in a corresponding address region transit to "Act/Dact cell send request" (at a timing designated by "γ1" in FIG, 28).

On the side retrieving Act/Dact generation (Act/Dact cell generation control counter unit 333, Act/Dact cell generating unit 334), the Act/Dact cell generation control counter unit 333 reads data from the CAM RAM 313 and the five-second timer RAM 331, and shifts to retrieval of the next channel (at a timing designated by "A1" in FIG. 28) when the internal processing state is not "Act/Dact Cell send request". When the internal processing state is "Act/Dact Cell send request" (mentioned as "req" in FIG. 28), the Act/Dact cell generation control counter unit 333 outputs an Act/Dact generate request to the PM cell inserting unit 500 (at a timing designated by "B1" in FIG. 28). When an Act/Dact generation permit signal is sent back from the PM cell inserting unit 500, the Act/Dact cell generation control counter unit 333 makes the internal processing state transit to "Act/Dact sent-back cell wait", the re-try value updating unit 336 counts up a re-try number count, and the Act/Dact cell generating unit 334 sends Act/Dact generation data (at a timing indicated by "C1" in FIG. 28).

Reading/writing on the CAM RAM 313, the setting RAM 316 and the five-second timer RAM 331 in the Act/Dact generation retrieval is executed in the same time sequence as shown in FIGS. 22, 53 and 54.

In the CAM unit 300 with the above structure, the PM determining unit 310 determines a user cell (User Cell) received from the downstream side, a cell for VP/VC.Monitoring, and a user cell received from the upstream side on the basis of discrimination information, and extracts contents of a received cell and generates various control signals.

When receiving a cell (downstream received cell, upstream received cell) and performing the discriminating process, the CAM discriminating unit 311 discriminates a cell while reading contents of the received cell and data for 120 channels stored in the CAM RAM 313 in order. As shown in FIG. 24, the CAM discriminating unit 311 reads discrimination information 15 times from 8 CAM RAMs 313, and retrieves an appropriate CAM RAM address in the discrimination information for 120 channels in total (K is 14 in FIG. 24). However, each of the CAM RAMs 313 stores only minimum items necessary for discrimination, so that the CAM discriminating unit 311 reads information from the setting RAM 316 and the five-second timer RAM 331 on the basis of information (retrieved address) discriminating-another setting information to makes a final determination. After the final determination, the CAM discriminating unit 311 extracts contents of the received cell, generates various control signals, and stores a change of the internal processing state obtained as a result of the determination in the CAM RAM 313 and the setting RAM 316.

When the CAM unit 300 detects a direction to execute PM from the microcomputer 95, the Forward Monitoring sending process unit 320 sends a Forward Monitoring Cell (monitoring data), and the Fm generation User Cell counting unit 321 in the Forward Monitoring sending process unit 320 counts the number of received user cells in the upstream in order to decide intervals to generate the For Mon Cell. In concrete, as shown in FIG. 25(*a*), the Forward Monitoring sending process unit 320 receives information signifying that the a cell in the upstream is received and discriminated as a user cell from the CAM discriminating unit 311, and when an internal processing state of a channel that is an object of the received user cell is "in monitoring", the Forward Monitoring sending process unit 320 counts the number of user cells in the upstream discriminated by the CAM control unit 310A to count up a block size of a corresponding address of the setting RAM 316. At a timing designated by "α" in FIG. 25(*a*), a block size count (CNT) is counted up by one.

The Fm generation User Cell counting unit 321 generates a Forward Monitoring Cell on the basis of For Mon contents data from the CAM data holding unit 310B, the setting data holding unit 310C and the PM counting unit 400 (to be described later) when the count value exceeds a setting value, makes a generate request to generate the cell to the UpS cell inserting unit 80, and stores a Forward Monitoring generate request [Active=1 (mentioned as "Req=1" in FIG. 25(*a*)] at a timing indicated by "β" in FIG. 25(*a*) in the setting RAM 316 (refer to FIG. 23).

The Fm cell generating unit 322 detects generation of a For Mon Cell from a User Cell count number to generate a cell. The Fm generation control counter unit 323 controls a counting in the Fm generation User Cell counting unit 321 and a timing to generate a cell in the Fm cell generating unit 322, and makes a cell generate request.

As shown in FIG. 25(*b*), for example, in the For Mon Cell generation detecting, for example, the Fm generation control counter unit 323 searches for a channel whose state is "in monitoring" and on which a Forward Monitoring generate request bit is active [mentioned as "Req=1" in FIG. 25(*b*)], and outputs a Fm generate request when detecting a relevant channel. The Fm cell generating unit 322 outputs Fm generation data when receiving an Fm generation permit signal sent back from the UpS cell inserting unit 80. The Fm cell (Fm generation data) is sent out to another ATM processing apparatus B that is an object of PM through the UpS cell inserting unit 80.

When the Fm generation permit signal is sent back from the UpS cell inserting unit 80, the Fm generation control counter unit 323 clears a count and a generate request bit in the setting RAM 316 (mentioned as "CNT→0, Req→0" in FIG. 25(*a*)].

In addition, the Act/Dact transmission processing unit 330 in the CAM unit 300 generates an Act/Dact Cell as control data for controlling execution of the PM processing according to a direction from the microcomputer 95, holds an elapsed time in order to detect whether an Act/Dact Conf/Deni Cell corresponding to the sent Act/Dact Cell is received within 5 seconds or not, and re-transmits the Act/Dact Cell when not receiving.

Namely, the timer value updating unit 335 updates a 5-second count value stored in the single port RAM 331 on the basis of the 5-second count value stored in the single port RAM 331 and information on an internal processing state read out from the CAM RAM 313. In concrete, the time value updating unit 335 does not count up if the internal processing state is not "Act/Dact sent-back Cell wait", on the other hand, counts up if the internal processing state is "wait".

The re-try value updating unit 336 updates (counts up) a re-try number count that is a re-transmission number set by the microcomputer 95 (re-try setting) stored in the five-second timer RAM 331 on the basis of information from the CAM RAM 313 and the five-second timer RAM 331. If the re is no response (Act/Dact Conf/Deni Cell) in response to the sent Act/Dact Cell even when the counted-up re-try number count becomes the microcomputer setting value, the re-try value updating unit 336 notifies (updates the internal processing state) the CAM RAM 313 so as to update the internal processing state to a time-out state, and waits for the next setting from the microcomputer 95. When receiving information signifying that the 5-second.count becomes a maximum value and 5 second has been elapsed from the timer value updating unit 335, the re-try value updating unit 336 makes the internal processing state transit to "Act/Dact Cell sent request".

On the other hand, the Act/Dact cell generation control counter unit 333 controls a timing to generate an Act/Dact Cell. The Act/Dact cell generation control counter unit 333 outputs an Act/Dact generate request to the PM cell inserting unit 500 on the basis of, for example, the internal processing state. When an Act/Dact generation permit signal is sent back, the Act/Dact cell generation control counter unit 333 makes the internal processing state of the CAM RAM 313 transit to "Act/Dact sent-back Cell wait", and outputs a read request to read contents of a cell to be generated to the setting RAM 316.

As shown in FIG. 28, the 5-second count is counted up with a timer signal as an opportunity. In concrete, the timer value updating unit 335 counts for each channel, and reads information on the internal processing state and information on the 5-second count from the CAM RAM 313 and the five-second timer RAM 331.

The timer value updating unit 335 does not count up the 5-second count if the internal processing state is not "Act/Dact sent-back Cell wait" (mentioned as "no wait" in FIG. 28) (at a timing indicated by "α1" in FIG. 28). If the internal processing state is "Act/Dact sent-back Cell wait" (mentioned as "wait" in FIG. 28), the timer value updating unit 335 counts up (counts up the count value X to X+1) (at a timing indicated by "γ1" in FIG. 28).

If the internal state is "Act/Dact sent-back Cell wait" and the 5-second count value is a maximum value, the re-try value updating unit 336 notifies the CAM RAM 313 so as to update the internal processing state. The CAM RAM 313 makes the internal processing state in a region of a corresponding address transit to "Act/Dact Cell send request" (at a timing indicated by "γ1" in FIG. 28).

In retrieving the Act/Dact generation, the Act/Dact cell generation control counter unit 333 reads data from the CAM RAM 313.and the five-second timer RAM 331, and shifts to retrieval of the next channel if the internal processing state is not "Act/Dact Cell send request" (mentioned as "no req" in FIG. 28) (at a timing indicated by "A1" in FIG. 28). If the internal processing state is "Act/Dact Cell send request" (mentioned as "req" in FIG. 28), the Act/Dact cell generation control counter unit 333 outputs an Act/Dact generate request to the PM cell inserting unit 500 (at a timing indicated by "B1" in FIG. 28).

When an Act/Dact generation permit signal is sent back from the PM cell inserting unit 500, the Act/Dact cell generation control counter unit 333 makes the internal processing state transit to Act/Dact sent-back Cell wait", the re-try value updating unit 336 counts up a re-try number count, and the Act/Dact cell generating unit 334 sends out Act/Dact generation data (at a timing indicated by "C1" in FIG. 28).

Incidentally, the Act/Dact Cell generation control counter unit 333 detects the internal processing state ("Act/Dact send request") updated at a timing indicated by "γ1" in FIG. 28, whereby the Act/Dact Cell re-transmitting process is performed.

As above, the CAM unit 300 according to this invention holds discrimination information for 120 channels in the CAM RAM 313, whereby a scale of the circuit is decreased. Further, the CAM unit 300 is provided with 8 CAM RAMs 313 to read discrimination information from the CAM RAMs 313 in parallel, thereby quickly performing the process.

Still further, setting data not used in the discriminating process is held in the setting RAM 316, thereby minimizing a size of the CAM RAM 313 frequently operating, and decreasing a power consumption.

In the PM processing, the internal processing state is coded, thereby easily managing, readily detecting generation of an abnormal state, and recovering the abnormal state in an early stage.

Not only the internal processing state is coded but also each bit has a meaning, whereby it is possible to configure a portion operating with reference to a code with a simpler circuit. This contributes to a decrease of scale of the circuit and a power consumption.

The CAM discriminating unit 311 determines whether an Activate Request Cell or the like as received control data should be notified the microcomputer 95 or not on the basis of at least information on its own internal processing state, thereby preventing uncontrollable running or stampede.

In generating a Forward Monitoring Cell, a portion making a generate request according to generate request conditions.and a portion generating a cell by retrieving the generate request are separately provided, and each portion independently operates, whereby each portion is configured as a simple circuit. At the same time, the process can be efficiently performed in a time sequence of a complex RAM, and an efficient access can be got to the RAM so that a power consumption is decreased.

The Act/Dact transmission processing unit 330 generates an Activate Request Cell or the like as control data on the basis of information on an internal processing state in the CAM discriminating unit 311, so that the Activate Request Cell can be generated without individual monitoring on the internal processing state. This leads to a decrease of a circuit scale and power consumption.

Further, the five-second timer RAM 331 is used to hold both a re-try number count and a 5-second count, so that a circuit scale is decreased.

(3-3) Description of the Act/Dact Reception Processing Unit

The Act/Dact reception processing unit (control data reception processing unit) 600 shown in FIG. 17 notifies of contents of a cell [Act Req Cell (control data), Act Conf Cell, Act Deni Cell, Dact Req Cell (control data), Dact Conf Cell, Dact Deni Cell] discriminated as necessary to be notified by the PM discriminating unit 310 to the microcomputer 95, and generates response data (Act Conf/Deni Cell, Dact Conf Cell) according to a direction from the microcomputer 95 in response to the notification to make a generate request.

The Act/Dact reception processing unit 600 makes an Act Deni Cell send request (request for sending Act Deni Cell) if the re is no response from the microcomputer within 2 seconds after notifying of the contents of the Act Req Cell the microcomputer 95.

Figure 29:
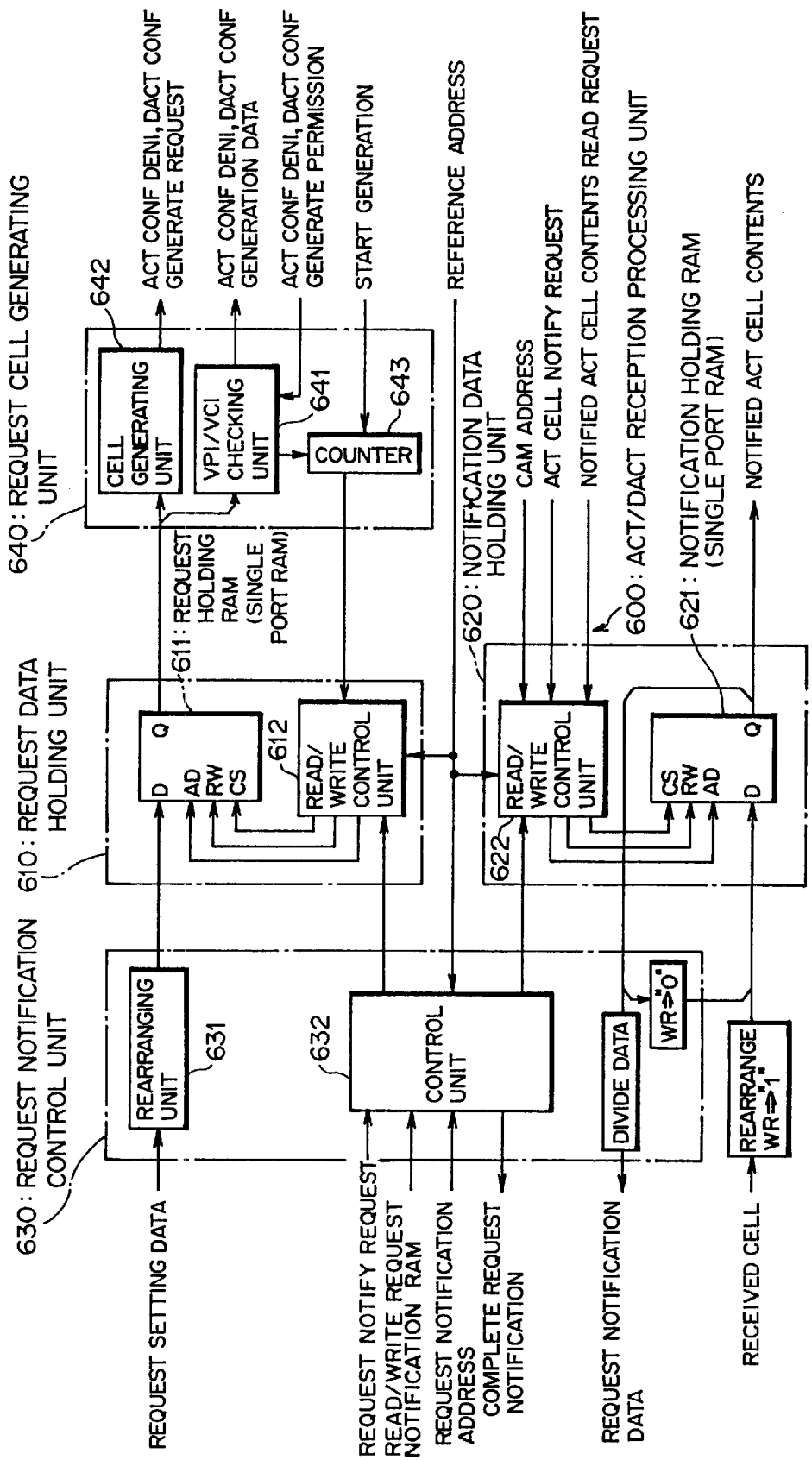
FIG. 29 is a block diagram showing the Act/Dact reception processing unit according to the embodiment.

To this end, the Act/Dact reception processing unit 600 comprises, as shown in FIG. 29, a request data holding unit 610, a notification data holding unit 620, a request notification control unit 630 and a request cell generating unit 640.

The request data holding unit (direction contents holding unit) 610 holds various cell send request information (data for request setting) from the microcomputer 95. Here, the various cell send request information from the microcomputer 95 is stored for each channel in a single port RAM (hereinafter referred as "request holding RAM" occasionally) 611. An information read/write control on the request holding RAM 611 is performed by a read/write control unit 612. The read/write control unit 612 adjusts an address and a control signal from the request notification control unit 630 and a read address and a control signal from the request cell generating unit 640.

In concrete, the request holding-RAM 611 stores information relating to various cell send requests for each channel in each STS channel. #i. After a cell send request for one channel is stored in the request holding RAM 611, a cell send request for another channel is stored. According to this embodiment, cell send requests for 120 channels in total are stored in the request holding RAM 611.

With respect to a channel whose information on a cell send request is not transmitted from the microcomputer 95, "0" is written in all regions in which information on a VPI/VCI should be written. Namely, the request holding RAM 611 can hold information (VPI/VCI=0) indicating presence or absence of a new direction from the microcomputer 95 using a VPI/VCI that is a part of contents of the direction from-the microcomputer 95.

Figure 31:
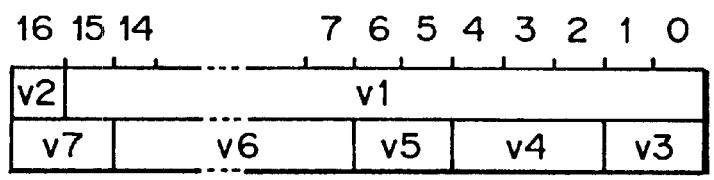
FIG. 31 is a diagram showing an example of a data structure in a region of the request holding RAM (single port RAM) according to the embodiment.

Since the information on a cell send request is in a large volume, 2 addresses are used for information for 1 channel, as shown in FIG. 31.

Figure 30:
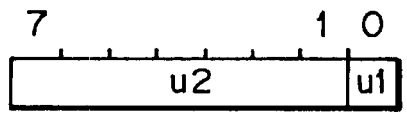
FIG. 30 is a diagram showing an example of an address structure in a region of a request holding RAM (single port RAM) according to the embodiment.

FIG. 30 is a diagram showing an example of an address of the request holding RAM (single port RAM) 611. As shown in FIG. 30, an address of the request holding RAM 611 is configured with 8 bits in total, that is, one bit (designated by "u1" in FIG. 30) for discriminating the above 2 addresses, and 7 bits (designated by "u2" in FIG. 30) for discriminating 120 channels.

FIG. 31 is a diagram showing an example of a data structure of the request holding RAM (single port RAM) 611. In a predetermined region in the single port RAM 611, information on a cell send request from the microcomputer 95 is held. Here, as request information, information on a VPI/VCI is expressed with 16 bits (designated by "v1" in FIG. 31), information on CLP with 1 bit (designated by "v2" in FIG. 31), information on End-to-End/Segment with 2 bits (designated by "v3" in FIG. 31), information on Message ID with 3 bits (designated by "v4" in FIG. 31), information on Direction with 2 bits (designated by "v5" in FIG. 31), information on Correlation Tag with 8 bits (designated by "v6" in FIG. 31), and information on Block Size with 2 bits (designated by "v7" in FIG. 31), whereby data for each channel is stored in a predetermined region in the single port RAM 611.

The above request cell generating unit 640 generates a cell corresponding to a cell send request from the microcomputer 95 on the basis of information held in the request data holding unit 610, and makes a generate request. The request cell generating unit 640 generates a cell with a generation start signal as an opportunity after request data (for 120 channels) from the microcomputer 95 is written.

To this end, the request cell generating unit 640 comprises, as shown in FIG. 29, a VPI/VCI checking unit 641, a cell generating unit 642 and a counter 643.

The VPI/VCI checking unit 641 determines from information on a cell send request read for each channel out from the request holding RAM (single port RAM) 611 whether information in a region of VPI/VCI is all "0" or not, and outputs a cell generate request.

In concrete, when it is known from generate request information read out that information in a region of VPI/VCI is all "0", the VPI/VCI checking unit 641 determines that it is not setting data for a new request from the microcomputer 95 so that reads generate request information on another channel. When it is known from the read generate request information that information in a region of VPI/VCI is not all "0", the VPI/VCI checking unit 641 determines that it is a generate request for a new cell from the microcomputer 95, so as to output a cell (Act Conf/Deni Cell, Dact Conf Cell) generate request to the PM cell inserting unit 500. When the counter 643 receives a generation permit signal as a response to the request, the cell generating unit 642 sends data for a cell to be generated to the PM cell inserting unit 500, after that, the VPI/VCI checking unit 641 retrieves a generate request for the next channel.

The above notification data holding unit (notification contents holding unit) 620 holds contents of a cell [Act Req Cell (control data), Act Conf Cell, Act Deni Cell, Dact Req Cell (control data), Dact Conf Cell, Dact Deni Cell] received from another ATM processing apparatus B, which comprises, as shown in FIG. 29, a single port RAM (hereinafter referred as "a notification holding RAM" occasionally) 621 and a read/write control unit 622 performing a read/write control on the single port RAM 621.

Figure 32:
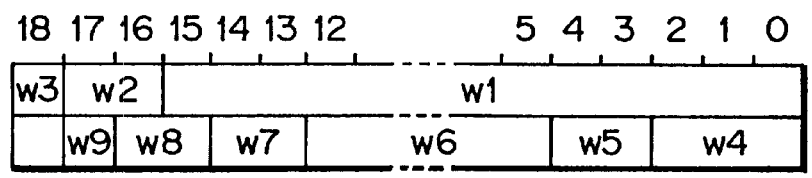
FIG. 32 is a diagram showing an example of a data structure in a region of a notification holding RAM (single port RAM) according to the embodiment.

Since information to be notified the microcomputer 95 is in a large volume, a region of 2 addresses is used for information for one channel, as shown in FIG. 32.

The address used for the above request holding RAM 611 shown in FIG. 30 is also used for the notification holding RAM 621. The address of the notification holding RAM 621 is configured with 8 bits in total, that is, 1 bit (designated by "u1" in FIG. 30) is used to discriminate the above 2 addresses, and 7 bits (designated by "u2" in FIG. 30) are used to discriminate 120 channels.

FIG. 32 is a diagram showing an example of a data structure of the notification holding RAM 621. As shown in FIG. 32, the notification holding RAM 621 according to this embodiment holds, as data to be notified the microcomputer 95 for each channel, a VPI/VCI with 16 bits (designated by "w1" in FIG. 32), information on state notification with 2 bits (designated by "w2" in FIG. 32), WR bit with 1 bit (designated by "w3" in FIG. 32), Message ID with 3 bits (designated by "w4" in FIG. 32), Direction with 2 bits (designated by "w5" in FIG. 32), Correlation Tag with 8 bits (designatedby "w6" in FIG. 32), Block Size with 2 bits (designated by "w7" in FIG. 32), information on End-to-End/Segment with 2 bits (designated by "w8" in FIG. 32), and information on CLP with 1 bit (designated by "w9" in FIG. 32).

Information on a received cell stored in the notification holding RAM 621 is read out by the read/write control unit 622 after request setting data for 120 channels is all stored in the request holding RAM 611. For example, the information is notified the microcomputer 95 every 500 msec [once (120 channels)/500 msec]. A timing to read the received cell information and an address for reading from the notification holding RAM 621 to the microcomputer 95 are generated by the request notification control unit 630. The read/write control unit 622 adjusts an address and a control signal from the request notification control unit 630 and an address for reading/writing notification contents and a control signal.

The request notification control unit 630 generates an address for reading and the like in response to a read request from the microcomputer 95. Data read out from the notification holding RAM 621 is converted into data for notification to the microcomputer 95 before notifying the microcomputer 95.

The WR bit held in the above notification holding RAM 621 is a code representing presence or absence of contents of a new notification to the microcomputer 95. By means of the WR bit, it is possible to notify the microcomputer 95 of whether data to be notified about the corresponding channel is new data or not. For instance, when the notification data holding unit 620 receives a cell having contents (η) within the next 500 m sec cycle after notifying of a cell having the same contents (72 ) the microcomputer 95, the WR bit is notified as "1". When the notification data holding unit 620 receives nothing, the contents and the WR bit are notified as (η) and "0", respectively, the microcomputer 95. Notified contents of the WR bit "1" are rewritten to "0" of the WR bit after notified the microcomputer 95.

The above request notification control unit 630 also has a function of interfacing to convert a data holding form of the data holding unit 620, so that the data held in the data holding unit 620 is adaptable to a register structure of the microcomputer 95, and interfacing to convert a register structure of the microcomputer 95, so that the data from the microcomputer 95 is adaptable to a data holding form of the data holding unit 610. When receiving a request notify request (write) from the microcomputer 95, the request notification control unit 630 converts the request information (various cell send requests) to a data structure of the request holding RAM 611, converts the data structure of the notification holding RAM 621 to a form adaptable to the microcomputer 95, and generates addresses and timing signals (control signals) for writing the request information in the request data holding unit 610 and reading data from the notification data holding unit 620 to notify of the data the microcomputer 95.

To this end, the request notification control unit 630 comprises, as shown in FIG. 29, a rearranging unit 631 for converting a data structure of at least request information, and a control unit 632 for generating an address and a timing signal for writing and reading, when paying attention to essential parts thereof. Incidentally, when a new request setting is not transmitted from the microcomputer 95, the request notification control unit 630 controls a writing to the request holding RAM 611 through the read/write control unit 612 so as to write "0" in all regions assigned to write information on a VPI/VCI.

Figure 33:
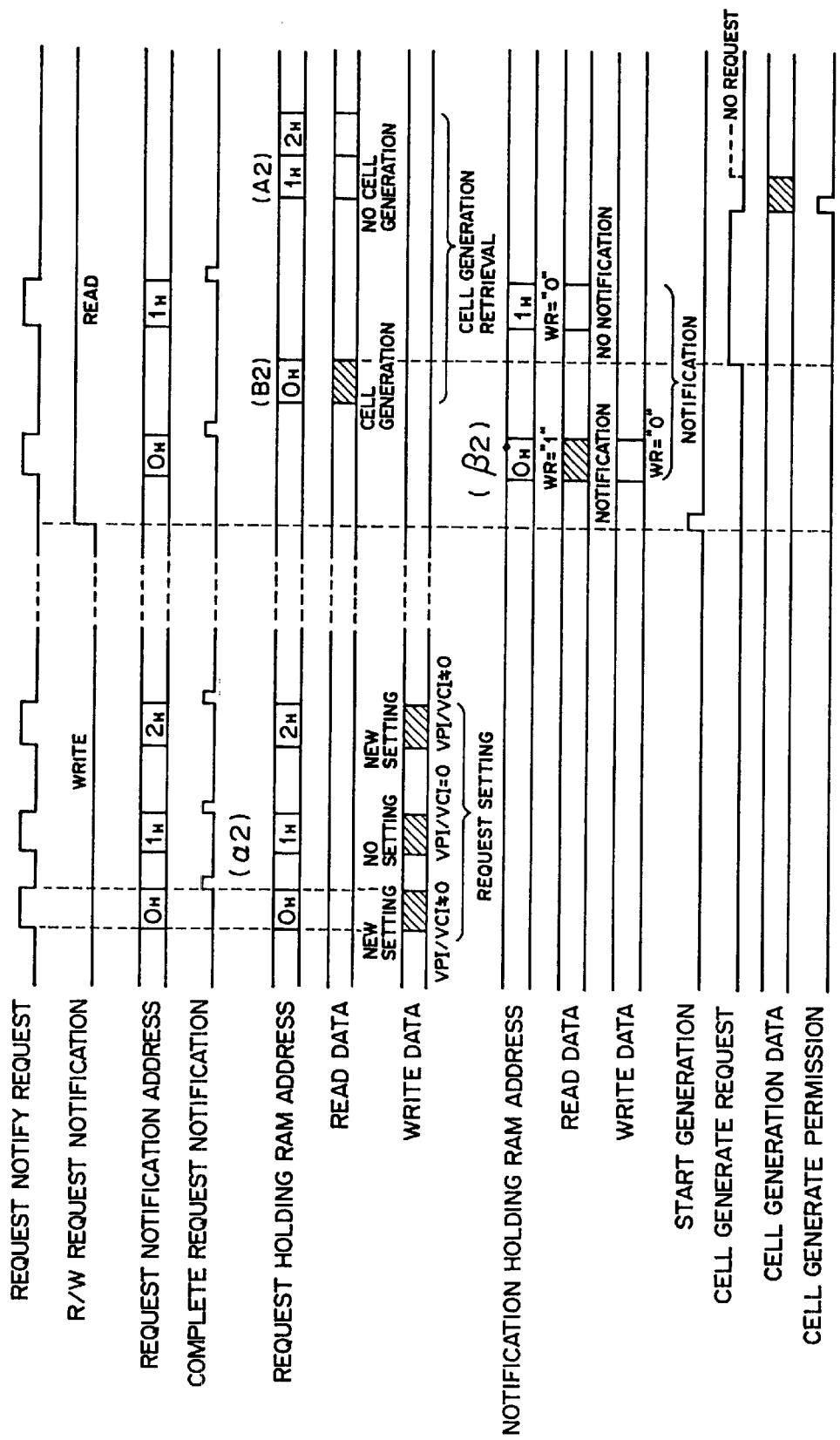
FIG. 33 is a timing chart for illustrating an operation to hold setting information from a microcomputer and notify of contents of a received cell the microcomputer by the Act/Dact reception processing unit according to the embodiment.

FIG. 33 is a timing chart for illustrating operations to hold setting information from the microcomputer 95 and notify contents of a received cell by the Act/Dact reception processing unit 600. As shown in FIG. 33, the request notification control unit 630 converts a request notify request from the microcomputer 95 to a data structure of the request holding RAM 611 when receiving the request notify request, and generates an address for writing and a timing signal. At this time, when not receiving a new request setting (cell send request) from the microcomputer 95, the request notification control unit 630 writes "0" in all VPI/VCI regions of the request holding RAM 611 (at a timing indicated by "α2" in FIG. 33).

When the notification data holding unit 620 receives a read request from the microcomputer 95, the read/write control unit 622 adjusts a read address and a control signal from the control unit 632 and an address for writing/reading contents of a notified cell and a control signal, thereby reading data in a corresponding address from the notification holding RAM 621. When contents of notification of the WR bit "1" is read out from the notification holding RAM 621 to the microcomputer 95, the contents of notification is rewritten to "0" (at a timing indicated by "β2" in FIG. 33).

The request cell generating unit 640 generates a cell with a generation start signal as an opportunity after the request data for 120 channels are written in the request data holding unit 610. Namely, the request cell generating unit 640 reads generate request data (cell send request) from the request data holding unit 610, determines as a new generate request when a VPI/VCI in the read data is not "0", and outputs a cell generate request to the PM cell inserting unit 500 (at a timing indicated by "B2" in FIG. 33). When receiving a generation permit signal from the PM cell inserting unit 500, the request cell generating unit 640 sends a cell, then retrieves the next channel (reads request setting data) after completion of the sending of the cell. When the VPI/VCI is "0", the request cell generating unit 640 determines as not a new generate, does not make a cell generate request, and reads request setting data for the next channel (at a timing indicated by "A2" in FIG. 33).

In the above request cell generating unit 640, the VPI/VCI checking unit 641 retrieves only once in all direction contents held in the request holding RAM 611 with a timing signal as an opportunity in response to a cell send request from the microcomputer 95 made once for each channel, and transmits a generate request for data (Act Conf/Deni Cell, Dact Conf Cell) to be transmitted to another ATM apparatus B as a cell generating operation, and the cell generating unit 642 transmits cell data to the PM cell inserting unit 500 (to be described later).

Figure 34:
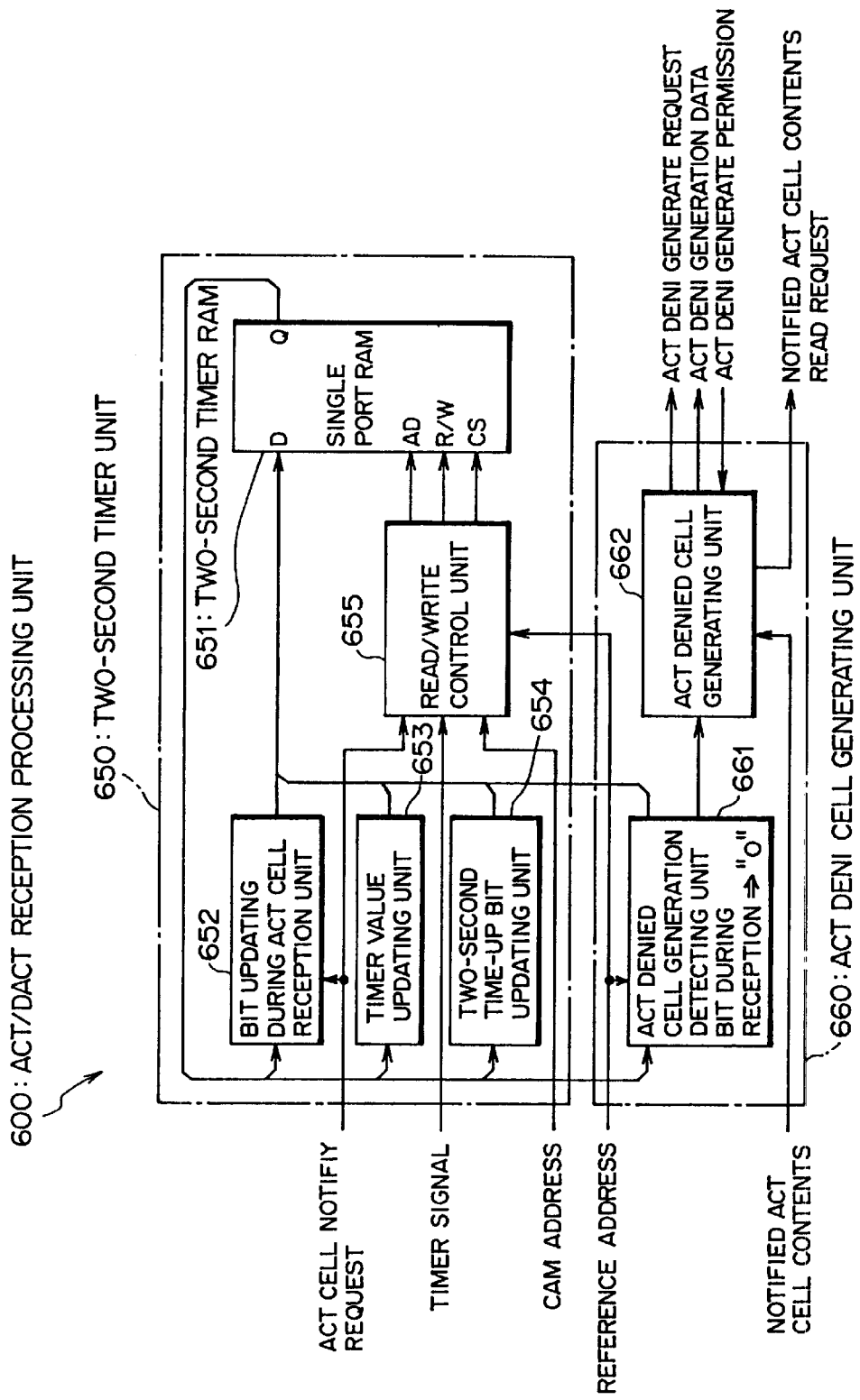
FIG. 34 is a block diagram showing the Act/Dact reception processing unit according to the embodiment.

The Act/Dact reception processing unit 600 comprises, as shown in FIG. 34, for example, a two-second timer unit 650, an Act Deni Cell generating unit 660 in order to make an Act Deni Cell send request when there is no response from the microcomputer 95 within 2 seconds after notifying of contents of an Act Req Cell the microcomputer 95.

The two-second timer unit 650 (second timer counting unit) counts an elapsed time after notifying of an Act Req Cell received from another ATM processing apparatus B to the microcomputer 95, and holds information signifying that the Act Cell has been received along with the count value. The two-second timer unit 650 also holds information on an Act Deni Cell send request (2-second time-up) irrespectively of a direction from the microcomputer 95. The Act Deni Cell generating unit 660 generates response data (Act Deni Cell) denying execution of the PM processing when a predetermined time is elapsed after notifying contents of the received cell the microcomputer 95, and detecting information on the Act Deni Cell send request (2-second time-up) from the above two-second timer unit 650.

Namely, the two-second timer unit 650 and the Act Deni Cell generating unit 660 monitor whether a direction from the microcomputer 95 in response to the notification is received within a predetermined period (2 second, here) or not, and generate response data (Act Deni Cell) denying execution of PM processing when determining that the direction is not received within the predetermined period.

For this, the two-second timer unit 650 further comprises, as shown in FIG. 34, a two-second timer RAM 651, a bit updating during Act Cell reception unit 652, a timer value updating unit 653, a two-second time-up bit updating unit 654, and a read/write control unit 655. The Act Denied Cell generating unit 660 comprises an Act Denied cell generation detecting unit 661 and an Act Denied cell generating unit 662.

In the second timer RAM (second timer RAM: single port RAM) 651, a timer count value is written/read in a predetermined cycle under a control of the read/write control unit 655. The second timer RAM 651 can hold information on a count state and an Act Deni Cell send request along with a timer count value. The read/write control unit 655 performs a control to write/read a timer count value and the like in/from the second-timer RAM 651 on the basis of an Act cell notify request (request for notifying an Act Cell), a timer signal and the like.

Figure 35:
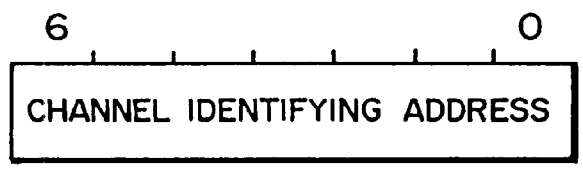
FIG. 35 is a diagram showing an example of an address structure in a region of a two-second timer RAM according to the embodiment.
Figure 36:
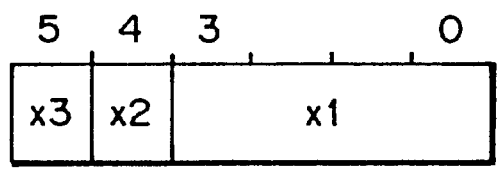
FIG. 36 is a diagram showing an example of a data structure in a region of the two-second timer RAM according to the embodiment.

FIG. 35 is a diagram showing an example of an address structure of the above second-timer RAM 651. As shown in FIG. 35, an address of the second-timer RAM 651 is of 7 bits, by which data as shown in FIG. 36 for 120 channels can be held. In the example of a structure of data shown in FIG. 36, there are used 4 bits (designated by "x1" in FIG. 36) to count a two-second timer value, 1 bit (designated by "x2" in FIG. 36) is used to indicated whether an Act cell is received or not, and 1 bit (designated by "x3" in FIG. 36) is used to indicated whether a second-timer value becomes time-out or not.

The above bit updating during Act Cell reception unit 652 controls the two-second timer RAM 651 so as to make the bit showing whether an Act Cell in information on a channel that is an object of the Act Cell is received or not active ("1") when receiving an Act cell notify request. The timer value updating unit 653 counts up a two-second timer value held in the two-second timer RAM 651 for a channel in which the bit during Act Cell reception is "1".

A procedure to update a 2-second timer value in the second-timer unit 650 is as follows. With a timer signal as an opportunity, the two-second timer unit 650 reads information managed in the two-second timer RAM 651 in the order of channel 0, 1, 2, ... and so on, from the 0th channel, and counts when the bit during Act Cell reception indicating whether an Act Cell is received or not read out from the two-second timer RAM 651 is "1". When the bit during Act Cell reception is "0", the two-second timer unit 650 does nothing, but reads data of the next channel.

When a second-timer count value for a channel managed in the two-second timer RAM 651 reaches a maximum value, the two-second time-up bit updating unit 654 determines it as time-up, and makes the 2-second time-up bit active ("1") as information indicating an Act Deni Cell send request, while controlling the two-second timer RAM 651 to make all the other bits "0".

The two-second timer unit 650 waits for only updation of the timer until the next timer signal is inputted, after executing the timer updating procedure on 120 channels.

In the Act Deni Cell generating unit 660, the Act Denied cell generation detecting unit 661 monitors the bit indicting 2-second time-up in channel information read out from the two-second timer RAM 651 in order to detect an Act Denied cell send request. Namely, when detecting channel information including the bit indicating 2-second time-up read out from the two-second timer RAM 651, the Act Denied cell generation detecting unit 661 notifies of the Act Denied cell send request the Act Denied cell generating unit 662.

When the bit indicating 2-second time-up is not active "1", a process of generating an Act Denied cell is not performed for a relevant channel, and a process of detecting whether there is an Act Deni generate request or not is performed for another channel.

The Act Denied cell generating unit 662 generates an Act Denied cell. When the Act Denied cell generation detecting unit 661 detects 2-second time-up, the Act Denied cell generating unit 662 transmits an Act Deni generate request to the PM cell inserting unit 500, and transmits an Act Denied cell (Act Denivgeneration data) to the PM cell inserting unit 500 when a generation permit signal is sent back from the PM cell. inserting unit 500.

Figure 37:
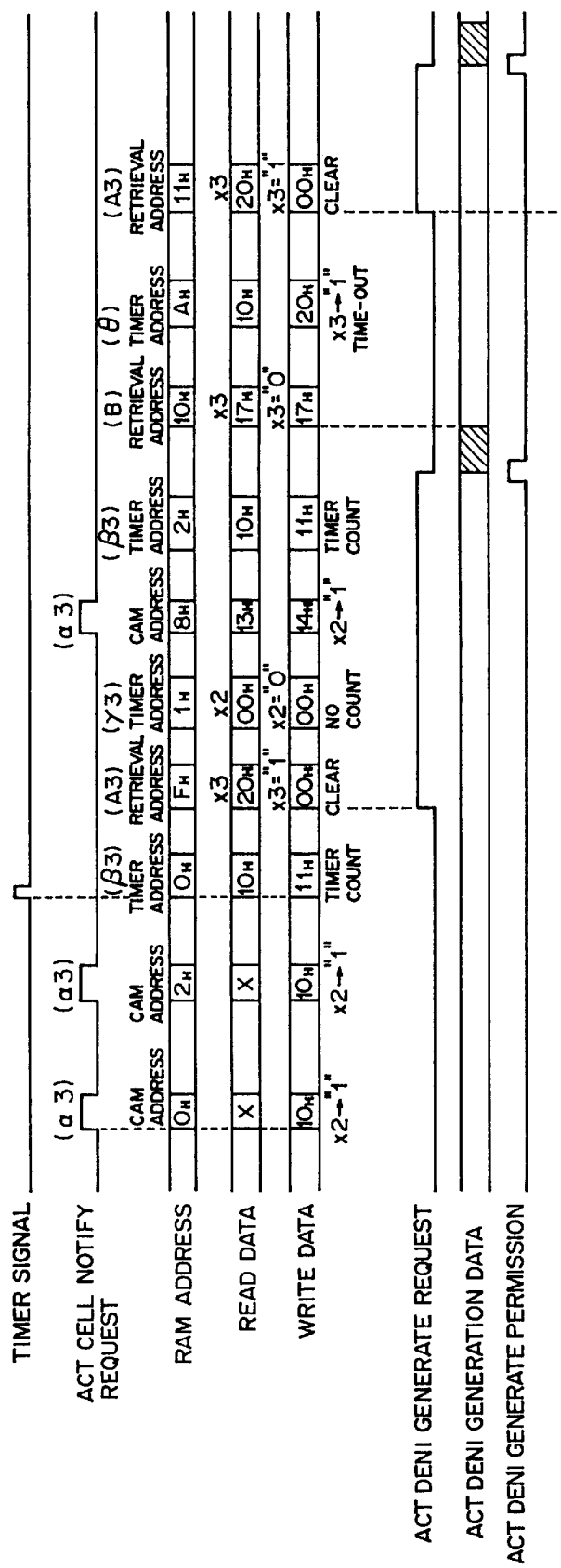
FIG. 37 is a timing chart for illustrating a two-second timer operation in the Act/Dact reception processing unit according to the embodiment.

FIG. 37 is a timing chart for illustrating a 2-second timer operation in the Act/Dact reception processing unit 600. As shown in FIG. 37, when, a received cell in the downstream determined (by the CAM discriminating unit 311) as a cell that should be notified the microcomputer 95 is written in the notification holding RAM 621, the Act/Dact reception processing unit 600 starts to count the two-second timer (at a timing indicated by "α3" in FIG. 37).

In updating the timer, the data is read in the order of channel 0, 1, 2, . . . and so on, with a timer signal as an opportunity. When the bit during Act Cell reception is active ("1"), the timer value is counted up (at a timing indicating by "β3" in FIG. 37). When the bit during Act Cell reception is not active, data of the next channel is read (at a timing indicated by "γ3" in FIG. 37). When the 2-second timer value reaches the upper limit, the 2-second time-up bit is made active, besides all other bits are made "0", whereby the state transits to an Act Denied Cell generate request state (at a timing indicated by "θ" in FIG. 37).

In an Act Denied Cell generating operation, the Act Denied cell generation detecting unit 661 retrieves each channel in order. When there is a channel in which the 2-second time-up bit is active ("1"), the Act Denied cell generating unit 662 outputs an Act Deni generate request for that channel to the PM cell inserting unit 500 (at a timing indicated by "A3" in FIG. 37). With respect to a channel in which the 2-second time-up bit is "0", the Act Denied cell generation detecting unit 661 does not make an Act Deni cell generate request, but retrieves the next channel. When completing retrieval of all 120 channels, the Act Denied cell generation detecting unit 661 waits for the next generation start signal.

In the Act/Dact reception processing unit 600 with the above structure, as shown in FIG. 33, the request notification control unit 630 converts request information (various cell send requests) into a data structure of the request holding RAM 611, converts data from the notification holding RAM 621 into a data structure of the microcomputer 95, and generates an address for writing the request information in the request data holding unit 610, an address for reading data from the notification data holding unit 620 to notify of the data the microcomputer 95, and a timing signal (control signal), when receiving a request notify request (write) from the microcomputer 95.

At this time, if a new request setting (cell send request) is not received from the microcomputer 95, "0" is written in all VPI/VCI regions of the request holding RAM 611 (at a timing indicated by "α2" in FIG. 33).

When the notification data holding unit 620 receives a read request from the microcomputer 95, the read/write control unit 622 adjusts a read address and a control signal from the control unit 632 and an address for writing/reading contents of a notified cell and a control signal, whereby data in a corresponding address is read from the notification holding RAM 621. When notification contents in the WR bit "1" are read out from the notification holding RAM 621 to the microcomputer 95, the WR bit of the notification contents is rewritten to "0" (at a timing indicated by "β2" in FIG. 33)

After a writing of request data for 120 channels in the request data holding unit 610 is completed, the request cell generating unit 640 generate a cell with a generation start signal as an opportunity. Namely, the request cell generating unit 640 reads generate request data (cell send request) from the request data holding unit 610, determines as a new generate request when a VPI/VCI in the data read but is not "0", and outputs a cell generates request.to the PM cell inserting unit 500 (at a timing indicated by "B2" in FIG. 33). When receiving a generate request permit signal from the PM cell inserting unit 500, the request cell generating unit 640 sends a cell, then retrieves the next channel after sending the cell (reads request setting data). When the VPI/VCI is "0", the request cell generating unit 640 determines that it is not a new generate request, makes no cell generate request but reads request setting data for the next channel (at a timing indicated by "A2" in FIG. 33).

As shown in FIG. 37, the timer is updated in the two-second timer unit 650 in such a manner that data is read out in the order of channel 0, 1, 2, . . . and so on, with a timer signal as an opportunity, and a timer value is counted up when the bit during Act Cell reception is active ("1") (at a timing indicated by "β3" in FIG. 37). When the bit during Act Cell reception is not active, data for the next channel is read (at a timing indicated by "γ3" in FIG. 37).

When the two-second timer value reaches the upper limit, the Act/Dact reception processing unit 600 makes the 2-second time-up value active while making all the other bits "0" to transit to the Act Denied Cell generate request state (at a timing, indicated by "θ" in FIG. 37).

In an Act Denied Cell generating operation, the Act Denied cell generation detecting unit 661 retrieves each channel in order, and when there is a channel in which the 2-second time-up bit is active ("1"), the Act Denied cell generating unit 662 outputs an Act Deni generate request for that channel to the PM cell inserting unit 500 (at a timing indicated by "A3" in FIG. 37). With respect to a channel in which the 2-second time-up bit is "0", the Act Denied cell generation detecting unit 661 does not make an Act Deni cell generate request, but retrieves the next channel (at a timing indicated by "B" in FIG. 37). When retrieving all 120 channels is completed, the Act Denied cell generation detecting unit 661 waits for the next generation start signal.

As above, the Act/Dact reception processing unit 600 according to this invention can efficiently hold data for a plurality of channels as direction contents from the microcomputer 95 and notification contents to the microcomputer 95, thereby decreasing a scale of the apparatus.

Absence of a new direction from the microcomputer 95 is expressed by making all VPI/VCI regions "0" to show that there is not data corresponding to new direction contents. It is thereby possible to decrease a scale of the circuit by using an existing region without expanding a region of the request holding RAM 611 in which information is stored.

It is possible to determine whether contents to be notified to the microcomputer 95 is new or old by making the WR bit of data shown in FIG. 32 active or not. Notification data is also cell contents of an Activate Denied Cell generated due to time-up of the two-second timer, so that the notification data cannot be cleared. Therefore, a register for generation becomes necessary if there is not provided the bit. Such register is unnecessary by virtue of the WR bit.

The Act/Dact reception processing unit 600 executes only one generating operation for one setting by the microcomputer 95, thereby eliminating extra operations. This contributes to a decrease of power consumption.

When the Act Denied cell generation detecting unit 661 determines that no direction is received from the microcomputer 95 within a predetermined period, the Act Denied cell generating unit 662 generates an Activate Denied Cell, so that it is possible to avoid isolation of the apparatus because a direction is not received from the microcomputer 95.

The two-second timer RAM 651 is written/read a timer count value therein/therefrom in a predetermined cycle. It is thereby possible to readily deal with a process on multi-channels and decrease a scale of the circuit and power consumption.

(3-4) Description of the PM Counting Unit

The PM counting unit (count processing unit) 400 conducts counting defined in the standards using a received user cell, a For Mon Cell and a Back Rep Cell, and notifies of a result of the counting obtained through the counting process as a result of a flow state the microcomputer 95.

Figure 38:
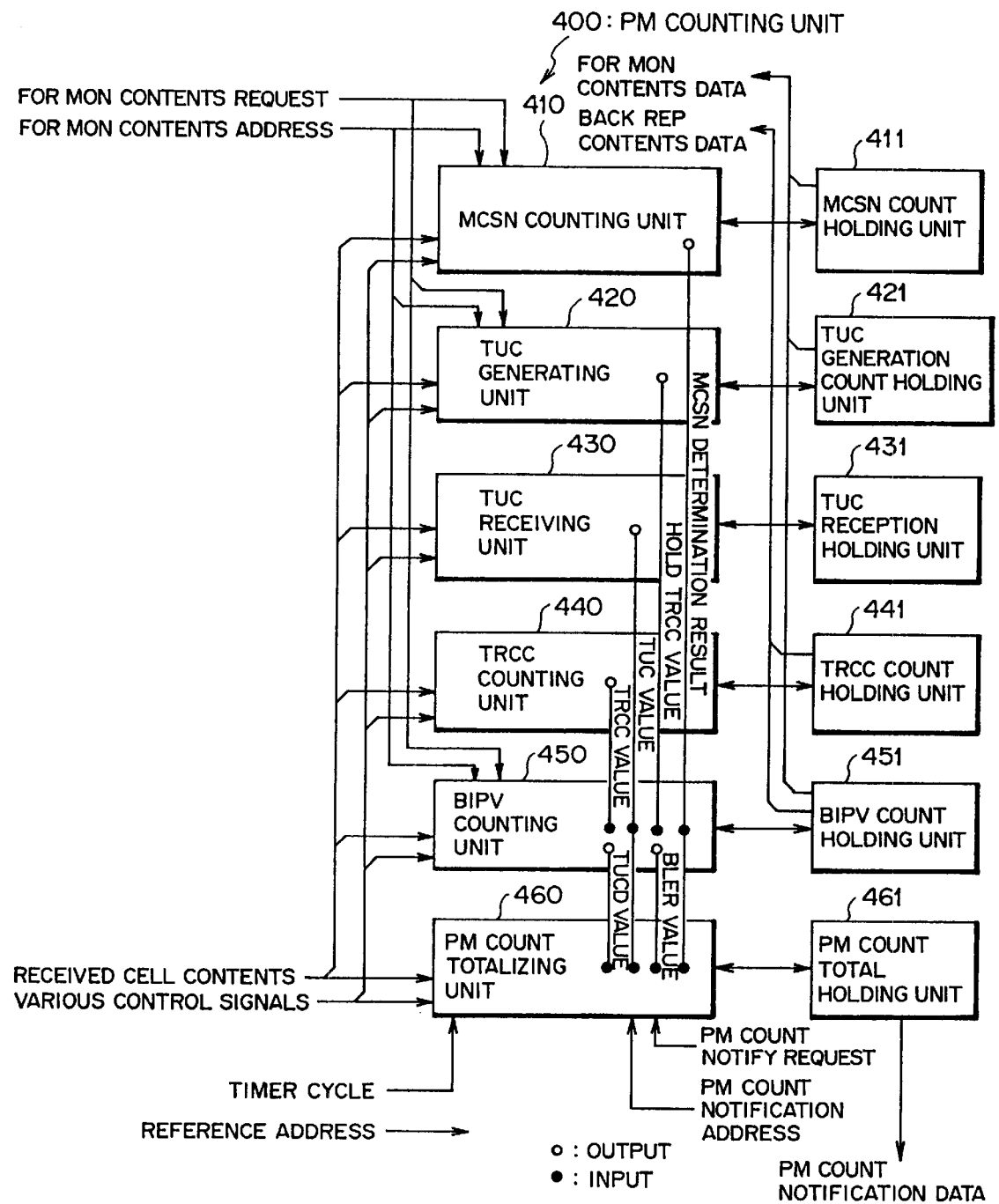
FIG. 38 is a block diagram showing a PM counting unit according to the embodiment.

To this end, the PM counting unit 400 comprises, as shown in FIG. 38, for example, an MCSN (Monitoring Cell Sequence Number) counting unit 410, an MCSN count holding unit 411, a TUC (Total User Cell) generating unit 420, a TUC generation count holding unit 421, a TUC receiving unit 430, a TUC reception holding unit 431, a TRCC (Total Received Cell Count) counting unit 440, a TRCC count holding unit 441, a BIPV (Bit Interleaved Parity-16 Violations) counting unit 450, a BIPV count holding unit 451, a PM count totalizing unit 460 and a PM count total holding unit 461.

The MCSN counting unit 410, the TUC generating unit 420, the TUC receiving unit 430, the TRCC counting unit 440 and the BIPV counting unit 450 generate plural kinds of information necessary to generate monitoring data (Forward Monitoring Cell, Backward Monitoring Cell), as a monitoring data generating information generating unit, each of which is configured with a RAM (single port RAM) to confirm counting defined in the standards using a received User Cell, For Mon Cell and Back Rep Cell.

The MCSN counting unit 410 performs counting for generating a transmit Forward Monitoring Cell, MCSN counting for a received Backward Reporting Cell, MCSN counting for checking a received Forward Monitoring Cell, and MCSN counting for generating a transmit Backward Reporting Cell, and counting an information sequence number (an additional following number of PM cell) in a received PM cell. The above sequence number of PM Cells (Forward Monitoring Cell) having Forward Monitoring information and the sequence number of PM Cells (Backward Reporting Cells) having Backward Reporting information are separately counted up, and are not always cleared. When the sequence number reaches 255 that is a maximum value, the sequence number is again counted up from 0.

Figure 39:
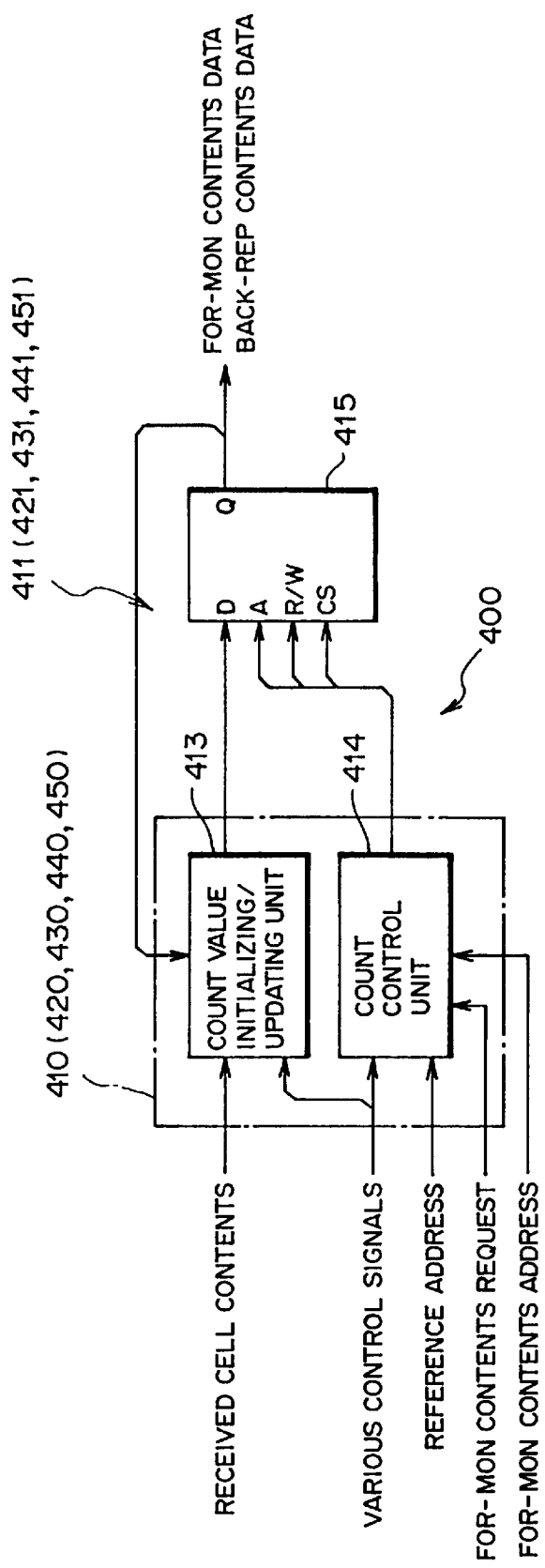
FIG. 39 is a block diagram showing an MCSN counting unit and an MCSN count holding unit according to the embodiment.

FIG. 39 is a block diagram showing structures of the above MCSN counting unit 410 and the MCSN count holding unit 411. As shown in FIG. 39, the MCSN counting unit 410 comprises a count value initializing/updating unit 413 and a count control unit 414, whereas the MCSN count holding unit 411 is configured with a single port RAM 415 storing data.

Figure 40:
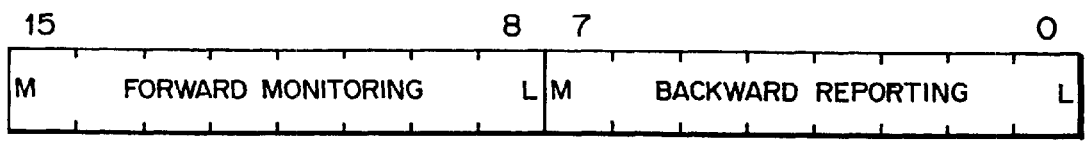
FIG. 40 is a diagram showing an example of a data structure in a region of an MCSN count RAM according to the embodiment.

A count value is stored in a region assigned to each channel of the single port RAM 415 designated by an address identifying each of 120 channels with 7 bits, similarly to an address in a region in the above two-second timer RAM 651 shown in FIG. 35. In concrete, as shown in FIG. 40, a count value of MCSN for Forward Monitoring is stored with 8 bits that is a half of 16 bits in total. Account value of MCSN for Backward Reporting is held with the remaining 8 bits.

The count value initializing/updating unit 413 counts on the basis of contents of a received cell and various control signals from the CAM unit 300. The count value is written in/read out from the RAM 411 under a control of the count control unit 414.

The above TUC generating unit 420 counts to generate a transmit Forward Monitoring Cell and received User Cells in the downstream. The TUC generating unit 420 handles $TUC_{0+1}$ and $TUC_0$ as types of TUC, counting these $TUC_{0+1}$ and $TUC_0$.

Namely, the TUC generating unit 420 generates a value ($TUC_{0+1}$) obtained by adding a value of $TUC_{0+1}$ inserted in a PM cell sent in the last occasion to a count value of User Information Cells counted from a User Information Cell (CLP=0/1) send next to the PM cell send in the last occasion to a User Information Cell immediately before a PM cell send this time. When a Forward Monitoring Cell is send out, the generated value of $TUC_{0+1}$ is inserted in the PM cell (refer to FIG. 15). When a Backward Reporting Cell is sent out, a $TUC_{0+1}$ in a received Forward Monitoring Cell is copied and inserted in a $TUC_{0+1}$ region (refer to FIG. 15) in the Backward Reporting Cell.

With respect to a User Information Cell whose CLP is "0", the TUC generating unit 420 generates a $TUC_0$ in a similar manner at the time of generating the above $TUC_{0+1}$. The generated $TUC_0$ is inserted in a region of $TUC_0$ (refer to FIG. 15) in the PM Cell when a Forward Monitoring Cell is sent out, as well as the above $TUC_{0+1}$. On the other hand, when a Backward Reporting Cell is send out, a $TUC_0$ is copied and inserted in a region of $TUC_0$ (refer to FIG. 15) in the Backward Reporting Cell.

The above TUC generating unit 420 and the TUC generation counting unit 421 comprise, similarly to the MCSN counting unit 410 and the MCSN counting holding unit 411 described with reference to FIG. 39, a count value initializing/updating unit 413, a count control unit 414 and a single port RAM 415.

Figure 41:
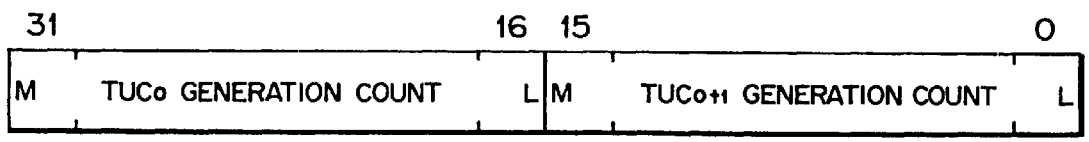
FIG. 41 is a diagram showing an example of a data structure in a region of a TUC generation count RAM according to the embodiment.

The single port RAM 415 of the TUC generation counting unit 421 can hold data as shown in FIG. 41 for each channel. Here, 16 bits among 32 bits in total are used to hold a count value of $TUC_{0+1}$, and the remaining 16 bits are used to hold a count value of $TUC_0$.

The count value initializing/updating unit 413 and the count control unit 414 in this case generate a control to generate $TUC_{0+1}$ and $TUC_0$ on the basis of information such as contents of a received cell and the like.

The above TUC receiving unit 430 holds TUC of a received Backward Reporting Cell and receives TUC of the received Forward Monitoring Cell, thereby holding them in the TUC reception holding unit 431, which comprises, a count value initializing/updating unit 413, a count control unit 414 and a single port RAM 415 similarly to those shown in FIG. 39.

Figure 42:
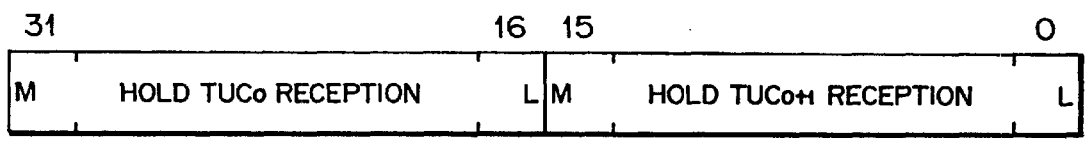
FIG. 42 is a diagram showing an example of a structure of a region in a TUC reception holding RAM according to the embodiment.

The count value is stored in a region assigned to each channel in the single port RAM 415 designated by an address identifying each of 120 channels with 7 bits. In concrete, as shown in FIG. 42, data of received $TUC_{0+1}$ is held with 16 bits that is a half of 32 bits in total, and data of $TUC_0$ is held with the remaining 16 bits. The initializing/updating unit 413 and the count control unit 414 generate a control to hold $TUC_{0+1}$ and $TUC_0$ on the basis of information such as contents of a received cell and the like.

The above TRCC counting unit 440 holds TRCC of a received Backward Reporting Cell and performs TRCC counting for generating a transmit Backward Reporting Cell. Here, the TRCC counting unit 440 handles $TRCC_{0+1}$ and $TRCC_0$ as types of TRCC, counting these $TRCC_{0+1}$ and $TRCC_0$, separately.

For instance, the TRCC counting unit 440 obtains the number N of User Information Cells whose CLP is "0" received between a PM cell received in the last occasion and a PM cell received this time, and adds N to a $TRCC_0$ sent in the last occasion to obtain a value as a $TRCC_0$ at the current timing. The generated value of $TRCC_0$ is sent out, included in Backward Reporting information.

With respect to User Information Cells whose CLP=0/1, the TRCC counting unit 440 also generates a $TRCC_{0+1}$ in a similar manner at the time of generating the above $TRCC_0$.

The above TRCC counting unit 440 and the TRCC count holding unit 441 also comprise a count value initializing/updating unit 413, a count control unit 414 and a single port RAM 415 similar to those shown in FIG. 39.

Figure 43:
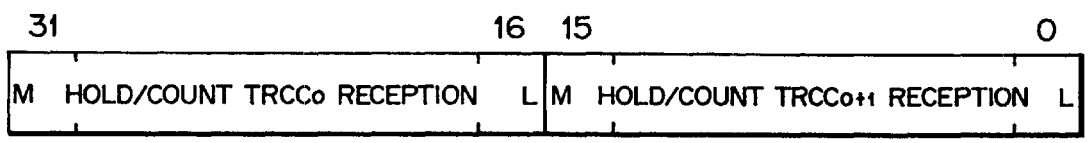
FIG. 43 is a diagram showing an example of a structure of a region in a TRCC reception count holding RAM according to the embodiment.

The single port RAM 415 of the TRCC count holding unit 441 can hold data as shown in FIG. 43, for example, for each channel. Here, 16 bits among 32 bits in total are used to hold or count data of $TRCC_{0+1}$, while the remaining 16 bits are used to hold or count data of $TRCC_0$.

In this case, the count value initializing/updating unit 413 and the count control unit 414 performs a control for generating/holding $TRCC_{0+1}$ and $TRCC_0$ on the basis of information such as contents of a received cell.

The above BIPV counting unit 450 performs BEDC counting for generating a transmit Forward Monitoring Cell and BLER (Block Error Result) counting for generating a transmit Back Rep Cell. When generating a transmit Forward Monitoring Cell, the BIPV counting unit 450 generates a Parity calculation code (BEDC: Block Error Detection Code) of a block information field of a User Cell transmitted after the Forward Monitoring Cell. This code (BEDC) is transmitted in the next occasion. A range of calculation of the above BEDC is from the first byte of a User Cell (CLP=0/1) immediately after a PM cell (Forward Monitoring Cell) is sent out to the last byte of a User Cell (CLP=0/1) immediately before a PM Cell (Forward Monitoring Cell) sent out next. In calculation, information field is dealt in units of 16 bits, each bit m (m corresponds to any one of 0th to 15th bit in FIG. 44) is calculated with a fellow bit m (for example, the third bit is calculated with the third bit), and the result is inserted in a bit m of $BEDC_{0+1}$.

When generating a transmit Backward Reporting Cell, the BIPV counting unit 450 obtains a value α of $BEDC_{0+1}$ in Forward Monitoring information of a PM cell received this time, obtains a value β obtained through a parity calculation (EVEN) on User Information Cells (CLP=0/1) received between a PM Cell received in the last occasion and a PM Cell received this time, and generates a bit number that is a difference between α and β as BLER (Block Error Result) $_{0+1}$. The $BLER_{0+1}$ is sent back as Backward Reporting information.

Figure 44:
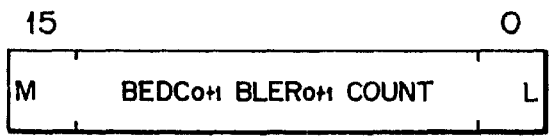
FIG. 44 is a diagram showing an example of a structure of a region in a BPIV count RAM according to the embodiment.

The BIPV counting unit 450 and the BIPV count holding unit 451 comprise a count value initializing/updating unit 413, a count control unit 414 and a single port RAM 415 similar to those shown in FIG. 39. The single port RAM 415 of the BIPV count holding unit 451 can hold data as shown in FIG. 44, for example, for each channel.

In this case, the count value initializing/updating unit 413 and the count control unit 414 perform a control for generating $BEDC_{0+1}$ and $BLER_{0+1}$ on the basis of information such as contents of a received cell and the like.

Figure 45:
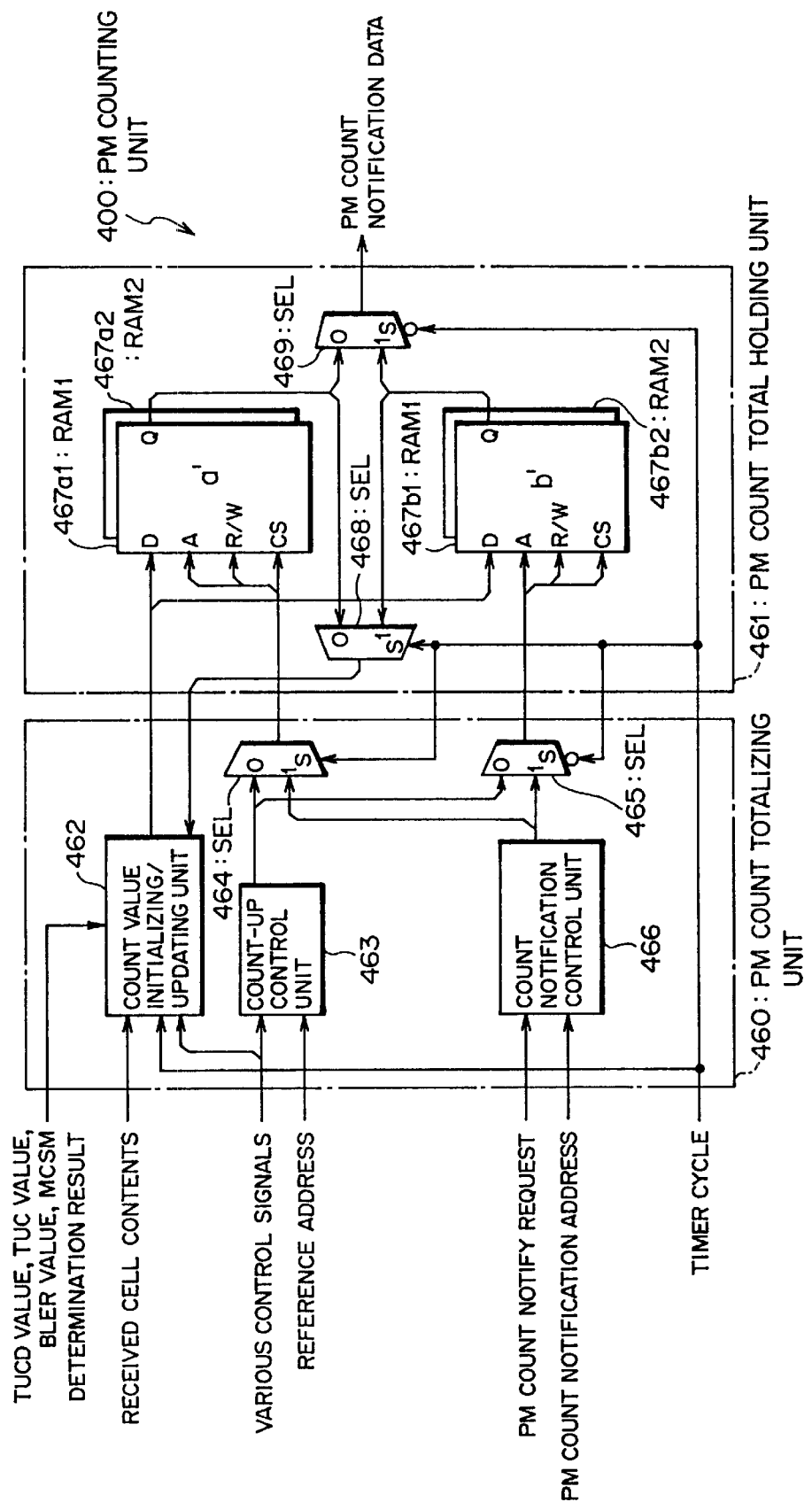
FIG. 45 is a block diagram showing a PM count totalizing unit and a PM count total holding unit according to the embodiment.

The above PM count totalizing unit 460 counts various monitoring items and notifies the microcomputer 95. The PM count total holding unit (count result holding unit) 461 holds a result of totalization obtained through the above counting process. As shown in FIG. 45, for example, the PM count totalizing unit 460 comprises a count value initializing/upating unit 462, a count-up control unit 463, SELs 464 and 465 and a count notification control unit 466. The PM count total holding unit 461 uses, as count result holding RAMS, 4 single port FAMs 467$a$1 (RAM1), 467$b$1 (RAM 1), 467$a$2 (RAM 2) and 467$b$2 (RAM 2), which are two types of RAMs 1 and 2 functioning alternately as a totalizing side and a notifying side. On each side of the PM count holding unit 461, there are provided one RAM 1 and one RAM 2. Incidentally, the single port RAMs 467$a$1 (RAM1) and 467$a$2 (RAM2) are referred as an a' side, the others are referred as a b' side.

In the PM count totalizing unit 460, the count value initializing/updating unit 462 counts each data using contents of a received cell outputted from the CAM unit 300 and count values such as a TUCD value and the like. The count-up control unit 463 performs a control to write/read a count value in/from the RAMs 1 and 2 according to various control signals from the CAM unit 300. The count notification control unit 466 controls reading of data of a result of count total from the PM count total holding unit 461 according to a PM notify request (request for notifying a PM) from the microcomputer 95. The SEL 464 switches between the count-up control unit 463 and the count-up notification control unit 466 to output a control signal from the count-up control unit 463 or the dcount-up notification control unit 466 to the a' side, with a timer signal (that is, a timer cycle of 500 ms, for example) The SEL 465 switches between the count-up control unit 463 and the count notification control unit 466 to output a control signal to the b' side with a timer signal (that is, a timer cycle of 500 ms, for example). When a signal from the count-up control unit 463 is outputted from the SEL 464 to the a' side, a control signal from the count notification control unit 466 is outputted from the SEL 465 to the b' side.

In the PM count total holding unit 461, the RAM 1 and the RAM 2 hold an MCSN value, a TUCD value, a TUC value, a BLER value and the like from the MCSN count holding unit 411 and the like. The SEL 468 switches between the a' side and the b' side to output data held in the a' side or the b' side to the count value initializing/updating unit 462 with a timer. signal (timer cycle) as an opportunity. The SEL 469 switches between the a' side and the b' side storing data as PM count notification data with a timer signal (timer cycle) to output the notification data to the DP-RAM interface unit 60.

Namely, the above PM count total holding unit 461 is configured with two planes (a' side and b' side), which are a side holding a result of count totalization obtained in the current cycle and a side notifying a result of count totalization obtained in the preceding cycle the microcomputer 95.

In a region designated by an address of 10 bits as shown in FIG. 46, there is held data as shown in FIGS. 47 and 48. An address designates a region in which data is stored for each of 120 channels with 7 bits (designated by "z1" in FIG. 46) among 10 bits in total, and designates a region in which plural kinds of count data are stored with the remaining 3 bits (designated by "z2" in FIG. 46).

An address of a RAM region shown in FIG. 46 is used commonly to the RAM 1 and the RAM 2.

Figure 49:
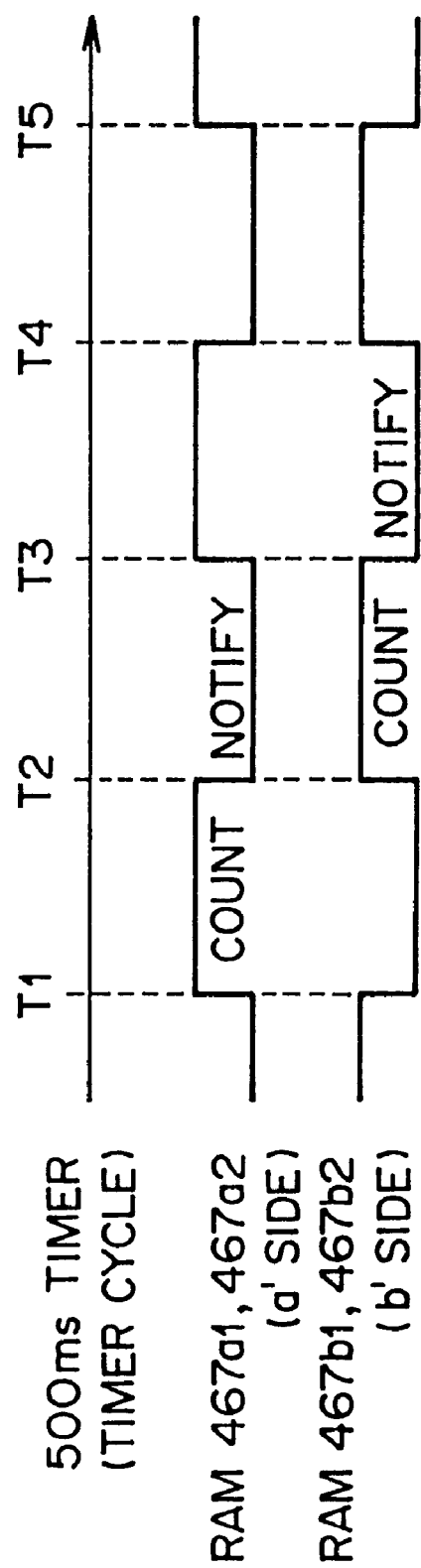
FIG. 49 is a timing chart for illustrating a counting operation and a notifying operation in the PM count total holding unit according to the embodiment.

FIG. 49 is a timing chart for illustrating counting and notifying operations in the PM count total holding unit 461. As shown in FIG. 49, the PM count total holding unit 461 performs a counting process by means of the single port RAMs 461a1 and 467a2 on the a' side in a timer cycle T1, and, in the next timer cycle T2, performs a process to notify a total value counted by the single port RAMS 467a1 and 467a2 in the preceding timer cycle T1 the microcomputer 95. While the single port RAMs 467a1 and 467a2 on the a', side notify of a count value the microcomputer 95 (during T2 to T3), the single port RAMs 467b1 and 467b2 perform a counting process, and notify a total value counted in the preceding cycle the microcomputer 95 in the next timer cycle T3. After that, the a' side and the b' side alternately count and notify in the similar manner.

In the PM counting unit 400 with the above structure, the MCSN counting unit 410 and the TRCC counting unit 440 and the like count various data (MCSN, TRCC and the like), and the count values are held in the MCSN count holding unit 411 (421, 431, 441, 451) and the like.

Namely, each of the count value initializing/updating units 413 of the MCSN counting unit 410, the TRCC counting unit 440 and the like counts up using contents of a received cell and the like, and the count value is written in/read out from the single port RAM 415 under a control of the count control unit 414.

Under a control of the count control unit 414 on a signal such as a Forward Monitoring Cell contents request or the like, various count values (TUC value, BLER value, MCSN value and the like) read out from the single port RAM 415 are outputted as Forward Monitoring Cell contents data to the Forward Monitoring sending process unit 320 shown in FIG. 18. The counted value is outputted as Backward Reporting Cell contents data to the PM cell inserting unit 500 when a Backward Reporting Cell is sent out.

Count values counted by the counting units 410, 420, 430, 440 and 450 are totalized in the PM count totalizing unit 460.

In the PM count totalizing unit 460, the count value initializing/updating unit 462 counts various data using contents of a received cell outputted from the CAM unit 300 and various count values such as a TUCD value and the like, and the count-up control unit 463 and the count notification control unit 466 perform a control to write/read a count total value on the a' side and the b' side in cooperation with the SELs 464 and 465.

As shown in FIG. 49, for example, in the PM count total holding unit 461, the single port RAMS 467a and 467a2 on the a' side perform a counting process in a timer cycle T1, and, in the next timer cycle T2, performs a process to notify of a total value counted by the single port RAMs 467a1 and 467a2 in the preceding timer cycle T1 the microcomputer 95. On the other hand, while the single port RAMs 467a1 and 467a2 notify of a count value the microcomputer 95 (T2 to T3), the single port RAMs 467b1 and 467b2 on the b' side perform the counting process, and notify of a total value counted in the preceding cycle the microcomputer 95 in the next timer cycle T3. After that, the a' side and the b' side alternately count and notify in the similar manner.

The PM counting unit 400 can be configured with a minimum number of registers as a RAM structure shown in FIGS. 40 through 44, when performing various counting processes. Further, an address of the RAM is used to identify each channel, so as to configure an efficient circuit and readily deal with a multi-channel processing.

In the PM count total holding unit 461, RAMs written/read count values therein/therefrom are alternately switched so that the PM count total holding unit 461 notifies and counts at the same time, thereby performing the processes quickly.

(3-5) Description of the PM Cell Inserting Unit

The PM cell inserting unit (control data transmission processing unit) 500 shown in FIG. 17 transmits an Act/Dact Cell as control data generated by the Act/Dact transmission processing unit 330 to another ATM processing apparatus B, and transmits an Act Deni Cell, a Dact Conf/Deni Cell and the like as response data generated by the Act/Dact reception processing unit 600.

In concrete, the PM cell inserting unit 500 has functions of adjusting sent-back cells (Act Deni Cell, Dact Conf/Deni Cell, Back Rep Cell) to be described later for received cells in the downstream and various cell generate requests, and making a cell generate request to the UpS cell inserting unit 80.

The PM cellinserting unit 500 generates a cell [Activate Denied Cell (sent-back data), Deactivate Confirmed Cell (sent-back data), Deactivate Denied Cell] according to contents of a cell determined in the PM determining unit 310 that notification to the microcomputer 95 is unnecessary but a sending-back is necessary, and transmits the cell to another ATM processing apparatus B.

Figure 50:
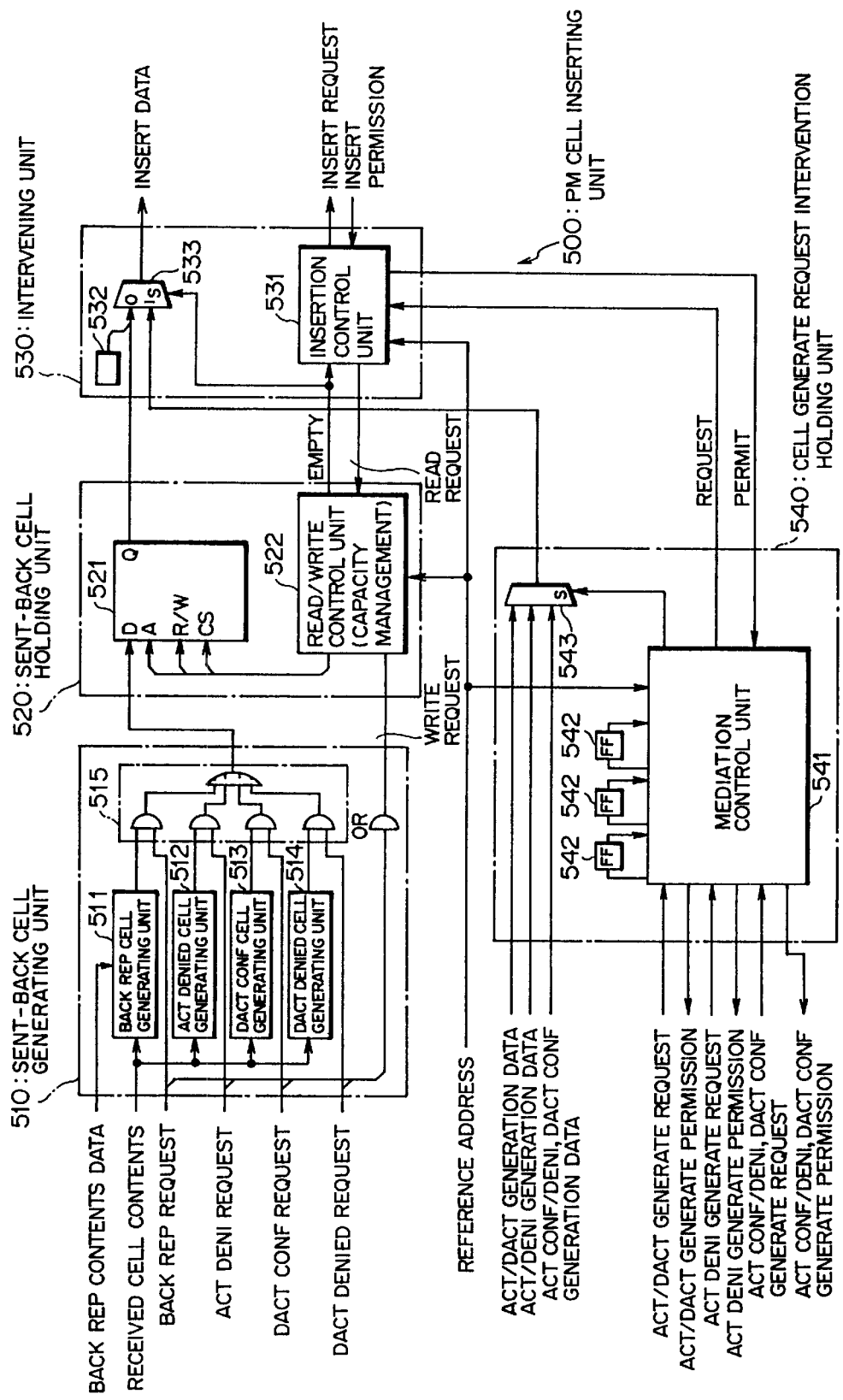
FIG. 50 is a block diagram showing a PM cell inserting unit according to the embodiment.
Figure 55:
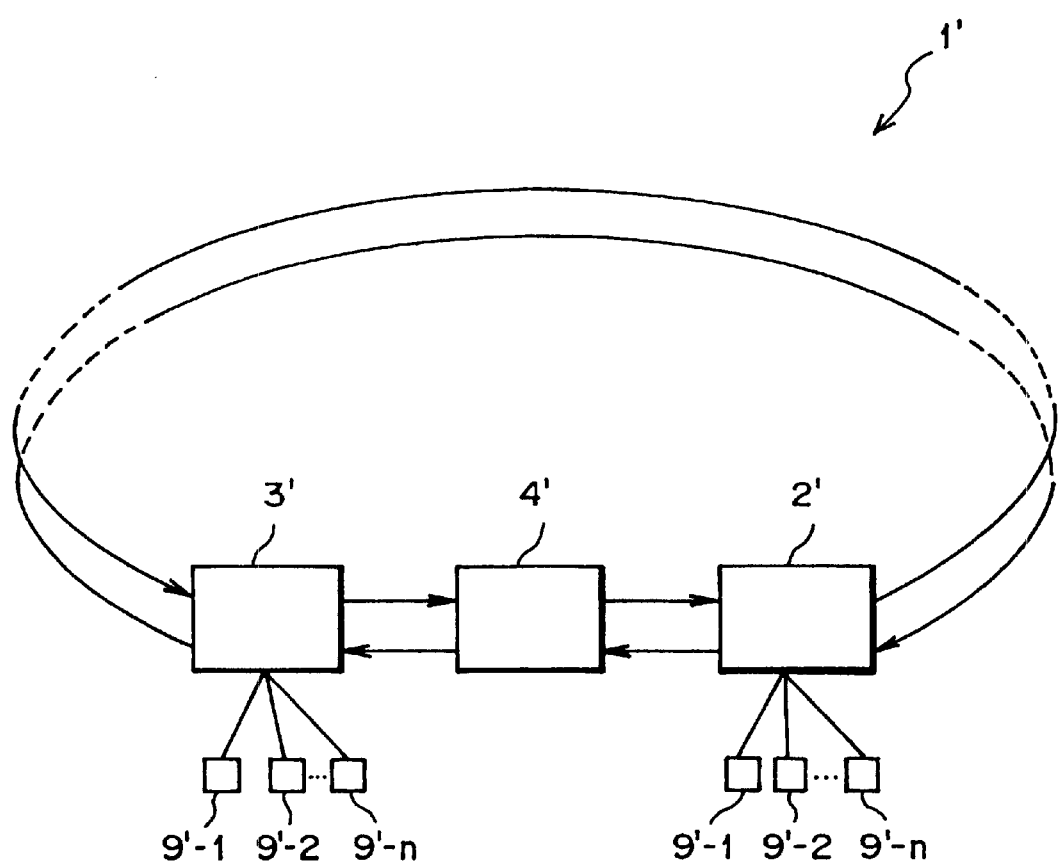
FIG. 55 is a block diagram showing a ring network 1' configuring an SDH transmission network.

To this end, the PM cell inserting unit 500 comprises, as shown in FIG. 50, for example, a sent-back cell generating unit 510, a sent-back cell holding unit 520, an intervening unit 530, and a cell generate request intervention holding unit 540.

When the CAM discriminating unit 311 discriminates contents of a received cell and determines that notification to the microcomputer 95 is unnecessary but a sending-back is necessary, the CAM discriminating unit 311 outputs a request (various control signals) to the PM cell inserting unit 500 (sent-back cell generating unit 510 to be described later) to generate and send a sent-back cell in response to the received cell.

When the CAM discriminating unit 311 in the CAM unit 300 discriminates a received cell, determines as a result that notification to the microcomputer 95 is unnecessary but a sending-back is necessary, and transmits a sent-back cell generate request (request for generating a sent-back cell= sent-back request), the sent-back cell generating unit 510 generates a sent-back cell (Act Deni Cell or Dact Conf/Deni Cell) and the like in response to a received sent-back cell generate request from the CAM discriminating unit 311. To this end, the sent-back cell generating unit 510 comprises a Backward Reporting Cell generating unit 511, an Activate Denied Cell generating unit 512, a Deactivate Confirmed Cell generating unit 513, a Deactivate Denied Cell generating unit 514, a selector unit 515 and the like. Each of these generating units 511, 512, 513 and 514 generates a desire cell on the basis of contents of a received cell from the CAM unit 300 and information (Back contents data) on a Backward Reporting Cell from the PM counting unit 400, information on an internal processing state and the like, and transmits only a cell required to be sent back to the sent-back cell holding-unit 520 through the selector unit 515.

The sent-back cell holding unit 520 comprises a single port RAM (FiFo RAM; hereinafter referred as a "FiFo RAM") 521 functioning as a five-stage FiFo memory holding a sent-back cell generated by the sent-back cell generating unit 510, and a read/write control unit 522 performing a reading and writing control on the FiFo RAM 521.

In the FiFo RAM 521, a region holding data in one stage is 16 octet that is minimum data necessary for one sent-back cell, in which a sent-back cell is divided into 0 to 7 addresses totaling 8 addresses and held, as shown in FIG. 51, for example.

FIGS. 51(a) and 51(b) are diagrams each showing an example of a data structure in the FiFo RAM 521. FIG. 51(a) shows an example where data is held in the case that the sent-back cell is an Act/Dact Conf/Deni Cell, whereas FIG. 15(b) shows an example where data is held in the case that the sent-back cell is a Back Rep Cell.

FIG. 52 is a diagram showing an example of an address structure in the FiFo RAM 521. As shown in FIG. 52, the lower significant 3 bits (indicated by "y1" in FIG. 52) among 6 bits in total are used to discriminate data, and the remaining higher significant 3 bits (indicated by "y2" in FIG. 52) are used to discriminate a holding region of the five-stage FiFo.

The above cell generate request intervention holding unit 540 holds cell generate requests (to be described later) from three portions, which basically outputs the requests in the order received, or selects a generate request having a higher priority according to the order of priority described later only when the generate requests arrive simultaneously and outputs the selected generate request to the intervening unit 530 (to be described later).

As the above cell generate requests from the three portions, there are an Act/Dact generate request from the Act/Dact cell generation control counter unit 333 of the Act/Dact transmission processing unit 330 shown in FIG. 26, a generate request for An Act ConfiDeni Cell or a Dact Conf Cell from the VPI/VCI checking unit 641 of the Act/Dact reception processing unit 600 shown in FIG. 29 and an Act Deni generate request from the Act Denied cell generating unit 662 of the Act/Dact reception processing unit 600 shown in FIG. 34.

To this end, the cell generate request intervention holding unit 540 comprises, as shown in FIG. 50, a mediation control unit 541, flip-flops (FF) 542 and a selector 543.

The mediation control unit 541 holds cell generate requests from the Act/Dact cell generation control counter unit 333, the VPI/VCI checking unit 641, and the Act Denied cell generating unit 662, outputs the held cell generate requests to the intervening unit 530 (to be described later), after that, when receiving a permission (an Act/Dact cell generate permission, an Act Conf/Deni cell or Dact Conf Cell generate permission, an Act Deni generate permission) from the intervening unit 530 (to be described later), outputs the permission to the source (the Act/Dact cell generation control counter unit 333, the VPI/VCI checking unit 641, or the Act Denied cell generating unit 662) of the corresponding cell generate request, and controls the SEL 543 so that data outputted from the source receiving the permission (the Act/Dact Cell generation control counter 333, the VPI/VCI checking unit 641 or the Act Denied cell generating unit 662) is outputted.

The FFs 542 hold cell generate requests (Act/dact generate request, Act Conf/Deni Cell or Dact Conf Cell generate request, and Act Deni generate request) from respective sources (Act/Dact cell generation control counter unit 333, VPI/VCI checking unit 641 and Act Denied cell generating unit 662).

The above three generate requests (Act/dact generate request, Act Conf/Deni Cell or Dact Conf Cell generate request and Act Deni generate request) are basically at the same level. The mediation control unit 541 performs a process on generate requests in the order received. Only when receiving a plurality of generate requests simultaneously, the mediation control unit 541 intervenes the concurrent requests with an Act Conf/Deni or Dact Conf cell generate request having the highest priority set by the microcomputer 95, an Act Deni cell generate request having the second priority on the basis of 2-second. time-over, and an Act/dact generate request having the lowest priority set by the microcomputer 95.

The intervening unit (intervention control unit) 530 controls and intervenes the order in which data is to be transmitted when control data (Act/Dact Req Cell), response data (Act Conf/Deni Cell, Dact Conf Cell), an Act Deni Cell at the time of 2-second time-over and sent-back data (Back Rep Cell, Dact Conf Cell, Dact Deni Cell, Act Deni Cell) are generated concurrently. In concrete, the intervening unit 530 performs a process to send insert requests from the sent-back cell holding unit 520 and generate requests from the cell generate request intervention holding unit 540 in the order of priority. To this end, the intervening unit 530 comprise, as shown in FIG. 50, for example, an insertion control unit 531, a fixed value adding unit 532 and an SEL 533.

The insertion control unit 531 controls to intervene the above requests. According to this embodiment, the insertion control unit 531 performs an intervening process according to the order of priority shown in Table 4 below.

TABLE 4

EXAMPLE OF ORDER OF PRIORITY

| ITEM | CAUSE OF GENERATION | PRIORITY | REMARKS |
|---|---|---|---|
| 1 | Back Rep Cell (Sent-back Cell) Dact Comf Cell (The same) Dact Deni Cell (The same) Act Deni Cell (The same) | HIGH | |
| 2 | Act Comf/Deni Dact Comf (Set by microcomputer) | LOW | High (concurrent requests) |
| 3 | 2-second time-over Act Denied | | Middle (concurrent requests) |
| 4 | Act Cell Dact Cell (Set by microcomputer) | | Low (concurrent requests) |

Namely, according to the order of priority of this embodiment, response data (in items 2 and 3 in Table 4) has a higher priority than control data (in item 4 in Table 4), and sent-back data (in item 1 in Table 4) has a higher priority than the response data.

According to the order of priority shown in Table 4, the top priority is given to a sent-back cell generate request in order to prevent a sent-back cell loss due to shortage of a storing region of the FiFo RAM 521, and the second priority is given to the three kinds of cell generate requests. Generate requests in items 2 and 3 in Table 4 above are response cells to received cells, and are required to be transmitted within a restricted time, so that a higher priority is given to these generate requests. Namely, the three kinds of generated cells shown in item 2 and 4 in Table 4 above are not inserted until sent-back cells are all inserted. As stated above, the priority for the three kinds of generate requests (Act/Dact generate request, Act Conf/Deni Cell or Dact Conf Cell generate request, Act Deni generate request) is as shown in Table 4 above.

The above fixed value adding unit 532 adds a fixed value to data of a sent-back cell read out from the FiFo RAM 521 to generate a cell just before transmission in order to make the cell have a predetermined notification data length. In concrete, an unused region (mentioned as UNUSED "6A" in FIGS. 14 and 15) of a cell shown in FIGS. 14 or 15 is added. Generation data from the cell generate request intervention holding unit 540 is outputted through the SEL 533 as it is since the data has been already generated in a predetermined size.

In the PM cell inserting unit 500 with the above structure, the Backward Reporting Cell generating unit 511, the Activate Denied Cell generating unit 512, the Deactivate Confirmed Cell generating unit 513 and the Deactivate Denied Cell generating unit 514 generate sent-back cells (Act Deni Cell, Dact Conf/Deni Cell and the like) using contents of a received cell, send-back requests (Back Rep send-back request, Act Deni send-back request and the like), and each of the generated sent-back cells is written in the five-stage FiFo RAM 521 through the selector unit 515 under a control of the read/write control unit 522.

The sent-back cell held in the five-stage FiFo RAM 521 is read out from the five-stage FiFo RAM 521 under a control of the read/write control unit 522 receiving a read request from the insertion control unit 531, added fixed length data thereto by the fixed value adding unit 532, then outputted from the SEL 533 to the UpS cell inserting unit 80 under a control of the insertion control unit 531 receiving an insertion permit signal from the UpS cell inserting unit 80.

When the mediation control unit 541 receives cell generate requests from the Act/Dact cell generate control counter unit 333, the VPI/VCI checking unit 641 and the Act Denied Cell generating unit 662, the mediation control unit 541 outputs the received cell generate requests to the insertion control unit 531, outputs a permit signal to a source (Act/Dact cell generation control counter unit 333, the VPI/VCI checking unit 641 or the Act Denied cell generating unit 662) of the cell generate request when receiving an insertion permit signal obtained through an insertion intervening process according to the order of priority shown in Table 4 above by the insertion control unit 531, and controls the SEL 543 to output corresponding cell data from the SEL 543 to the intervening unit 530. Data from the source (the Act/Dact cell generation control counter unit 333, the cell generating unit 642 or the Act Denied cell generating unit 662) of the cell generate request is outputted from the SEL 533 to the UpS cell inserting unit 80 under a control of the insertion control unit 531 receiving an insertion permit signal from the UpS cell inserting unit 80.

In the PM cell inserting unit 500 according to this embodiment, the sent-back cell holding unit 520 is provided with the FiFo RAM 521, whereby a Back Rep Cell or the like as sent-back data is certainly transmitted to another ATM processing apparatus B. Further, the FiFo RAM 521 holds only minimum data necessary for the sent-back data, so that a scale of the apparatus and a power consumption are decreased.

The insertion control unit 531 and the mediation control unit 541 intervene on the basis of the order of priority as shown in Table 4 above, so that data not to be delayed is transmitted quickly with certainty when plural cell insert requests are generated concurrently.

(3-6) Description of a VP/VC monitoring Operation in the Whole System

With respect to the ATM processing apparatus 4 (A and B) each with the above structure, description will be first made of a flow state monitoring operation shown in FIG. 13(a).

When information signifying that a monitoring process to monitor a flow state is started is set from the microcomputer 95 in the VP/VC Monitoring unit 200 in the ATM processing apparatus A, the ATM processing apparatus A sends an Active Request Cell to another ATM processing apparatus B.

Incidentally, the Activate Request Cell is assumed to be for a certain channel in the STS channel #2. In the following description, the same operation is carried out even when the Activate Request Cell is for another channel in the STS channel 2# or a channel in another STS channel #1 or #3, detailed description of which is thus omitted.

The Activate Request Cell is sent from the UpS cell inserting unit 80 shown in FIG. 2 to the UTOPIA 20 on the upstream side. The UTOPIA receiving the Activate Request Cell exchanges control signals such as Clav and the like with the UTOPIA 10-1 in the mapping/demapping unit 3-2 in the SDH transmitting apparatus 3, then outputs the Activate Request Cell to the UTOPIA 10-1.

The Activate Request Cell is mapped on a transmission frame on the STS channel #2 by the mapping unit 3m in the mapping/demapping unit 3-2, and outputted to another ATM processing apparatus B.

After that, when the mapping/demapping unit 3-2 receives a transmission frame on which an Activate Confirmed Cell outputted from another ATM processing apparatus B is mapped, the demapping unit 3d extracts the Activate Confirmed Cell. The Activate confirmed Cell is received by the UTOPIA 10 after the UTOPIA 10 and the UTOPIA 20-1 exchange control signals such as Clav and the like with each other, transferred to a reference timing (cell scynchronization) in the ATM cell processing unit 4-1, and outputted to the cell identifying unit 31 from the UTOPIA 10. The cell identifying unit 31 informs of contents of the received cell the VP/VC Monitoring unit 200 when identifying that the received cell is a PM cell.

After receiving the Activate Confirmed Cell that is a permit signal permitting a start of monitoring on a flow state, the ATM processing apparatus A sends a Forward Monitoring Cell (Outgoing) at a predetermined User Cell interval to the ATM processing apparatus B. The Forward Monitoring Cell is outputted to another ATM processing apparatus B via the UTOPIA 20 and the mapping/demapping unit 3-2 on the upstream side, similarly to the above Activate Request Cell.

When canceling the monitoring operation on the flow state, the ATM processing apparatus A sends a Deactive Request Cell according to a setting by the microcomputer 95, and finishes the monitoring on the flow state by receiving a Deactivate Confirmed Cell. The Deactive Request Cell is outputted to another ATM processing apparatus B via the UTOPIA 20 and the mapping/demapping unit 3-2 on the upstream side, similarly to the above Activate Request Cell.

The ATM processing apparatus A receives a Backward Reporting Cell from another ATM processing apparatus B during a period from when the Forward Monitoring Cell is sent out to another ATM processing apparatus B to when the monitoring on the flow state is finished, and VP/VC Monitoring unit 200 notifies of information on the received Backward Reporting Cell the microcomputer 95.

When the ATM processing apparatus A does not receive an Activate Confirmed Cell or an Activate Denied Cell, or a Deactivate Confirmed Cell or a Deactivate Denied Cell from the ATM processing apparatus B while making an Activate request or a Deactivate request, the ATM processing apparatus A again sends the Activate Request Cell or the Deactivate Request Cell to the ATM processing apparatus B within a range of the number of times of re-transmission set by the microcomputer 95. The re-transmitted Activate Request Cell or Deactivate Request Cell is outputted to another ATM processing apparatus B via the UTOPIA 20 and the mapping/demapping unit 3-2 on the upstream side, similarly to the above Activate Request Cell.

When the mapping/demapping unit 3-2 receives a transmission frame on which an Activate Request Cell is mapped outputted from another ATM processing apparatus B, the demapping unit 3d demaps ATM cells such as an Activate Request Cell and the like from the transmission frame. The Activate Request Cell and the like are received by the above UTOPIA 10 after the UTOPIA 20-1 and the UTOPIA 10 on the downstream side exchange control signals such as Clav and the like, transferred to the reference timing in the ATM cell processing unit 4-1, and received by the cell identifying unit 31.

The VP/VC Monitoring unit 200 notifies of contents of a cell (contents of the Activate Request Cell) received from another ATM processing apparatus B the microcomputer 95. The ATM processing apparatus A sends an Activate Confirmed Cell or an Activate Denied Cell to another ATM processing apparatus B according to a direction from the microcomputer 95. On the other hand, when the ATM processing apparatus A does not receive a direction relating to the contents of the cell received from the ATM processing apparatus B from the microcomputer 95 within a predetermined period (2 second, for example), the ATM processing apparatus A sends an Activate Denied Cell to another ATM processing apparatus B. The Activate Confirmed Cell or the Activate Denied Cell is outputted to another ATM processing apparatus B via the UTOPIA 20 and the mapping/ demapping unit 3-2 on the upstream side, similarly to the above Activate Request Cell.

When receiving a Forward Monitoring Cell from another ATM processing apparatus B just like the case of the above Activate Request Cell, the ATM processing apparatus A outputs a Backward Reporting Cell to another ATM processing apparatus B, and outputs a Deactivate Confirmed Cell or a Deactivate Denied Cell when receiving a Deactivate Request Cell.

The ATM processing apparatus B shown in FIG. 13 (b) transmits an Activate Confirmed Cell permitting the execution in response to the Activate Request Cell received from the ATM processing apparatus A, after that, periodically generates a Forward Monitoring Cell addressed to the ATM processing apparatus A and transmits the cell.

In the case of Two-Way shown in FIG. 13(c), the ATM processing apparatus A and B transmit and receive Forward Monitoring Cells, Backward Reporting Cells and the like therebetween to perform a monitoring process to monitor a flow state.

Incidentally, the above monitoring process to monitor a flow state is also performed on the other STS channels #1 and #3 according to a setting by the microcomputer 95 of the ATM processing apparatus A.

As stated above, the ATM processing apparatus A (4) according to this embodiment can periodically exchange a Forward Monitoring Cell and the like with another ATM processing apparatus B according to a direction from the microcomputer 95, and can readily monitor a flow state in a network having a high transmission rate.

Further, a monitoring on a flow state in a plurality of STS channels #i can be carried out with one ATM processing apparatus A (4), so that a scale of the apparatus is simply configured. In addition, it is possible to maintain and manage a complex system adaptive to a high speed communication or a variable bit rate communication.

(4) Others

In the above description, the PM processing for counting discard cells, monitoring a flow state and the like is performed with one ATM cell processing unit 4-1 for a plurality of STS channels #i. However, it is alternatively possible to provide the ATM cell processing units 4-1 for respective STS channels #i to configure an ATM processing apparatus (hereinafter, designated by a reference character "4a" in order to discriminate it from the ATM processing apparatus 4 for the sake of convenience), like the structure of the ATM processing apparatus 4' shown in FIG. 56.

Even in the ATM processing apparatus 4a, each of the ATM cell processing unit 4-1 receives an ATM cell from the mapping/demapping unit 2-i or 3-i, and carries out an operation similar to that of the above ATM cell processing apparatus 4-1. However, the UTOPIAs 10 and 20 in the ATM cell processing apparatus 4-1 do not have to exchange control signals such as Clav and the like with the UTOPIAs 10-1 and 20-1 in the mapping/demapping unit 2-i or 3-i handling an STS channel #j other than an STS channel #i handled by the ATM cell processing unit 4-1.

The ATM processing apparatus 4a can readily monitor misinsertion of a cell or a flow state in a transmission system having a high transmission rate, as well as the above ATM processing apparatus 4.

Unlike the above ATM processing apparatus 4, an ATM processing apparatus (hereinafter designated by a reference character "4b" in order to discriminate it from the ATM processing apparatus 4 for the sake of convenience) may have a plurality of ATM cell processing apparatus 4-1.

Even the ATM processing apparatus 4b can readily monitor misinsertion of a cell or a flow state, as well as the above ATM processing apparatus 4. In addition, the ATM processing apparatus 4b can readily maintain and manage a complex system adaptive to a high speed communication or a variable bit rate communication.

In the above embodiments, the ATM processing apparatus 4-1 comprises the discard cell counting unit 100 and the VP/VC Monitoring unit 200. However, it is possible to configure an ATM cell processing unit (hereinafter designated by a reference character "4-1a" in order to discriminate it from the ATM cell processing unit 4-1 for the sake of convenience) without the discard cell counting unit 100. With respect to the above ATM processing apparatus 4a and 4b, it is also possible to configure an ATM processing apparatus (hereinafter designated by a reference character "4c" in order to discriminate it from the ATM processing apparatus 4 for the sake of convenience) without the discard cell counting unit 100.

Even the ATM processing apparatus 4c can readily monitor a flow state of ATM cells in a high speed communication, as well as the ATM processing apparatus 4. Further, since each of the ATM cell processing units 4b (4-1a) can handle a plurality of STS channels using the UTOPIA 10, 10-1, 20 and 20-1, it is possible to readily monitor a flow state and maintain and manage a complex system adaptive to a high speed communication or a variable bit rate communication.

In the above description, each ATM processing apparatus 4, 4a, 4b or 4c is installed between the SDH transmitting apparatus 2 and 3 as shown in FIG. 1. However, the ATM processing apparatus 4, 4a, 4b or 4c may be interposed on another transmission route. For instance, the ATM processing apparatus 4α shown in FIG. 1 may be interposed on a transmission route in a lower hierarchy of the SDH transmitting apparatus 2 and 3. In such case, the ATM processing apparatus 4α can monitor loss of an ATM cell due to an increase of a communication capacity, or a flow state.

Still alternatively, it is possible to configure an ATM cell processing unit (hereinafter designated by a reference character "4-1b" in order to discriminate it from the ATM cell processing unit 4-1 for the sake of convenience) without the VP/VC Monitoring unit 200. With respect to the above ATM processing apparatus 4a and 4b, it is possible to configure an ATM processing apparatus (hereinafter designated by a reference character "4d" in order to discriminate it from the ATM processing apparatus 4 for the sake of convenience) without the VP/VC Monitoring unit 200.

Even the ATM processing apparatus 4d can readily monitor a discard cell or a misinsertion of a cell in a high speed communication, as well as the above ATM processing apparatus 4. Further, since each of the ATM processing apparatus 4b (4-1a) can handle a plurality of STS channels using the UTOPIAs 10, 10-1, 20 and 20-1, it is possible to readily monitor a discard cell or misinsertion of a cell in a high speed communication, and maintain and manage a complex system adaptive to a high speed communication or a variable bit rate communication.

As having been described in detail the present invention, the present invention may be modified in various ways without departing from the scope of the invention.

What is claimed is:

1. A fixed length data processing apparatus connected to a plurality of physical interfaces each having a de-mapping function to de-map fixed length data containing a transmission path identifier used in an asynchronous communication from a transmission channel frame identified by a channel frame identifier, comprising:

a data processing unit for receiving at least said fixed length data and performing a desired data processing on said fixed length data;

a memory for storing target path group setting information to set a target path group for monitoring an operation state of asynchronous communications each identified by a channel frame identifier and the transmission path identifier; and an operation state monitoring process unit for performing a monitoring process to monitor the operation state of the asynchronous communications of the target path group based on the transmission path identifier of said fixed length data received by said data processing unit and the target path group setting information of said memory.

2. The fixed length data processing apparatus according to claim 1, wherein said data processing unit and said operation state monitoring process unit each performs said process according to a processing timing in synchronization with a length of said fixed length data.

3. The fixed length data processing apparatus according to claim 1, wherein said data processing unit and said operation state monitoring process unit each performs the data processing commonly to the channel frame on the basis of the channel frame identifier.

4. The fixed length data processing apparatus according to claim 1, wherein said data processing unit and said operation state monitoring process unit each performs the data processing commonly to the asynchronous communications on the basis of transmission route identifiers for the fixed length data.

5. The fixed length data processing apparatus according to claim 1, wherein said data processing unit comprises an identifying unit for identifying whether said fixed length data is fixed length data that should be discarded or not; and wherein said operation state monitoring process unit comprises a discard state monitoring unit collecting and managing information on data that is an object of discarding identified by said identifying unit as fixed length data that should be discarded to monitor a discard state of said fixed length data.

6. The fixed length data processing apparatus according to claim 5 further comprising a collectively managing unit for collectively managing a process in said operation state monitoring unit;

wherein said discard state monitoring unit comprises:

a discard contents holding unit for holding discard contents information on contents of data that is an object of discarding;

a discard number holding unit for holding discard number information on the number of data that is an object of the discarding;

a write processing unit for writing said discard contents information in said discard contents holding unit and writing said discard number information in said discard holding unit on the basis of the transmission path identifier; and a notifying interface unit for reading information held in said discard contents holding unit, and notifying of said information said collectively managing unit.

7. The fixed. length data processing apparatus according to claim 6, wherein said discard contents holding unit comprises at least two holding regions;

wherein said write processing unit switches a holding region that is an object of writing in a predetermined cycle to alternately write said discard contents information in either one of said holding regions; and wherein said notifying interface unit reads said discard contents information from a region different from said holding region in the process of writing by said writing processing unit.

8. The fixed length data processing apparatus according to claim 7, wherein said write processing unit comprises an address generating unit for generating address information for designating a writing position for said discard contents information in said discard contents holding unit, and said address generating unit generates address information comprising identification information unique to each of said holding regions to switch a holding region that is an object of said writing.

9. The fixed length data processing apparatus according to claim 7, wherein said discard content holding unit is configured with dual port RAMs each having ports for writing and reading controls in at least two systems.

10. The fixed length data processing apparatus according to claim 9, wherein a port in either one system of said dual port RAM is configured as a port exclusive for reading; and wherein said notifying interface unit reads said discard contents information in said holding region through said port exclusive for reading.

11. The fixed length data processing apparatus according to claim 6, wherein said discard number holding unit is configured with at least two registers;

wherein said write processing unit switches a register that is an object of writing in a predetermined cycle to alternately write said discard number information in either one of said registers; and wherein said notifying interface unit reads said discard number information from a register different from a register in the process of writing by said write processing unit.

12. The fixed length data processing apparatus according to claim 6, wherein said write processing unit comprises a discard cause coding unit for coding a cause of discarding of data that is an object of discarding to obtain a code corresponding to said discard cause, and writes said code obtained by said discard cause coding unit as a part of said discard contents information in said discard contents holding unit; and wherein said notifying interface unit notifies of said code read as a part of said discard contents information from said discard contents holding unit said collectively managing unit.

13. The fixed length data processing apparatus according to claim 1 further comprising a collectively managing unit for collectively managing a process in said operation state monitoring process unit; and wherein said operation state monitoring process unit comprises a flow state monitoring unit for periodically exchanging monitoring data with another fixed length data processing apparatus according to a direction of said collectively managing unit to monitor a flow state of fixed length data between said fixed length data processing apparatus and said another fixed length data processing apparatus.

14. The fixed length data processing apparatus according to claim 13, wherein said flow state monitoring unit comprises:

a control data generation processing unit for generating control data for controlling execution of said monitoring process according to a direction from said collectively managing unit;

a control data transmission processing unit for transmitting said control data generated by said control data generation processing unit to said another fixed length data processing apparatus;

a monitoring data transmission processing unit for periodically generating monitoring data addressed to said another fixed length data processing apparatus and transmitting said monitoring data when receiving response data permitting execution of said monitoring process as a response to said control data; and a count processing unit for performing a predetermined counting process on the basis of monitoring data sent back from said another fixed length data processing apparatus in response to transmission of said monitoring data, and notifying of a result of counting obtained through said counting process as a result of monitoring on said flow state said collectively managing unit.

15. The fixed length data processing apparatus according to claim 14, wherein said flow state monitoring unit comprises a control data reception processing unit for notifying of contents of control data said collectively managing unit when receiving said control data for controlling execution of said monitoring process from said another fixed length data processing apparatus, and generating response data according to a direction from said collectively managing unit in response to said notification; and wherein said control data transmission processing unit can transmit said response data generated by said control data reception processing unit to said another fixed length data processing apparatus.

16. The fixed length data processing apparatus according to claim 15, wherein said flow state monitoring unit comprises a discriminating unit for discriminating whether said control data received from said another fixed length data processing apparatus is data that should be notified said collectively managing unit or not on the basis of discrimination data including information on at least its own internal processing state;

wherein said control data reception processing unit notifies of contents of only control data that is discriminated by said discriminating unit as that notification is necessary and sending-back is necessary the collectively managing unit; and wherein said control data transmission processing unit generates sent-back data according to contents of control data that is discriminated by said discriminating unit as that notification is unnecessary, and transmits said sent-back data to said another fixed length data processing apparatus.

17. The fixed length data processing apparatus according to claim 14, wherein said control data generation processing unit comprises a first timer counting unit for monitoring whether response data permitting execution of said monitoring process as a response to said control data is received within a predetermined period or not, and said control data generation processing unit performs a re-generating process to re-generate said control data when said first timer counting unit determines that said response data is not received within the predetermined period.

18. The fixed length data processing apparatus according to claim 17, wherein said first timer counting unit is configured with a first timer RAM in/from which a timer count value is written/read in a predetermined cycle.

19. The fixed length data processing apparatus according to claim 16, wherein said discriminating unit comprises a discrimination data holding RAM for holding said discrimination data.

20. The fixed length data processing apparatus according to claim 19, wherein said discriminating unit comprises a plurality of said discrimination data holding RAMs to perform a discriminating process on plural kinds of data in parallel.

21. The fixed length data processing apparatus according to claim 19, wherein said discriminating unit comprises a setting data holding RAM for exclusively holding setting data in said control data, excepting control data used in said discriminating process.

22. The fixed length data processing apparatus according to claim 19, wherein said discriminating unit codes information on said internal processing state, and holds said coded information in said discrimination data holding RAM.

23. The fixed length data processing apparatus according to claim 22, wherein said discriminating unit codes information on said internal processing state so that said information comprises a code indicating whether said monitoring process is in the process of execution or not.

24. The fixed length data processing apparatus according to claim 16, wherein said control data transmission processing unit generates said control data on the basis of information on said internal processing state in said discriminating unit.

25. The fixed length data processing apparatus according to claim 15, wherein said control data reception processing unit comprises:

a direction contents holding unit for holding direction contents from said collectively managing unit;

a notification contents holding unit for holding contents that should be notified said collectively managing unit; and wherein each of said direction contents holding unit and said notification contents holding unit is configured with a RAM.

26. The fixed length data processing apparatus according to claim 25, wherein said RAM of said direction contents holding unit can hold information indicating presence or absence of a new direction from said collectively managing unit with a part of said direction contents.

27. The fixed length data processing apparatus according to claim 25, wherein said RAM of said notification contents holding unit can hold a code indicating presence or absence of new notification contents to said collectively managing unit.

28. The fixed length data processing apparatus according to claim 25, wherein said control data reception processing unit retrieves only once all direction contents held in said direction contents holding unit to generate response data to be transmitted to said another fixed length data processing unit.

29. The fixed length data processing apparatus according to claim 15, wherein said control data reception processing unit comprises a second timer counting unit for monitoring whether a command from said collectively managing unit in response to said notification is received within a predetermined period or not; and wherein when said second timer counting unit determines that said command is not received within the predetermined period, said control data reception processing unit generates response data denying execution of said monitoring process.

30. The fixed length data processing apparatus according to claim 29, wherein said second timer counting unit is configured with a second timer RAM in which a timer count value is written in a predetermined cycle.

31. The fixed length data processing apparatus according to claim 16, wherein said control data transmission processing unit comprises a FIFO memory for temporarily holding said sent-back data.

32. The fixed length data processing apparatus according to claim 31, wherein said FIFO memory is configured with a RAM.

33. The fixed length data processing apparatus according to claim 15, wherein said control data transmission processing unit comprises an intervention control unit for intervening and controlling the order in which each data to be transmitted when said control data, said response data and said sent-back data are concurrently generated.

34. The fixed length data processing apparatus according to claim 33, wherein said intervention control unit performs a transmitting process to transmit said control data, said response data and said sent-back data in a predetermined order of priority.

35. The fixed length data processing apparatus according to claim 34, wherein there is set that response data is given a higher priority than said control data, and said sent-back data is given a higher priority than said response data.

36. The fixed length data processing apparatus according to claim 14, wherein said count processing unit comprises a count result holding unit for holding said count result obtained through said counting process; and wherein said count result holding unit is configured with a count result holding RAM.

37. The fixed length data processing apparatus according to claim 36, wherein said count processing unit comprises at least two RAMs as said count result holding RAM;

wherein said count processing unit writes said count result in either one of said RAMs, while reading a count result having been written from the other RAM, and notifying of said count result said collectively managing unit; and wherein said count processing unit alternately switches between writing and reading of said count result on each of said RAMs.

38. The fixed length data processing apparatus according to claim 14, wherein said count processing unit comprises a monitoring data generating information generating unit for generating plural kinds of information necessary to generate said monitoring data in said monitoring data transmission processing unit; and wherein said monitoring data generating information generating unit generates said plural kinds of information using plural kinds of RAMS.

39. The fixed length data processing apparatus according to claim 29, wherein said second timer counting unit is configured with a second timer RAM from which a timer count value is read in a predetermined cycle.

* * * * *